United States Patent [19]
Wolf et al.

[11] Patent Number: 5,583,844
[45] Date of Patent: Dec. 10, 1996

[54] PROGRAMMING DEVICE AND METHOD FOR CONTROLLING RIDE VEHICLES IN AN AMUSEMENT ATTRACTION

[75] Inventors: William L. Wolf, North Hollywood; William G. Redmann, Moorpark; Jon H. Snoddy, Pasadena; David W. Spencer, II, Saugus; Scott F. Watson, Glendale, all of Calif.

[73] Assignee: The Walt Disney Company, Burbank, Calif.

[21] Appl. No.: 109,370

[22] Filed: Jun. 19, 1993

[51] Int. Cl.$^6$ .......................... A63G 25/00; A63G 31/02
[52] U.S. Cl. ........................ 364/423.098; 472/43
[58] Field of Search .................. 364/424.01, 425; 104/53, 77, 78, 86; 472/43

[56] References Cited

U.S. PATENT DOCUMENTS

| Re. 15,244 | 12/1921 | Maynes | 104/53 |
|---|---|---|---|
| D. 254,622 | 4/1980 | Trussler | D19/63 |
| 373,439 | 11/1887 | Campbell | 104/86 |
| 491,572 | 2/1893 | Libbey | 104/81 |
| 717,457 | 12/1902 | Schofield | 104/75 |
| 773,613 | 11/1904 | Walsh | 104/82 |
| 784,345 | 3/1905 | Pepper | 280/212 |
| 788,886 | 5/1905 | Citron | 472/59 |
| 794,511 | 7/1905 | Knapp | 104/75 |
| 858,624 | 7/1907 | Reckweg | 104/76 |
| 859,604 | 7/1907 | Jossenberger | 104/83 |
| 871,643 | 11/1907 | Shaw | 104/86 |
| 879,615 | 2/1908 | Enochs | 104/72 |
| 887,505 | 5/1908 | Nelson et al. | 417/211 |
| 909,500 | 1/1909 | Woerth | 104/75 |
| 1,238,151 | 8/1917 | Keefe | 472/60 |
| 1,311,703 | 7/1919 | Meyer | 104/85 |
| 1,352,969 | 9/1920 | Kalix | 104/91 |
| 1,571,434 | 2/1926 | Ray | 104/63 |
| 1,590,934 | 6/1926 | Feltner | 104/53 |
| 1,712,353 | 5/1929 | Meling | 104/85 |

(List continued on next page.)

FOREIGN PATENT DOCUMENTS

| 455464 | 3/1949 | Canada . |
|---|---|---|
| 1343788 | 10/1963 | France . |
| 180079 | 6/1922 | United Kingdom . |

OTHER PUBLICATIONS

Doran Precision Systems, Inc., (1) "From Roller–Coasters To Road Races . . . With SR2, You'd Swear You're Really There!", (2) SR2 Specifications, (3) Doran Simulator Hydraulic Motion Systems Operational Specifications, (4) Photos of Motion Base and SR2. 1986.

Primary Examiner—Collin W. Park
Attorney, Agent, or Firm—Pretty, Schroeder, Brueggemann & Clark

[57] ABSTRACT

This disclosure relates to a ride vehicle for use in an amusement attraction. The ride vehicle mounts a passenger supporting structure upon a motion base, so that the passenger supporting structure may be articulated about one or more axes as the vehicle moves. Thus, this "simulator ride" carries passengers through three-dimensional scenery and articulates the passenger supporting structure in synchronism with motions of the ride vehicle, the motions of moving show sets, which are external to the vehicle, sound, projection and other effects. The ride vehicle is programmably-controlled by a redundant, two computer control system aboard each vehicle, which controls motions of the ride vehicle in synchronism with actions of the motion base and other special effects in accordance with a selected one of a plurality of ride programs. The external body of the vehicle and the plurality of ride programs, which are created using a special programming console and an offline editor, may thus be quickly adapted and reprogrammed to provide an infinite variability in ride experience, for nearly any desired environment.

Thus, a plurality of ride vehicles may be governed by a computerized central controller that utilizes radio frequency communication to orchestrate the progress of each vehicle and report digitally transmitted status and fault conditions to a human operator of the attraction.

19 Claims, 51 Drawing Sheets

U.S. PATENT DOCUMENTS

| | | | |
|---|---|---|---|
| 1,890,137 | 12/1932 | Traver | 104/63 |
| 2,058,279 | 10/1936 | Watkins | 104/53 |
| 2,135,230 | 11/1938 | Courtney | 104/76 |
| 2,137,839 | 11/1938 | Hanna | 104/75 |
| 2,196,093 | 4/1940 | Bartlett | 104/53 |
| 2,461,780 | 2/1949 | Smith et al. | 119/15.2 |
| 2,685,003 | 7/1954 | Barnes et al. | 191/48 |
| 2,718,194 | 9/1955 | Ruhlmann | 104/247 |
| 2,719,715 | 10/1955 | Leahan | 472/60 |
| 2,861,806 | 11/1958 | Disney | 472/60 |
| 3,006,286 | 10/1961 | Bacon et al. | 104/63 |
| 3,067,697 | 12/1962 | Doolittle | 104/246 |
| 3,095,827 | 7/1963 | Chadenson | 104/130.01 |
| 3,113,528 | 12/1963 | Morgan et al. | 104/73 |
| 3,283,418 | 11/1966 | Brewer et al. | 434/69 |
| 3,345,916 | 10/1967 | Tobias | 92/58 |
| 3,554,130 | 1/1971 | Broggie | 104/75 |
| 3,590,743 | 7/1971 | Larson | 104/80 |
| 3,672,308 | 6/1972 | Segar | 104/246 |
| 3,700,060 | 10/1972 | Keene et al. | 180/165 |
| 3,704,027 | 11/1972 | Laudadio | 280/772 |
| 3,709,104 | 1/1973 | Culberson | 91/495 |
| 3,734,222 | 5/1973 | Bardwick, III | 180/165 |
| 3,747,418 | 7/1973 | Hoffman et al. | 74/5.43 |
| 3,782,008 | 1/1974 | Lloyd | 434/379 |
| 3,803,466 | 4/1974 | Starkey | 104/292 |
| 3,805,414 | 4/1974 | Marsh | 434/379 |
| 3,849,910 | 11/1974 | Greenly | 434/22 |
| 3,886,334 | 5/1975 | Cummings et al. | 434/30 |
| 3,898,746 | 8/1975 | Seidle | 434/69 |
| 3,900,843 | 8/1975 | Ferriss | 341/114 |
| 3,903,696 | 9/1975 | Carman | 60/414 |
| 3,942,270 | 3/1976 | Hoyt et al. | 434/59 |
| 3,983,640 | 10/1976 | Cardullo et al. | 434/59 |
| 3,984,924 | 10/1976 | Myles et al. | 434/29 |
| 3,991,485 | 11/1976 | Golenski | 434/66 |
| 4,019,261 | 4/1977 | Pancoe | 434/58 |
| 4,030,207 | 6/1977 | Kron | 434/59 |
| 4,030,208 | 6/1977 | Carver et al. | 434/46 |
| 4,034,484 | 7/1977 | Radice | 434/71 |
| 4,057,913 | 11/1977 | Eisenberg | 434/6 |
| 4,059,909 | 11/1977 | Kron | 434/59 |
| 4,064,640 | 12/1977 | Cummings et al. | 434/33 |
| 4,066,256 | 1/1978 | Trumbull | 472/60 |
| 4,070,705 | 1/1978 | Lockwood et al. | 395/500 |
| 4,108,077 | 8/1978 | Laing | 104/156 |
| 4,134,217 | 1/1979 | Neilson | 434/242 |
| 4,164,080 | 8/1979 | Kosydar et al. | 434/38 |
| 4,213,343 | 7/1980 | Hoffman | 73/504.07 |
| 4,216,473 | 8/1980 | Goldfischer et al. | 342/105 |
| 4,236,325 | 12/1980 | Hall et al. | 434/45 |
| 4,246,848 | 1/1981 | Schneider | 104/173.2 |
| 4,246,978 | 1/1981 | Schulz et al. | 180/165 |
| 4,251,140 | 2/1981 | Fogerty, Jr. | 352/132 |
| 4,262,861 | 4/1981 | Goldstein | 244/3.2 |
| 4,276,028 | 6/1981 | Gwynn | 434/20 |
| 4,276,030 | 6/1981 | Radice | 434/62 |
| 4,299,576 | 11/1981 | Kron | 434/59 |
| 4,321,044 | 3/1982 | Kron | 434/59 |
| 4,347,055 | 8/1982 | Geiger | 434/30 |
| 4,349,196 | 9/1982 | Smith, III et al. | 273/442 |
| 4,398,241 | 8/1983 | Baker et al. | 364/174 |
| 4,423,365 | 12/1983 | Turner | 218/561 |
| 4,451,769 | 5/1984 | Minnich et al. | 318/689 |
| 4,457,716 | 7/1984 | Eserhaut et al. | 434/43 |
| 4,473,876 | 9/1984 | Minnich | 364/184 |
| 4,491,073 | 1/1985 | Dozer | 104/95 |
| 4,504,233 | 3/1985 | Galus et al. | 434/45 |
| 4,693,186 | 9/1987 | Lisa | 105/329.1 |
| 4,752,065 | 6/1988 | Trumbull et al. | 472/60 |
| 4,753,596 | 6/1988 | Hart et al. | 434/29 |
| 4,798,376 | 1/1989 | Trumbull et al. | 472/60 |
| 4,865,550 | 9/1989 | Chu | 434/267 |
| 4,920,890 | 5/1990 | Barber | 104/53 |
| 5,015,933 | 5/1991 | Watkins et al. | 318/567 |
| 5,028,073 | 7/1991 | Harms et al. | 280/840 |
| 5,127,657 | 7/1992 | Ikezawa et al. | 273/310 |
| 5,199,875 | 4/1993 | Trumbull | 434/62 |
| 5,403,238 | 4/1995 | Baxter et al. | 472/43 |

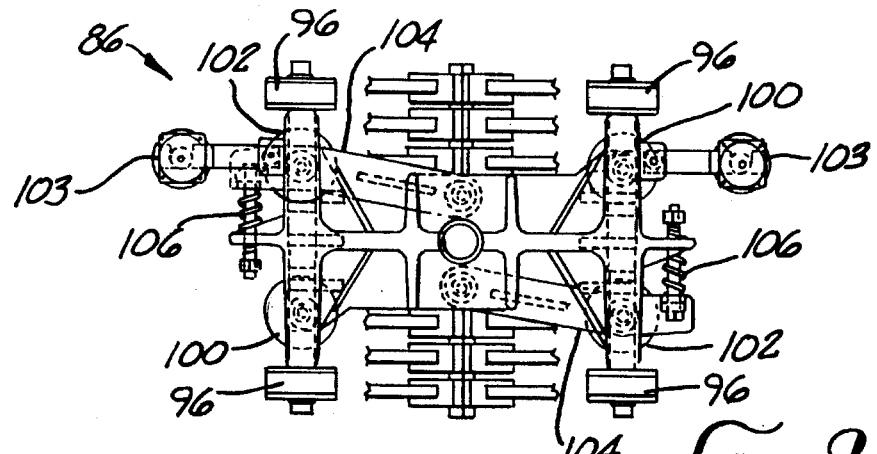
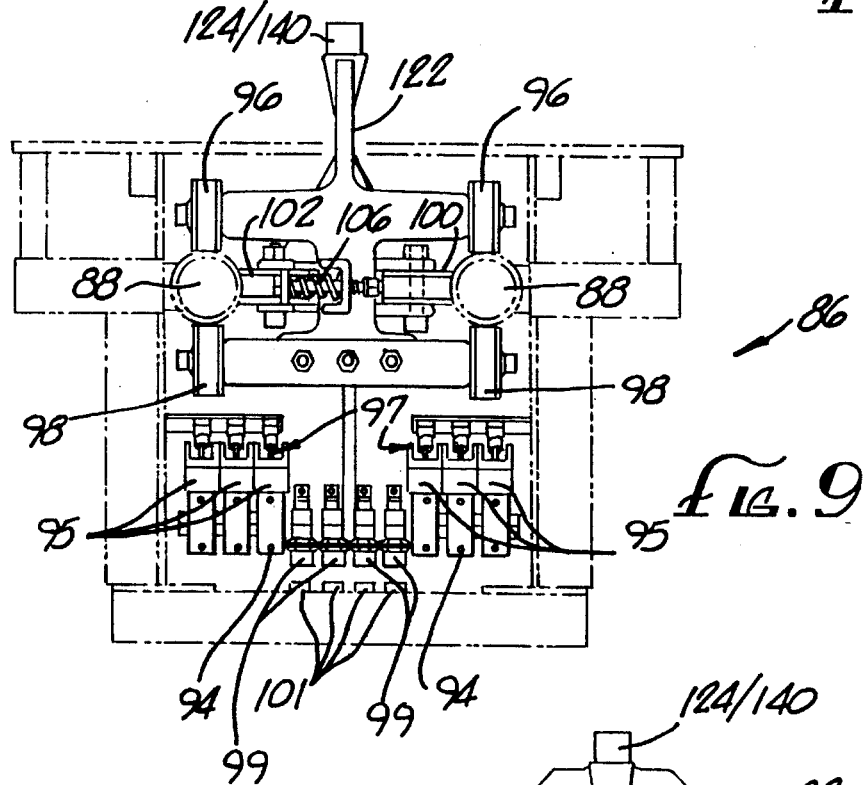
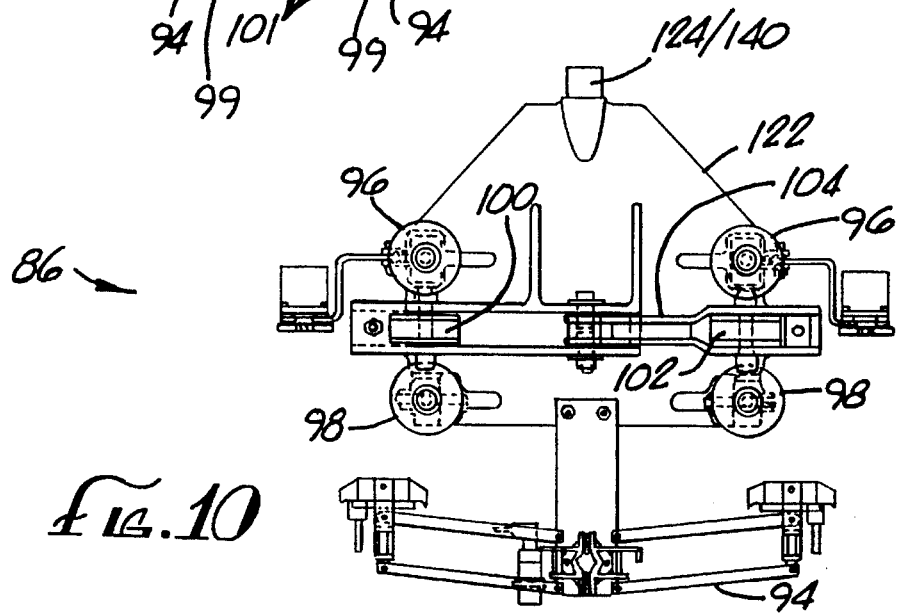

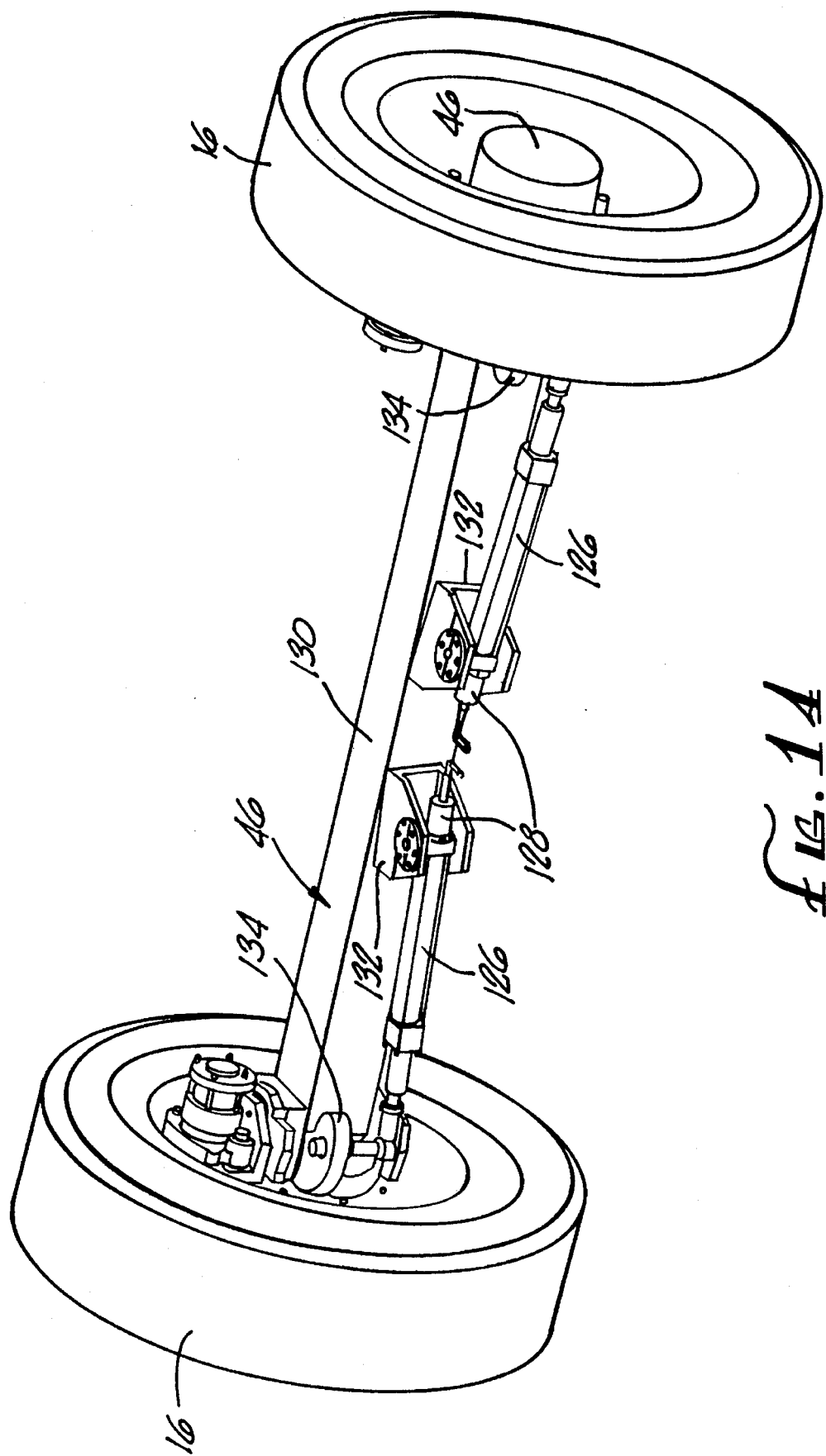

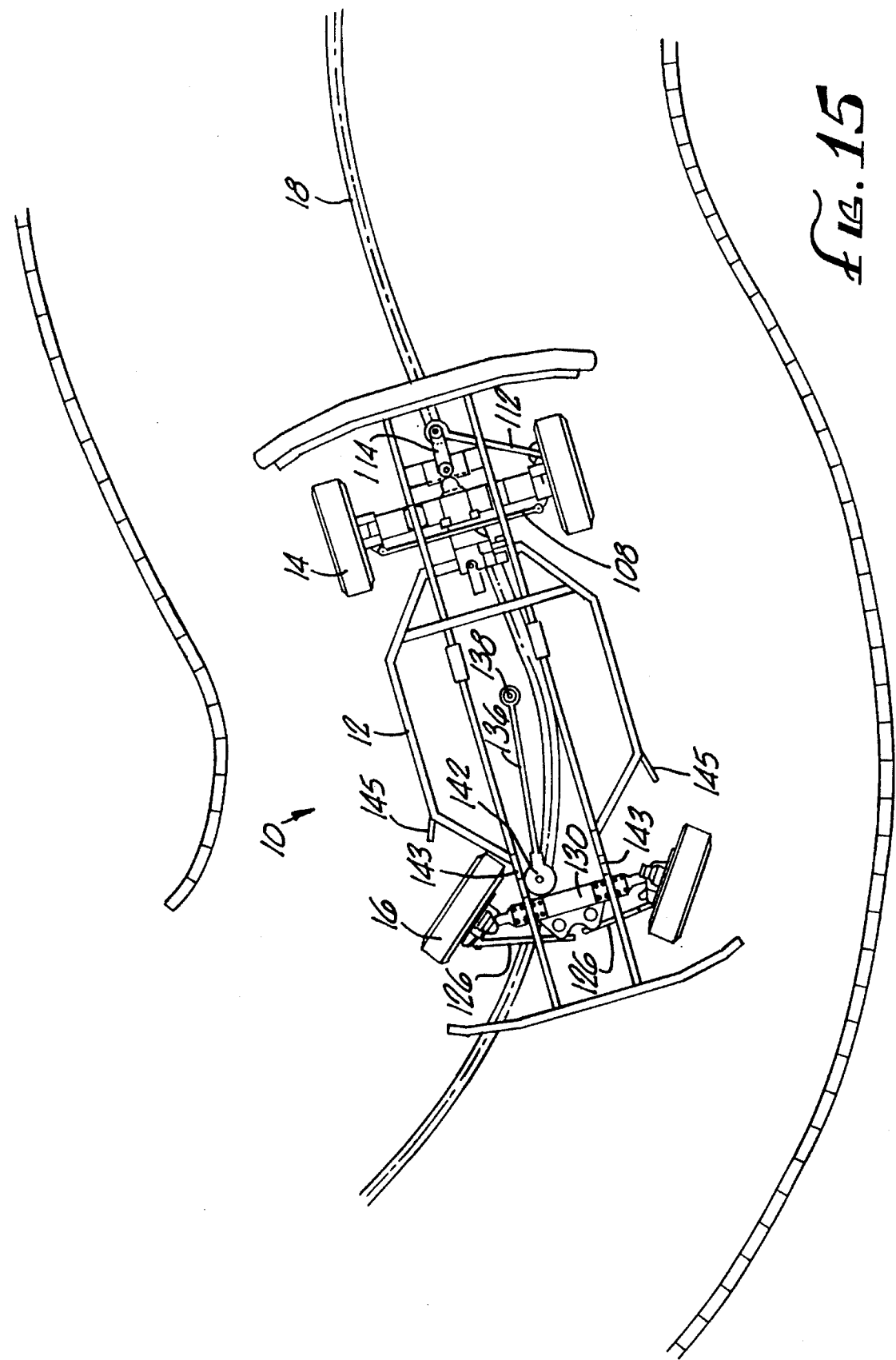

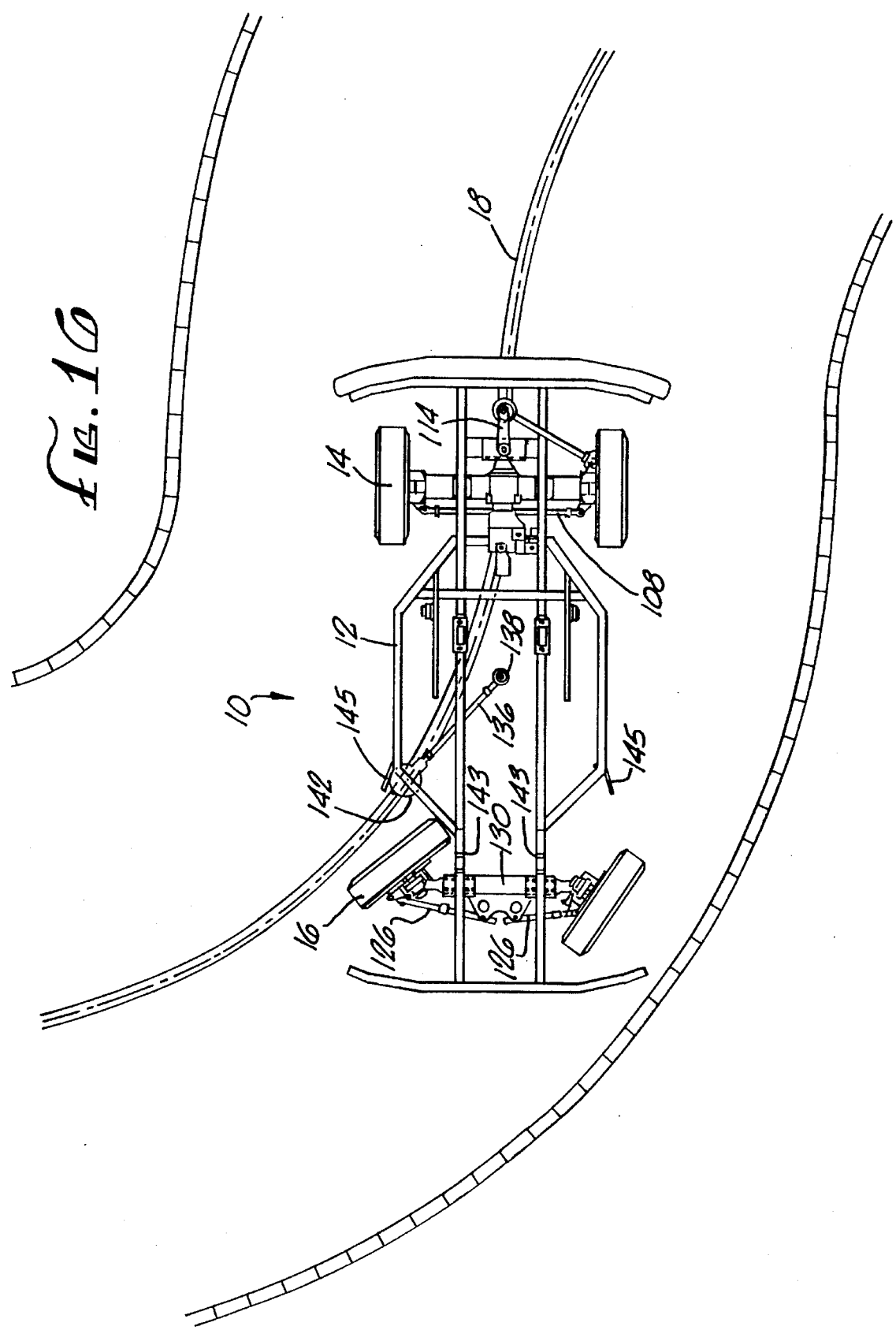

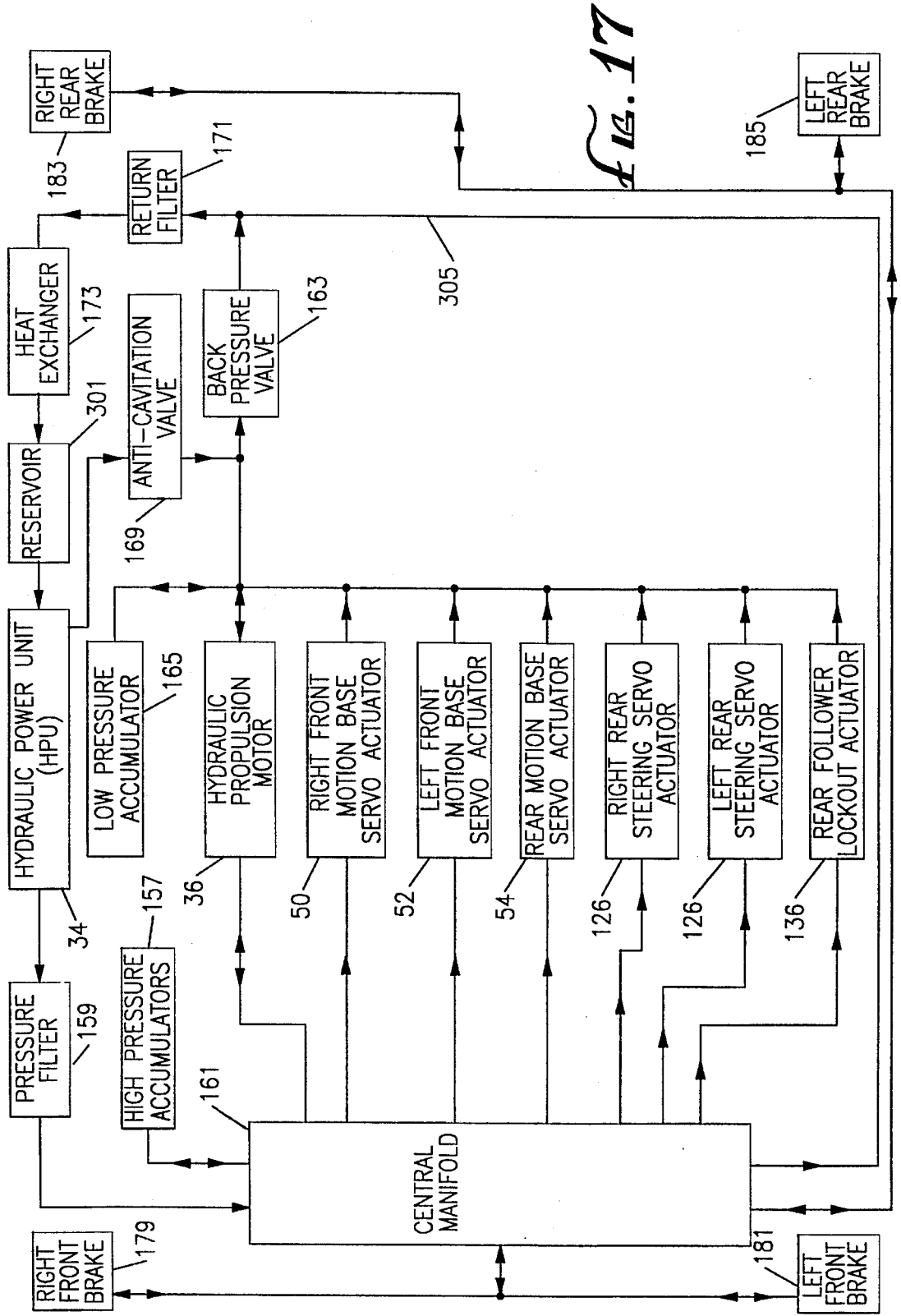

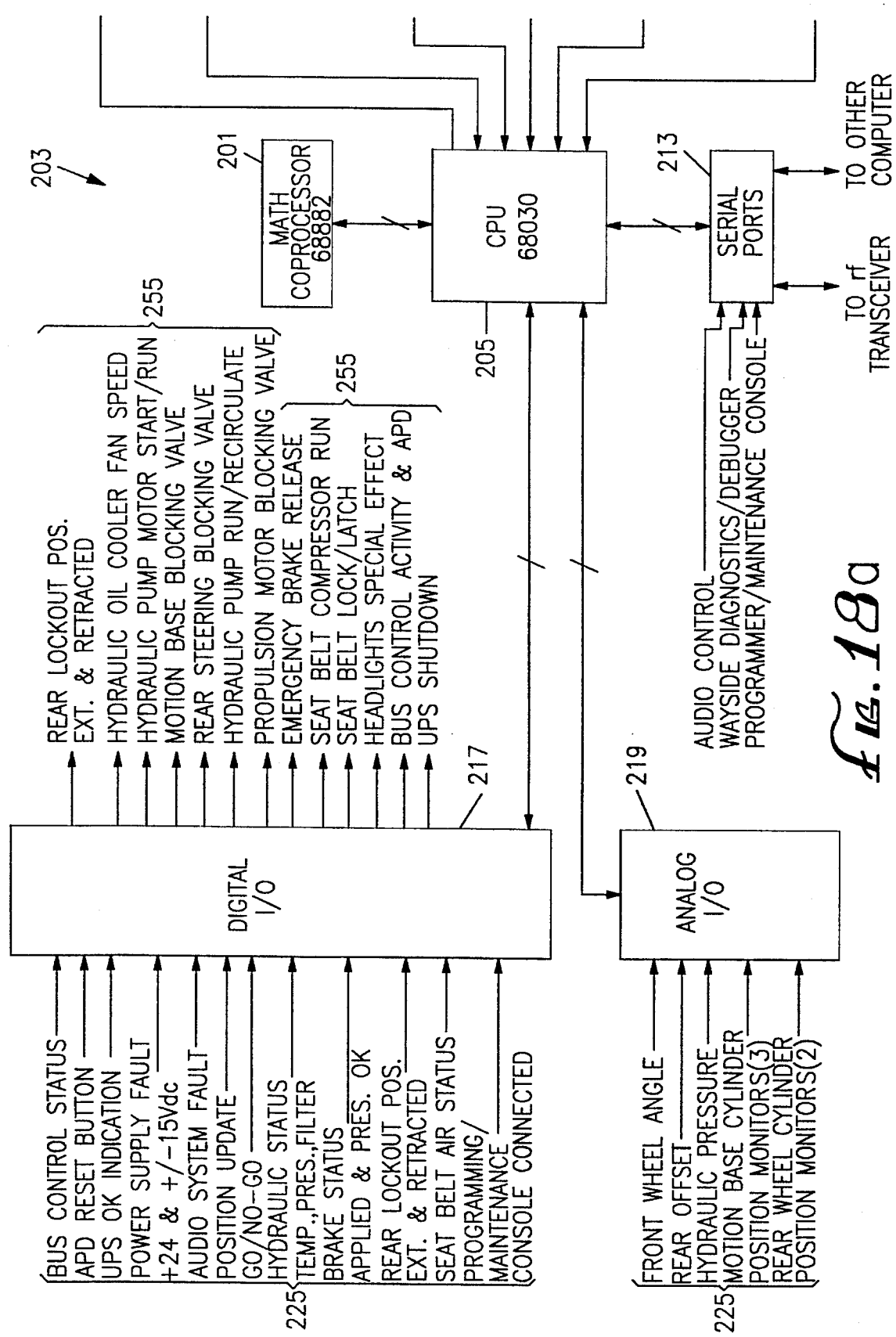

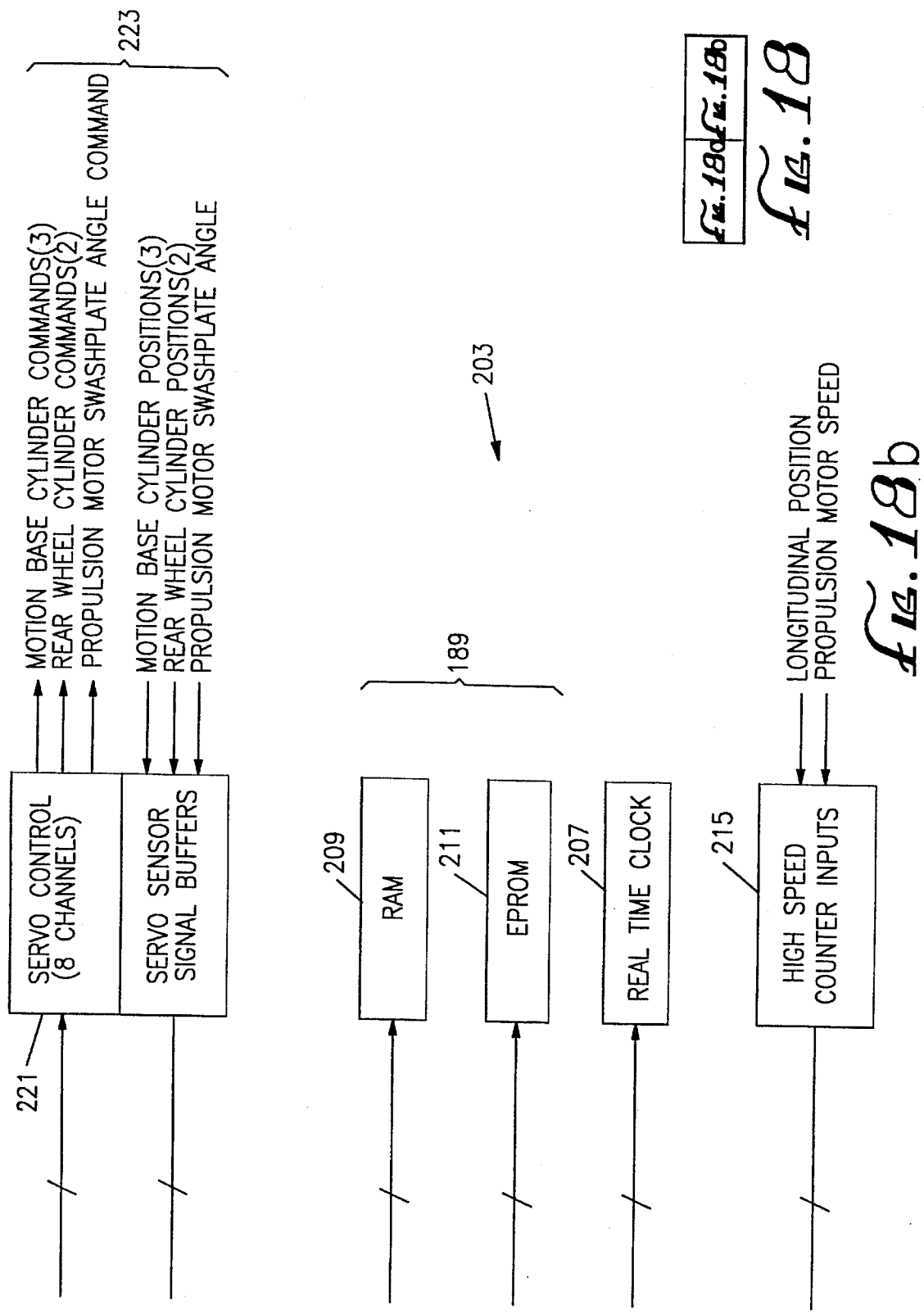

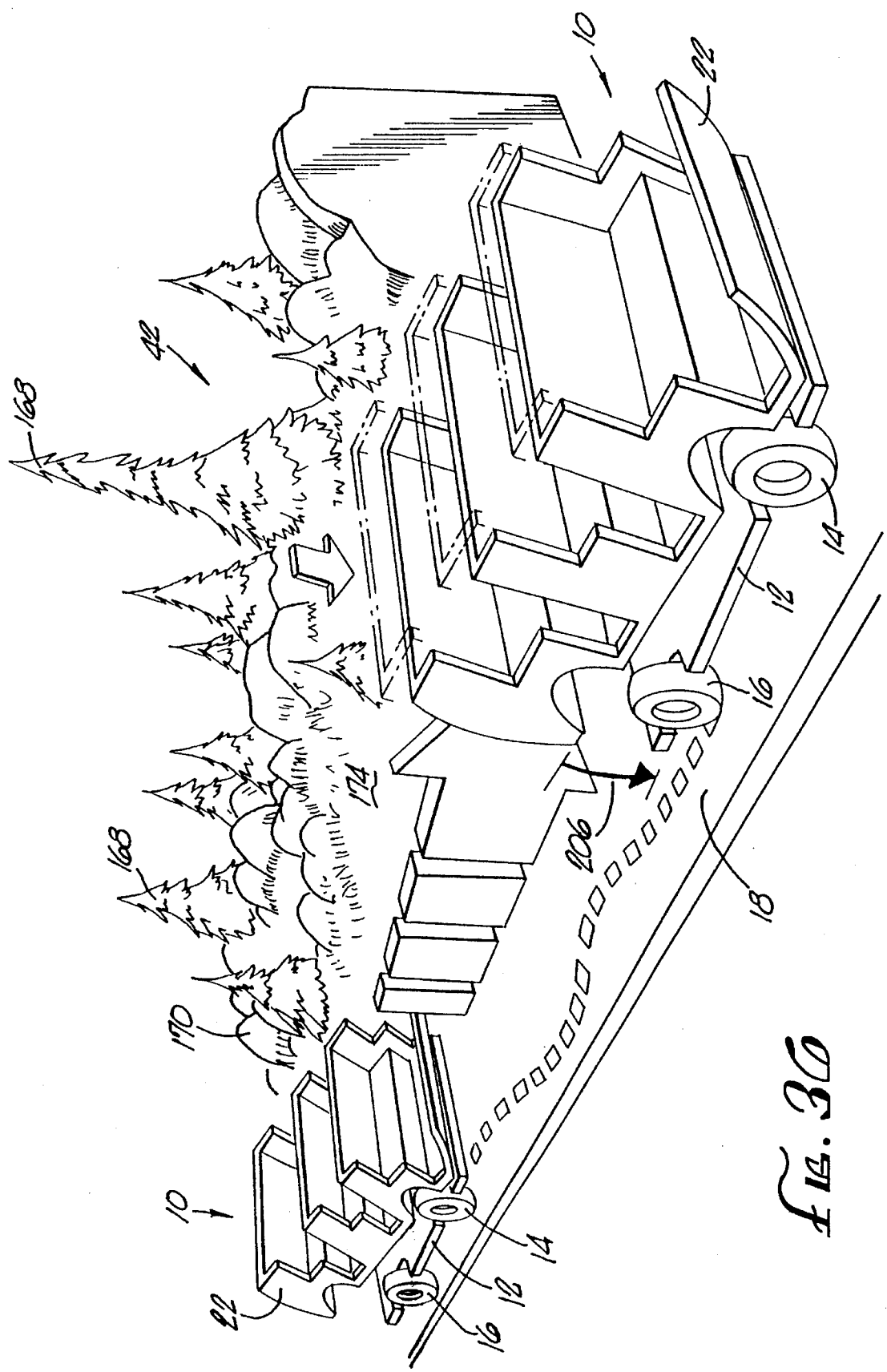

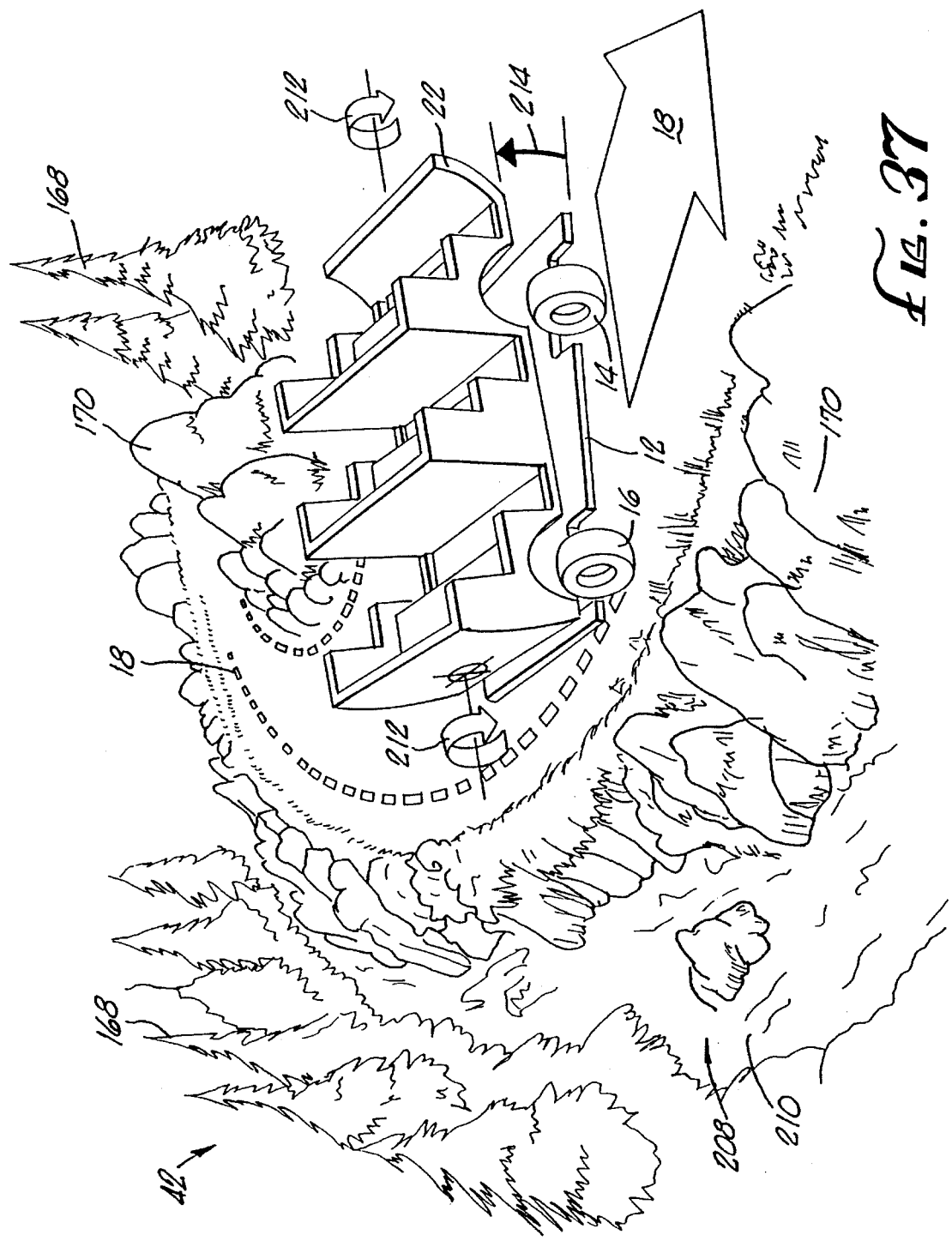

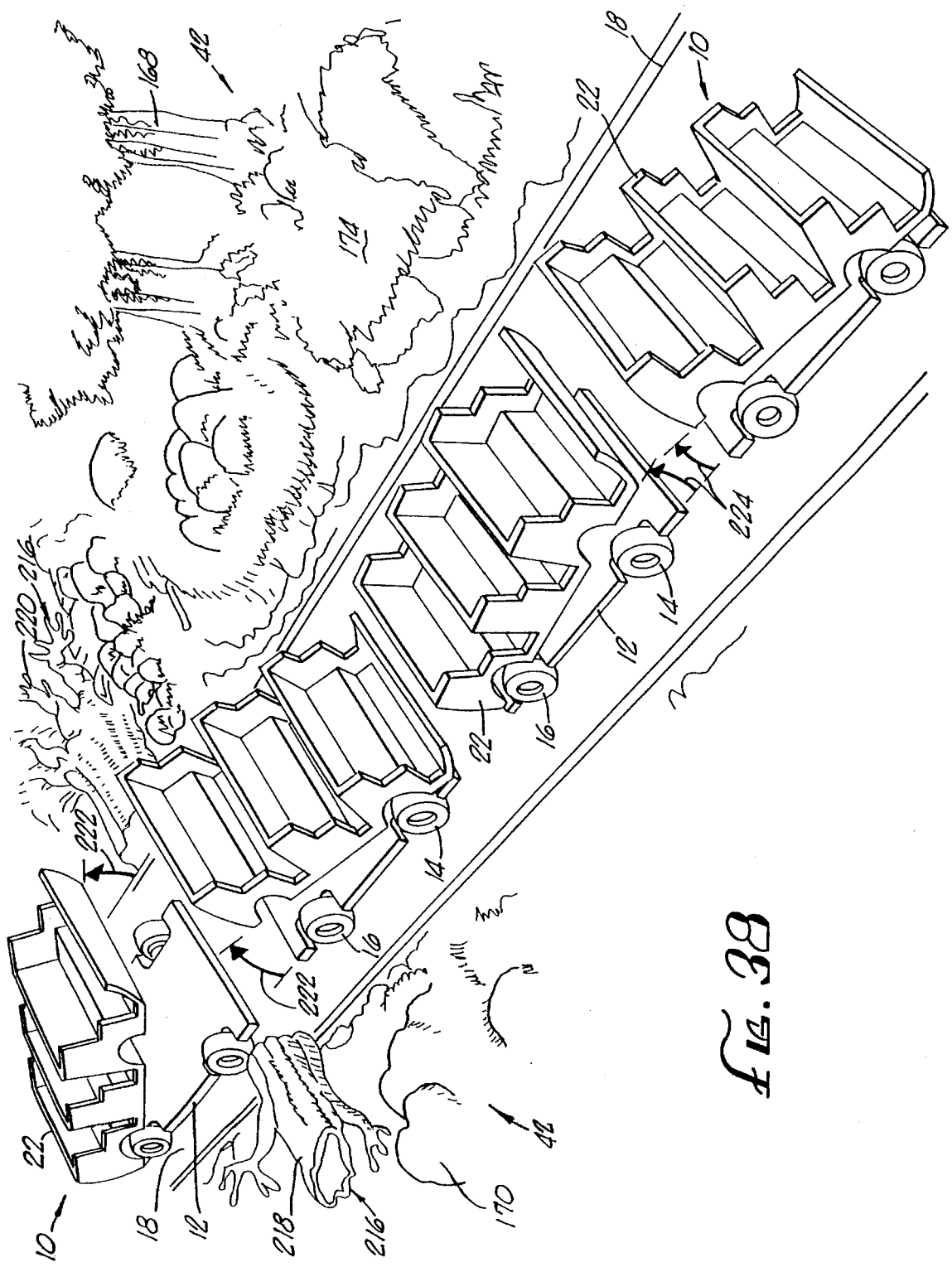

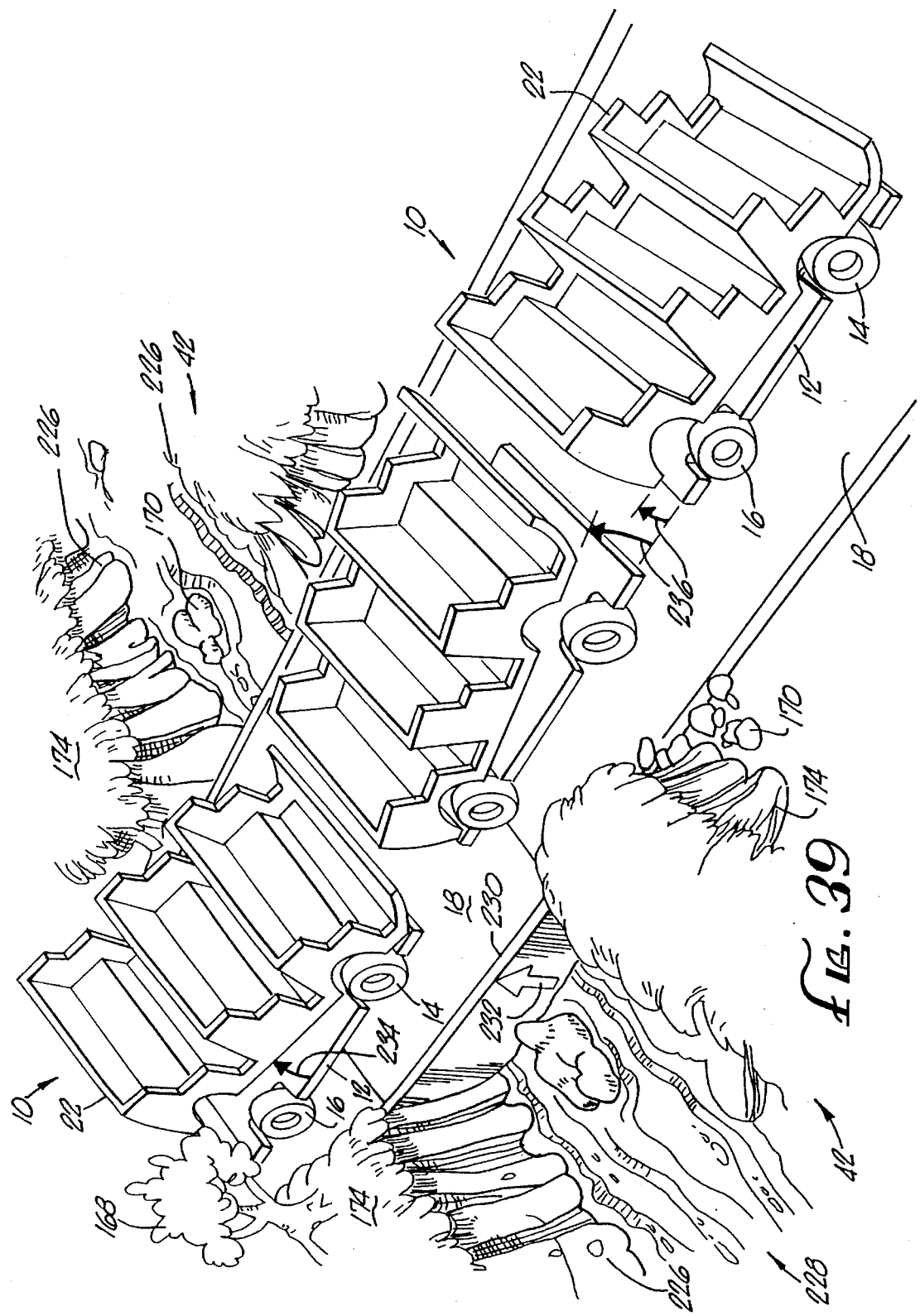

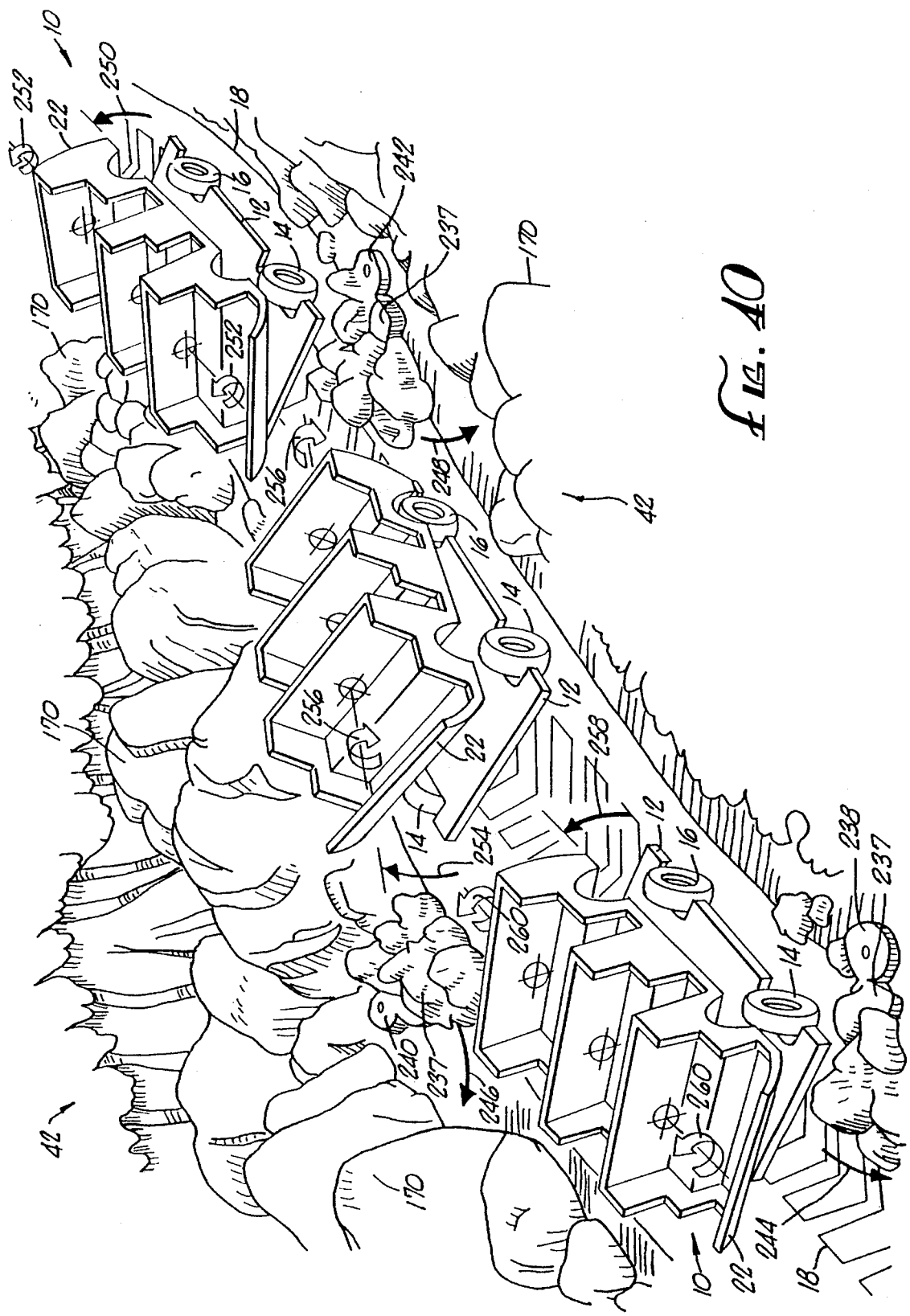

fig. 55

| MODE SELECT | | |
|---|---|---|
| PROGRAMMING MODE | POSITION-BASED | VELOCITY | PROGRAM PLAYBACK |
| PROGRAMMING START | MANUAL START | FRONT | PLAY PLAY |
| PROGRAMMING END | MANUAL END | REAR | PLAY PLAY |
| | | BASE-A | PLAY PLAY |
| PLAYBACK MODE | NORMAL | BASE-B | PLAY PLAY MUTE |
| PLAYBACK CUES | OFF | BASE-C | PLAY PLAY PLAY |
| ZONE STALLS | OFF | FEED FORWARD | PLAY PLAY RECORD |
| | | | TUNE |
| AUTO PROGRAM FROM | 0 THRU 0 | SELECTED TB 0 | |

POSITION:     0.0          0>>                    MODE:                            <<25
VELOCITY:     0.0

STEERING:     0   1400>>
PROPULSION:   0   1400>>                                                           <<3000
                                                                                   <<3000

FRONT: 0.00    REAR : 0.00      BASE: 0.00              0.00
                                                    MESSAGES
F-1    F-2    F-3    F-4    F-5    F-6    F-7    F-8    F-9    F-10
                                                              DONE

PROGRAMMING DEVICE AND METHOD FOR CONTROLLING RIDE VEHICLES IN AN AMUSEMENT ATTRACTION

This invention relates to an electronic control system, and more particularly, to a computer control system that controls each ride vehicle as it follows a path in an amusement attraction.

BACKGROUND

Ride vehicles have been a common form of entertainment for decades in amusement parks and attractions all across the country. These ride vehicles take many forms, including the forms of cars, trucks, boats, trains, spaceships, tour busses, safari vehicles, roller coaster vehicles, etc. Often, the ride vehicles may be designed to enhance a particular theme and be accompanied with intricately-designed sets that surround a path that the ride vehicles follow. In some theme parks, such as Disneyland Park,™ in California, and the Magic Kingdom Walt Disney World Park,™ in Florida, the passengers may experience a fairy tale, action adventure or other story as the ride vehicle travels through the attraction, for example, as found in the famous Pirates of the Caribbean™ attraction, of those theme parks.

A typical form of ride vehicle comprises a passenger seating area for one or more passengers, wherein the ride vehicle generally follows a fixed path, usually in the form of a track, rail system or the like. In some cases, the passenger is allowed to take a minor role in directing the lateral travel of the vehicle by steering it within a defined range along a fixed path, and by controlling its rate of speed. In other cases, a vehicle operator directs the vehicle, as typically found in safari parks and in tours of film studios. In other cases, the passenger assumes a passive role while the ride vehicle strictly follows a fixed path at a predetermined, or sometimes variable, rate of speed.

Since these ride vehicles move through an attraction that covers a great area, and space in amusement attractions is often at a premium, and it is desirable to operate a plurality of ride vehicles simultaneously, to accommodate a large number of would-be passengers and avoid lines. Thus, many rides, including roller coasters, flumed log rides, visual tours and the like, typically operate a large number of ride vehicles at one time, with staggered the departure of adjacent ride vehicles along their closed-loop path. This method of operation has created the need for control systems that are designed to ensure against ride vehicle collision. Electronic and other vehicle motion control systems are often employed to regulate power to ride vehicle drive mechanisms, or to control path-mounted brake mechanisms that regulate the spacing between ride vehicles.

For example, many roller coasters and log flume rides typically elevate each ride vehicle, which is thereafter motivated along the associated path by the force of gravity. The control systems of these rides may use path-mounted sensors, or alternatively, human operators positioned along the path, to control brake mechanisms to maintain vehicle spacing. Other attractions use a plurality of platen drives, having a wheel or other path-mounted drive element that contacts a platen of each ride vehicle, to drive the ride vehicles at all locations along the path. In these systems, electronic control systems which are external to the vehicle directly control vehicle speed, and there are typically no electronics or speed devices aboard any of the vehicles.

In other vehicles, individual electric motors or other propulsion are used to drive ride vehicles, frequently without the necessity of having an operator stationed in each vehicle. In these ride vehicles, electric power is supplied through a power bus, mounted adjacent to the path, which the ride vehicle taps and uses to operate its motor. A central controller is used to monitor the proximity of vehicles and shut-off power to a particular zone, or section of the path, having a ride vehicle that is closely spaced to a predecessor, or during an emergency condition.

Ride vehicles of the type described above have proven to be quite successful and provide a wide range of different experiences. However, they are not without certain recognized limitations, a principle limitation being the safety of the passengers. For example, a passenger's sensation of vehicle motion is generally dictated by the velocity of the vehicle and the shape or contour of the path followed. Thus, in order to give the passenger the sensation that the vehicle is accelerating rapidly or turning a sharp corner very fast, the vehicle must itself actually accelerate rapidly or turn a sharp corner very fast. Such rapid accelerations and sharp turns at fast speeds, however, may expose the passengers to undesirable safety risks. Additionally, control systems used to regulate a plurality of such ride vehicles often require manual operation, or generally operate control systems external to the ride vehicles to arrest motion.

Another well known limitation of ride vehicles of the type described above is that they generally follow a singular, predetermined path throughout the attraction. As a result, the passenger is left with little or no versatility in the ride experience. Moreover, since the vehicle follows only one path throughout the attraction, the passenger is exposed to the same ride experience each time. Generally, this leaves the passenger with less incentive to ride the attraction more than once, since the ride experience will be the same each time. The time and expense associated with changing the ride experience, either by altering the vehicle path or replacing the ride scenery, usually are prohibitive.

In recent years, simulators have been used to simulate vehicle motion, and are typically operated entirely within a room or other enclosed area. These motion simulators generally comprise a passenger seating area that is articulated by a platform-mounted motion base. The platform is fixed and does not move; rather, motion is imparted to the passenger seating area by multiple actuators, which form a part of the motion base. In use, passengers seated in the passenger seating area are typically shown a motion picture film that corresponds to a pre-determined pattern of vehicle travel. This motion picture film presents images in the same manner that one seated within an actual moving vehicle would see those images, and induces the passengers within the room to believe that they too are in a moving vehicle. To create this effect, the motion base articulates the passenger seating area in appropriate directions to actually impart gravity and other forces to the passengers, in exact synchronization with particular visual images projected from the film. For example, when the sensation of acceleration is required, the passenger seating area is slowly pitched backward, practically undetectably, and then just as the motion picture film imparts the impression of acceleration, rapidly pitched forward (through rotational acceleration) to a level position. When the sensation of turning a corner is required, the passenger seating area is undetectably rolled to one side and then back to a level position during the course of the simulated turn, in cooperation with the film's depiction of an actual "turn." Other vehicle motion sensations can be simulated using appropriately projected visual images and synchronized articulated motion of the passenger seating area. Thus, passengers can be made to experience motion as if they were in a moving vehicle without ever leaving the room, and without the need of a control system that governs a plurality of simulators. One well-known simulator that has been used successfully for years is the so-called "Star Tours"™ attraction at Disneyland Park™ in Anaheim, Calif.

The precision of the articulation and timing in a simulator ride is acute, and often requires the use of a computer to control the movements of the motion base. Typically, a number of electronically-controlled, piston-type actuators of the motion base support the passenger seating area with respect to the platform. When supplied with a variable amount of power, each of these actuators is hydraulically stroked in a controlled amount that varies in dependance upon the amount of power. Using a plurality of actuators, therefore, the passenger seating area can be articulated to supply the motions of vertical lift, side-to-side movement, front-to-back movement, roll, tilt and yaw and any combination of these motions.

To synchronize the presentation of the projected images with articulation of the passenger seating area, the computer is programmed with a sequence of data, each event in the sequence defining a particular attitude of the passenger seating area with respect to the platform. Furthermore, this sequence of events is indexed to the start of the film (motion picture film is driven at a constant rate of 24 frames per second), such that articulation of the passenger seating area is properly synchronized with the sense of motion in the projected images. Accordingly, to generate a particular, preconceived ride experience, the film must first be created, after which programmers experiment with articulation of the motion base to derive and index ideal motions to a particular time or frame of the motion picture film.

While simulators of the type described above have come a long way to provide more dynamic and enhanced sensations of simulated vehicle movement, such simulators are not true vehicles and still do not actually move the passenger through an attraction. Instead, the simulator remains in a fixed position while the passenger seating area tilts in various directions corresponding to the simulated path of travel shown by the film. Therefore, the passenger does not actually travel through live scenery and props, which might otherwise pass by the passenger if the vehicle were to physically travel through a live attraction. Motion picture film, no matter how realistic, present a two-dimensional image that does not accurately recreate the impression that an actual three-dimensional object produces. Thus, the more conventional ride vehicles present the relative advantage that they do move and do encounter actual objects, sets, animals, and environments, that impart a vivid, three-dimensional impression upon the passengers, and the ride experience of these prior simulators is limited. Furthermore, simulators also are limited in the sense that the passenger must usually look forward toward the screen upon which the motion picture film is shown, in order to obtain and maximize the ride experience. Thus, the effect of being in a moving vehicle is limited by the fact that passengers cannot look sideways, or behind the vehicle.

In addition, unless the motion picture film used in a simulator attraction is occasionally changed, and the motion pattern of the simulator reprogrammed to produce movement corresponding to a new motion picture film, which, as explained above, is an expensive and labor intensive undertaking, then the passengers will be exposed to the same ride experience each time they visit the attraction. Therefore, like the conventional ride vehicles described above, there is generally less incentive for the passenger to repeatedly ride a simulator-ride, as the ride experience will be the same each time.

Accordingly, there has existed a need for a ride vehicle that enhances the sensation of the vehicle's motion and travel experienced by passengers as the ride vehicle itself physically moves through an actual, three-dimensional attraction. For such a ride vehicle, there also exists a corresponding need to utilize a plurality of such ride vehicles at any one particular time, and a method of ensuring that they may be safely operated and controlled. Finally, there exists a need to have a simulator-type attraction which may be readily implemented in a multitude of environments, and which therefore can readily and inexpensively provide a multitude of ride experiences. The current invention solves these needs and provides further, related advantages.

SUMMARY OF THE INVENTION

The present invention presents a dynamic ride vehicle that moves through an attraction and uses an electronic control system to generate and use ride programs to synchronize simulator-articulation of a passenger supporting structure to what passengers actually see. Thus, simulator motion is coordinated to vehicle movements and the actions of three-dimensional objects which are external to the vehicle. Using the principles of this invention, therefore, the disadvantages of the prior art may be overcome, and a relatively slow-moving vehicle used to create a wide range of sensations, including that of a fast moving vehicle. Further, since the preferred ride vehicle, discussed below, is programmable, the ride vehicle may be readily adapted to a wide range of different attractions or effects.

In one form of the invention, the electronic control system of the ride vehicle controls actuation of a motion base according to specific control data, where the actuation is synchronized with position of the ride vehicle with respect to the path. In this regard, "position" may be taken to include an elapsed time, distance, localized presence of predefined surroundings or a predefined motion pattern of the ride vehicle. The control data is stored in a programmable memory that stores a sequence of such data, wherein each piece of data is indexed by the position of the vehicle. A computer is coupled to this memory and controls the actuation of the motion base in response to the data in the sequence, to thereby articulate a passenger supporting structure with respect to the ride vehicle. In more particular aspects of this form of the invention, a plurality of alternative ride programs (each including a sequence of control data) may be stored and selected, or one of a plurality of alternative paths that the ride vehicle may follow may be selected.

In another form of the invention, the electronic control system of the ride vehicle controls movement of a passenger supporting structure along a path in an amusement attraction, to control presentation a changing view to the passengers. The amusement attraction has a central controller, that exercises control over the ride vehicles, including the ability to stop the ride vehicles and to enable them to proceed. In this form of the invention, the electronic control system includes a programmable memory that stores a plurality of sequences of data that each define different sequences of motion of the passenger supporting structure in relation to the path, a computer mounted within the ride vehicle and controlling the motion of the passenger supporting structure in response to one of the sequences, and wherein the central controller communicates selection information to each ride vehicle, to cause the computer of each ride vehicle to select a single sequence of data to present the passengers with a variable ride experience. This form of the invention contemplates that a motion base may or may not be necessary to provide passengers with different ride experiences, as for example, where vehicle motion or a vehicle path may be variously selected for each vehicle in the amusement attraction by the central controller. In more particular aspects of this form of the invention, the central controller communicates with each ride vehicle using radio frequency, infrared transmitters, digital communication carried by a bus bar, or digital communication modulated through the power supply.

Yet another form of the invention features an electronic control system for a ride vehicle that moves along a path, wherein the control system has a memory that stores a sequence of data that defines operation of each mechanical element, during each event in the sequence of events. In addition, the electronic control system includes a motion computer having software that causes it to (1) determine vehicle position with respect to the path, (2) access the memory to obtain motion data for an event associated with instantaneous or upcoming position, and (3) actuate the mechanical elements in accordance with the motion data, to sequence actions of the mechanical elements with each other and the vehicle's position and movement along the path. "Mechanical element" refers to any device that is actuated to contribute to the passengers' ride experience, for example, vehicle velocity, or vehicle steering, or even audio. In this regard, the invention applies to any ride vehicle having at least one mechanical element that is actuated in accordance with program instructions that are dependent upon where the vehicle is, in terms of time, position or surroundings. In more particular aspects of this form of the invention, two computers may be included upon each vehicle that are redundant in operation, one for controlling the vehicle, and one not connected to vehicle controls, wherein both computers monitor vehicle response to provide a failsafe.

In another form of the invention, the electronic control system for the ride vehicle includes two computers, each having a memory that stores the sequence of data, actuators that actuate each mechanical element, including a motion base, wherein at one computer controls the actuators and the other computer monitors sensors of each mechanical element to measure proper vehicle response. In more particular aspects of this form of the invention, both computers monitor the response of the actuators.

In still another form of the invention, the electronic control system controls the entire attraction and includes a central controller remotely located from each of the ride vehicles and having a central transceiver, and a motion computer mounted in each ride vehicle. Each motion computer has (1) a memory that stores a sequence of motion base data that defines operation of the motion base during each event in a sequence of events, and (2) software that causes the motion computer to (a) determine a position of the ride vehicle with respect to the path, (b) access memory to obtain motion base data for an event associated with position, and (c) actuate the motion base to articulate the passenger supporting structure with respect to the ride vehicle. The electronic control system also includes a transceiver resident in each ride vehicle that effects communication between its corresponding motion computer and the central controller. Again, in more particular aspects of the invention, the electronic control system provides the ability to select one ride program, and its associated data sequence, from among several such ride programs stored in the memory.

In another form of the invention, the electronic control system may govern a plurality of ride vehicles operation within an amusement attraction, where the amusement attraction also has at least one moving show set. Each ride vehicle includes a position sensor that senses the position of the ride vehicle along the path. In addition, each ride vehicle has a computer that receives data from the sensor, accesses memory to retrieve data indexed by the sensed position, and uses that retrieved data to actuate movement of the moving show set in sequence to the position of the ride vehicle.

In still another form of the invention, the electronic control system may include a power bus mounted in a track that the ride vehicle follows, a motor used to drive the ride vehicle, a central controller that controls the supply of power to the power bus, and a computer aboard each ride vehicle that is in digital communication with the central controller. The vehicle's computer monitors status of the ride vehicle and, in addition, maintains a switch that gates electric power to the ride vehicle, including the motor. In this manner, when the vehicle computer determines that an emergency condition has developed within the particular ride vehicle, it may so inform said central controller by digital communication, which then may shut-off power in the power bus, at least in the vicinity of the particular ride vehicle.

The invention in another form also contemplates a central controller and a special programming console for use with ride vehicles. The central controller includes (1) a central computer having a monitor, (2) a receiver coupled the central computer, to receive digital communications from each ride vehicle, (3) a power control device that is selectively actuated by said central computer to remove power from at least a portion of the path. The central controller thereby stops ride vehicles travelling in the portion. In addition, the central controller is adapted to keep tabs on, and display, status messages from the vehicles.

The electronic programming device used to program the ride vehicles with at least one ride program includes (1) a plurality of controls having control signal outputs that control actuation of corresponding mechanical elements, (2) a coupling that connects to device to the controls of the ride vehicle, (3) a computer having a monitor, memory and software, that receives the control signal outputs, modifies them to derive the actuation signals, and sends them to the coupling, (4) wherein the memory stores sequences of data in parallel tracks, at least one track corresponding to each mechanical element, and (5) wherein software modifies the signals from the controls by one of passing prerecorded data tracks as actuation signals (an not passing the control signal), or generating actuation signals in at least partial dependence upon both the controls and prerecorded data, and selectively records either the generated, actuation signals or response signals provided by sensors of the mechanical elements.

The present invention also provides a number of methods of controlling and programming the ride vehicles of an amusement attraction. These methods, in their various forms, are summarized below.

One method according to the present invention includes the steps of (1) programming a ride memory to store a sequence of data, which represents articulation of a passenger supporting structure with respect to the ride vehicle, and (2) using a computer to control actuation of a motion base in response to the sequence of data, to thereby cause predefined articulation of the passenger supporting structure with respect to the ride vehicle. In this regard, the predefined articulation of the passenger supporting structure is synchronized to a position of the ride vehicle, to thereby create, negate, enhance or diminish actual sensations experience by the passengers otherwise caused by the location or motion of the vehicle.

In another method, the present invention is in the form of controlling each one of a plurality of ride vehicles in an amusement attraction by (1) programming a memory of each vehicle to store a plurality of sequences of data that define different sequences of motion of a passenger supporting structure of the vehicle in relation to the path, (2) using a computer of each vehicle to control motion of the passenger supporting structure, to thereby cause predefined articulation of the passenger supporting structure with respect to the vehicle, and (3) providing a selection input to the computer to cause it to select one sequence of data, corresponding to a particular ride experience to be provided to the passengers.

In still another form, the present invention provides a method of controlling a ride vehicle that moves along a path, thereby presenting a changing view of surroundings to passengers of the ride vehicle as they move along the path, by (1) determining a position of the ride vehicle with respect to the path, the position defined by at least one of an elapsed time and distance, (2) accessing the memory, using the computer and the position as an index, to obtain particular data for an event associated with the position of the ride vehicle along the path, and (3) actuating at least one mechanical element in accordance with the particular data to effectuate the event associated with the position of the ride vehicle.

In another form of the present invention, the method includes the step of using a motion computer to retrieve from memory particular data, from among a sequence of data that defines operation of mechanical elements during each event in a sequence of events. The motion computer is then used to control actuation of each mechanical element in accordance with the retrieved data. Simultaneously, a second, monitoring computer also retrieves from memory the same data but does not itself control actuation of the mechanical elements. Rather, it receives actuation response signals from each sensor, and monitors performance of the actuators in accordance with the sequence of data, to ascertain fault conditions as they arise.

The present invention also provides a method of controlling a plurality of amusement ride vehicles by moving each vehicle along the path, monitoring the status of the mechanical elements, on-board each ride vehicle, converting the response signals from sensors associated with the mechanical elements to digital data, and using the computer to compose digital status information indicative of ride vehicle status. These status messages are formulated by the computer, for at least fault conditions, and are periodically transmitted to a central controller, which thereby monitors the status of each vehicle active in the attraction.

Finally, the present invention also provides a method of programming a programmable ride vehicle, including a number of interactive steps. One first moves the ride vehicle along the path, simultaneously actuating at least one mechanical element. As mentioned before, this mechanical element may be any one or more of velocity, audio, steering, motion base actuation, etc. Second, one records either actuation signals or response signals corresponding to the mechanical element, to thereby record its actions. The position of the vehicle along the path is used to index these recorded actions, and to create a data file, including a sequence of the recorded actions of the mechanical element. Third, one removes the data file to an off-line editor and generates curvilinear representations that indicate the state of the mechanical element as a function of vehicle position. The off-line editor is then employed to smooth and selectively alter the curvilinear representations of actuator motion, to thereby generate the output file that will be used by the computer of the ride vehicle to replay recorded, edited actions of the mechanical element. Lastly, the finished output file is loaded into the programmable memory of a ride vehicle, such that the output file it may be accessed by the vehicle.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 8 is a top plan view of a bogie for use in guiding the ride vehicle along a track or path.

FIG. 9 is a front elevational view of the bogie.

FIG. 10 is a side elevational view of the bogie.

FIG. 14 is a rear perspective view of the essential details of the rear steering mechanism.

FIG. 15 is a cross-sectional plan view of the ride vehicle illustrating the lateral energy absorbing system operating in a first mode to confine the range of lateral motion of the vehicle with respect to the track to a first distance.

FIG. 16 is another cross-sectional plan view of the ride vehicle illustrating the lateral energy absorbing system operating in a second mode to confine the range of lateral motion of the vehicle with respect to the track to a second distance.

FIG. 17 is a block diagram of the hydraulic system used to operate the motion apparatus, rear steering mechanism and other components of the vehicle.

FIG. 18 is a composite drawing consisting of FIGS. 18A and 18B which together form a block diagram showing the architecture and wiring of a computer control system that controls various vehicle functions.

FIG. 36 is a perspective view of the ride vehicle as it moves through an attraction, in which forward body pitch and other effects are used to exaggerate the effect of sudden deceleration of the vehicle.

FIG. 37 is a perspective view of the ride vehicle as it moves through an attraction, in which four-wheel steering in combination with outward body roll, rearward body pitch and other effects are used to simulate the effect of sliding off the edge of a road while in a turn.

FIG. 38 is a perspective view of the ride vehicle as it moves through an attraction, in which pitching motion of the body and other effects are used to simulate the effect of driving over a log in the vehicle.

FIG. 39 is a perspective view of the ride vehicle as it moves through an attraction, in which pitching motion of the body and other effects are used to simulate the effect of driving over a ditch in the vehicle.

FIG. 46 is a perspective view of the ride vehicle as it moves through an attraction, in which four-wheel steering and other effects are used to simulate the effect of the vehicle swerving to miss a falling object.

FIG. 55 is a drawing, including alphanumeric indicia, of a menu screen of the computer monitor of the programming console, showing a number of screen layout and a plurality of modes that may be selected for parallel data tracks that direct actuators and other elements of the ride vehicle.

DETAILED DESCRIPTION

Figure 1:
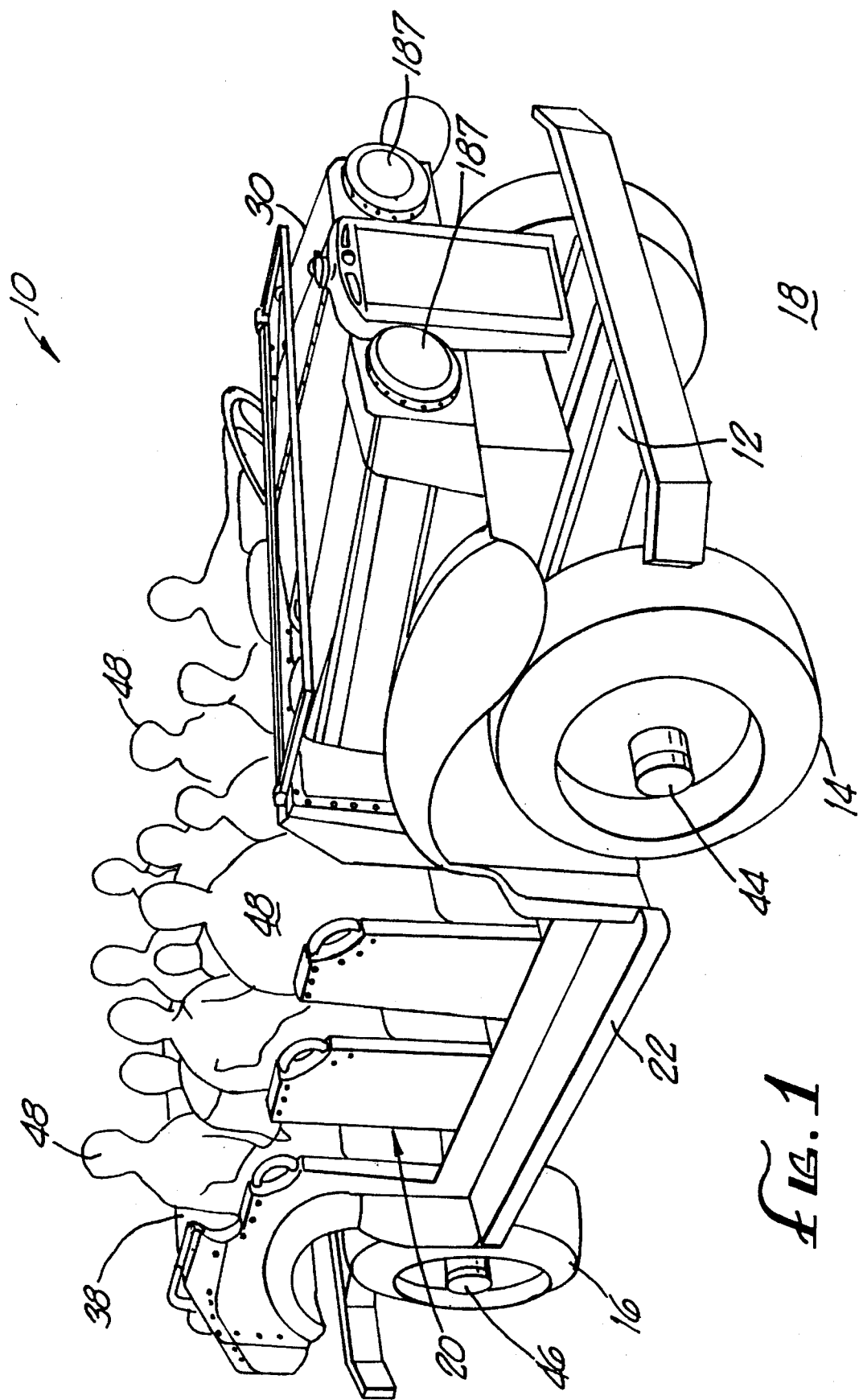
FIG. 1 is a front perspective view of an amusement ride vehicle embodying the novel features of the invention.

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the preferred specific implementations of an electronic control system that is used to control a ride vehicle in an amusement attraction.

The present invention is an electronic control system that is preferably implemented in an amusement attraction to control a plurality of ride vehicles 10 that follow a path 18. These ride vehicles 10 each incorporate a passenger supporting structure 20 and a motion base 24, which articulates the passenger supporting structure with respect to the ride vehicle 10 to present passengers 48 with forces that are synchronized to movement of the ride vehicle.

Thus, unlike the prior art simulator rides, real three-dimensional objects and motion and directional changes are presented to the passengers by movement of the ride vehicle 10. The passenger supporting structure 20 is articulated in synchronism with either vehicle motions or the motions of external show sets, to create forces upon the passengers that convince them, for example, that their speed is faster than actual vehicle speed, or that they are under large gravitational forces, etc. In addition, the motion base 24 can impart motion to convince the passengers that they are on variable terrain, such as cobblestone roads, rivers, or other terrain. All of these effects are obtained by the combined use of the passengers' visual observation of their three-dimensional surroundings with articulation of the motion base 24 synched to vehicle motion and to those surroundings. Preferably, each amusement attraction includes the path 18, scenery including moving show sets and stationary show sets, and a plurality of ride vehicles 10 that each execute one or more different ride programs.

As described for the exemplary, preferred amusement attraction that is set forth below, particular features of the preferred electronic control system include (1) a computerized vehicle-control system 40 aboard each ride vehicle 10 and (2) a central controller that orchestrates the amusement attraction, monitors the operating status and program mode of each of the plurality of ride vehicles, displaying these on a monitor for an operator. The central controller is mounted at a passenger station, where passengers may embark and disembark in the ride vehicle 10, and where the operator may monitor ride vehicle status throughout movement along the path 18. The computerized vehicle-control system 40 of each of the plurality of ride vehicles 10 used in the attraction all interact with the central controller via radio frequency ("rf") communications and a power bus 97, which lies beneath the path of the attraction.

The ride vehicles also interact with (3) a programming console, used for programming the ride vehicle with ride programs and to interact with the central controller, and for maintenance, and (4) moving show sets, or scenery and other devices mounted adjacent to the path 18 as part of the surroundings that interact with the individual ride vehicles 10. As one example of a moving show set, an artificial boulder may be made to move, to present passengers 48 of a particular ride vehicle with the illusion of an earthquake, or other activity. As the computerized vehicle-control system 40 aboard each ride vehicle is programmable, not every ride vehicle need take the same path, nor experience the same activities or moving show sets, and the provision of a computerized vehicle-control system aboard each ride vehicle enables digital communication between ride vehicle and central controller and precise identification of status, position, etc.

Before proceeding to a discussion of the preferred electronic control system that implements the present invention, it will first be helpful to describe the ride vehicle 10 that is the preferred domain of the electronic control system. Configuration And Operation Of A Ride vehicle Modelled As An All-Terrain Off-Road Ride vehicle.

Figure 2:
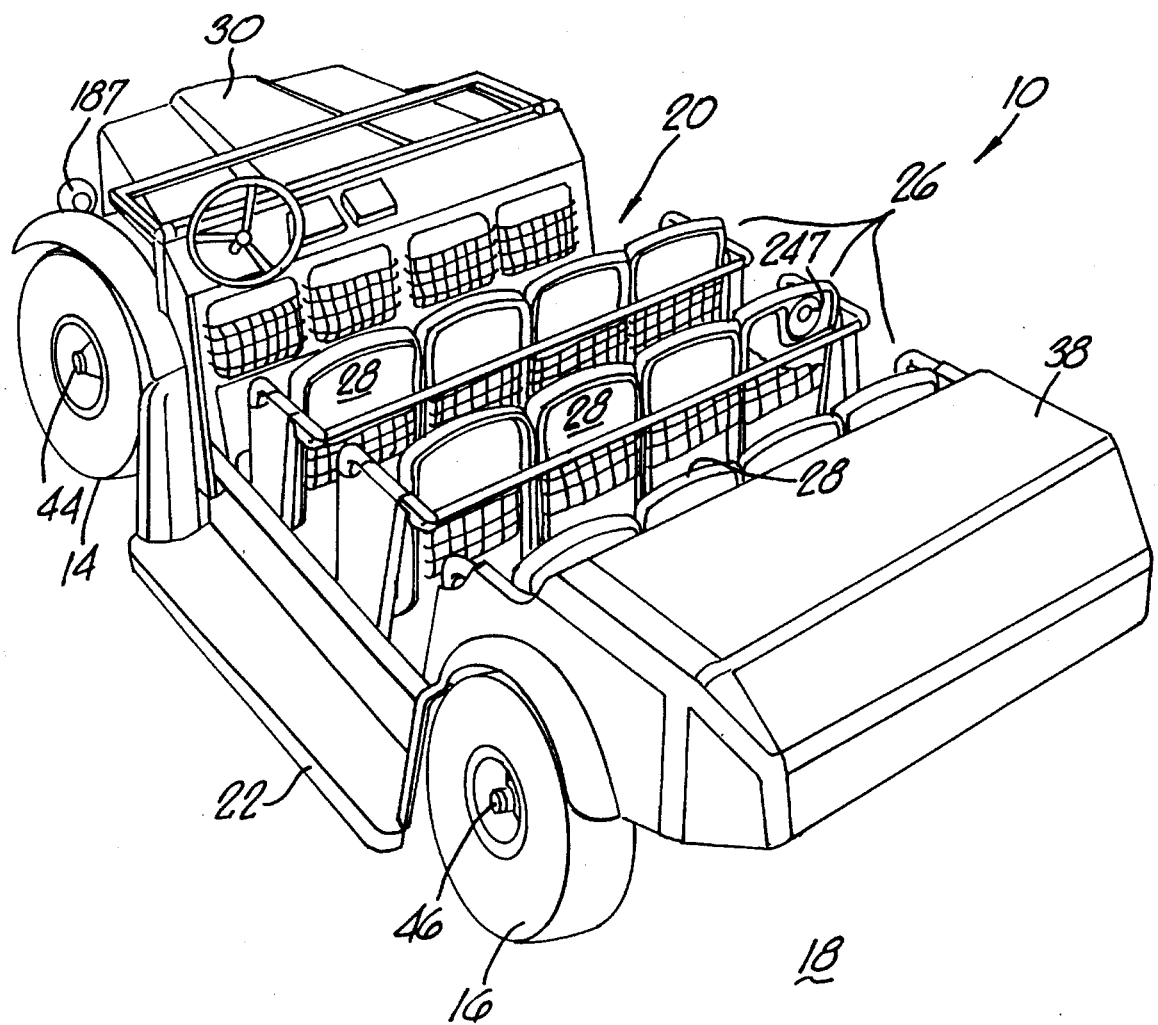
FIG. 2 is a rear perspective view of the ride vehicle.

As seen in FIGS. 1 and 2, the ride vehicle 10 is used to carry passengers and entertain and amuse guests in an amusement park attraction or the like. Although the ride vehicle of the invention may take many forms, including that of a boat, plane, train, spaceship, fantasy ride vehicle, etc., the preferred implementation of the ride vehicle 10 comprises a ride vehicle chassis 12 having front wheels 14 and rear wheels 16 for steering the ride vehicle along the path 18 throughout the attraction. The guests or passengers are seated in a passenger supporting structure 20 in a ride vehicle body 22 connected to the ride vehicle chassis 12. In accordance with the invention, a special motion base 24 supports the passenger supporting structure 20 with respect to the vehicle and selectively imparts motion to the passenger supporting structure in multiple degrees of freedom, independent of any directional motion of the ride vehicle 10 along the path 18. This unique arrangement significantly enhances the sensation of ride vehicle movement experienced by the passengers riding in the ride vehicle 10.

As mentioned, the ride vehicle body 22 can take various forms resembling, for example, an all terrain ride vehicle, a jeep, a car or truck, or various other forms of either on or off-road transportation ride vehicles. The body 22 depicted in the accompanying drawings has been designed to resemble an all terrain-type ride vehicle. It will be understood, however, that various other body shapes may be employed as desired. Therefore, the details of the body exterior will not be discussed further.

The passenger supporting structure 20 includes several rows 26 of seats 28, with four seats in each row. Other seating arrangements can be used depending upon the size and shape of the body 22 and the particular type of ride experiences to be conveyed. Passenger restraints can be provided to restrain the passengers and confine them safely in their seats during ride vehicle motion. A suitable passenger restraint system is disclosed and claimed in U.S. Pat. No. 5,182,836.

The front portion of the body 22 includes a hood 30 which encloses the major power components of the ride vehicle, such as an electric motor 32, a hydraulic power unit 34 and a hydraulic propulsion motor 36. The rear portion of the body 22 includes trunk area 38 enclosing a computerized vehicle-control system 40 and a sound module 41 for generating sounds corresponding to the sounds of the ride vehicle 10 interacting with the path 18, scenery 42 and other props positioned at selected locations in the attraction. Further details regarding the ride vehicle's power components, computerized vehicle-control system 40, sound module 41 and other props are discussed in more detail below.

The ride vehicle chassis 12 has a front axle 44 and a rear axle 46, with the front and rear wheels 14 and 16 connected to the opposite ends of each axle, respectively. Each wheel 14 and 16 is equipped with a suitable tire, such as an inflatable tire or the like. Braking of the ride vehicle 10 is carried out with spring-applied, hydraulic-release disc brakes on all four wheels. If system power fails, spring energy causes the brakes to "fail" on. In one aspect of the preferred ride vehicle, the front wheels 14 and the rear wheels 16 each have a separate steering system which allows the front wheels 14 and the rear wheels 16 to be steered independently of each other. The steering system is capable of providing a yaw axis of motion for the ride vehicle 10. This enables various motion patterns of the ride vehicle 10 not capable with conventional front or rear wheel steering.

In accordance with the preferred ride vehicle, the motion base 24 is integrated into the ride vehicle chassis 12 for imparting motion in multiple degrees of freedom to the passenger supporting structure 20, independently of the motion of the ride vehicle 10 along the path 18. When properly manipulated through an appropriate motion control system, the motion base 24 can raise the passenger supporting structure 20 and tilt it along several axes of motion to substantially enhance the sensation of ride vehicle movement experienced by the passengers 48 riding in the ride vehicle 10. In some situations, motion of the passenger supporting structure 20 with respect to the ride vehicle chassis 12 can be designed to enhance the sensation of ride vehicle movement that is actually taking place. In other situations, such motion can be designed to provide the passengers 48 with a realistic moving ride vehicle experience which is actually not taking place. In the preferred implementation of the ride vehicle, the body 22 is also articulated with the passenger supporting structure 20 with respect to the ride vehicle 10, and in particular, with respect to the ride vehicle chassis 12 of the ride vehicle.

In addition, using sensors which are coupled to specific mechanical elements to determine the extent of their stroke, i.e., rear wheel steering, the motion base 24 can be made to react to ride vehicle motions, as interpreted by the computerized vehicle-control system 40. In the preferred implementation of this ride vehicle 10, however, the mechanical elements that effect the ride experience, including velocity, rear offset of the ride vehicle from center, and the motion base 24 are all controlled by the computerized vehicle-control system 40 in accordance with a selected sequence of data, stored within the computerized vehicle-control system 40.

Figure 3:
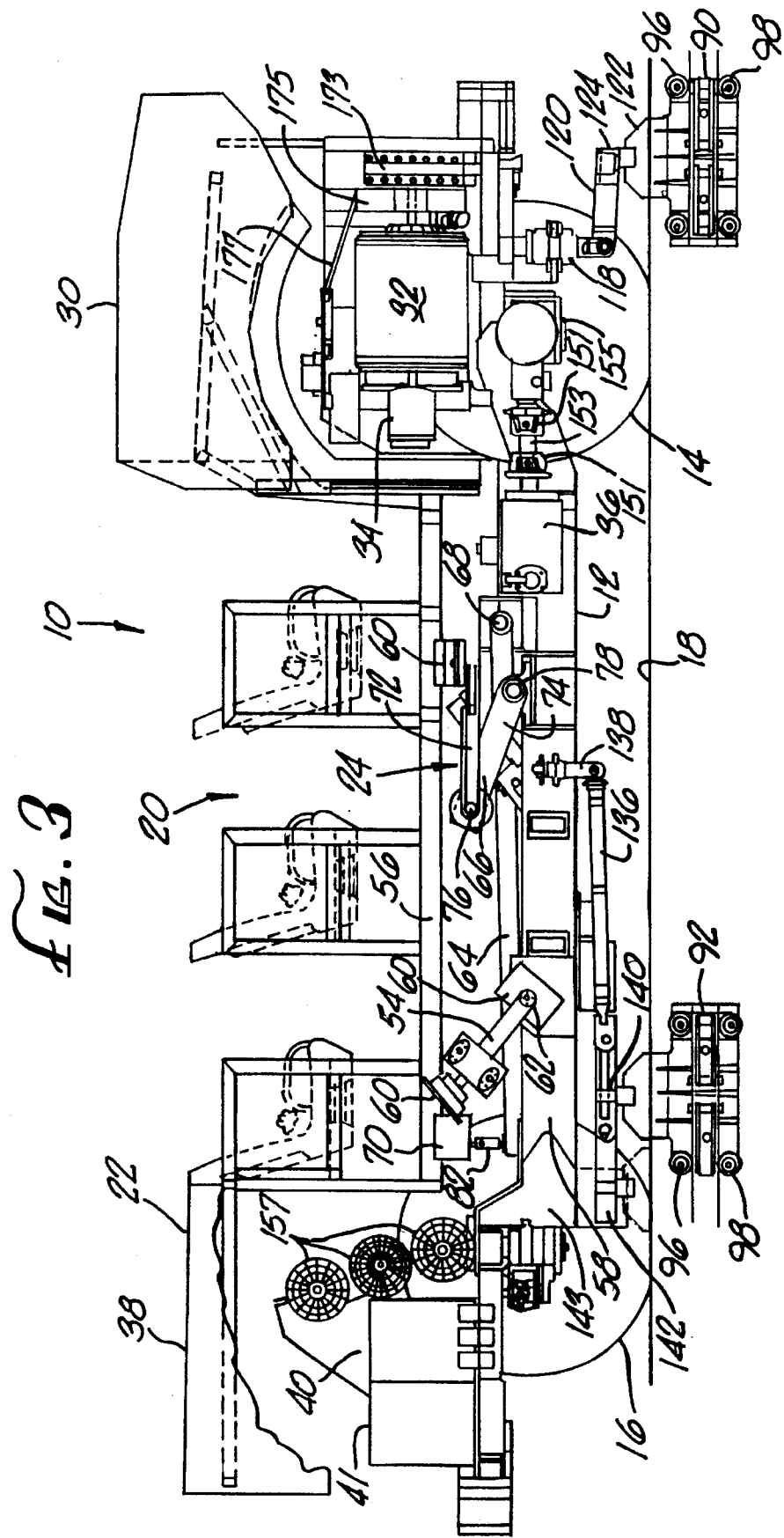
FIG. 3 is a side elevational view of the ride vehicle, partly in cross-section, showing a passenger supporting structure in a normal, horizontal position relative to the vehicle chassis.

One form of the motion base 24 is illustrated in FIGS. 3–7, with various details of the ride vehicle body 22 and ride vehicle chassis 12 having been omitted for purposes of clarity and simplification. This embodiment of the motion base 24 uses three hydraulic servo actuators comprising a front-left motion base servo actuator 50, a right-front motion base servo actuator 52 and a rear motion base servo actuator 54. The motion base 24 also includes a body support platform or frame 56 securely connected to or integrated with the body 22 so as to form the underside of the body 22. All three of the actuators 50, 52 and 54 have their lower ends pivotally connected to a base portion 58 of the ride vehicle chassis 12 by separate mounting brackets 60. Similarly, mounting brackets 60 are also used to pivotally couple the upper ends of the actuators 50, 52 and 54 to the body support frame 56 (i.e., to the passenger supporting structure 20 and the body 22). Each of these brackets 60 is adapted to receive a fastener 62 to secure the actuators 50, 52 and 54 to the mounting brackets 60. As seen in FIG. 3, for example, two of the actuators 50 and 52 in this embodiment are forward mounted and have their upper ends pivotally connected directly to the front portion of the body support frame 56 by separate brackets 60. The third actuator 54 is mounted rearward of the other two and has its upper end pivotally connected to the rear portion of the body support frame 56.

The motion base 24 also comprises two motion control arms comprising an A-arm 64 and a scissors 66. The A-arm 64 preferably is a bolted steel structure, and the scissors 66 preferably is a welded tubular steel frame. As shown best in FIG. 6, the A-arm 64 has its front end pivotally connected by brackets 68 to the front end of the ride vehicle chassis 12 and its rear end pivotally connected by brackets 70 to the rear portion of the body support frame 56 adjacent to the rear motion base servo actuator 54. The scissors 66 comprises a folding linkage in the form of two links. 72 and 74 connected together at a pivot point 76. The lower end of the scissors 66 is pivotally connected by a bracket 78 to the ride vehicle chassis 12 adjacent to the two front motion base servo actuators 50 and 52, and the upper end of the scissors 66 is connected by a bracket 80 to the front portion of the body support frame 56 adjacent to the two front motion base servo actuators 50 and 52. In order to permit rolling motion of the body 22 with respect to the ride vehicle chassis 12, universal joints 82 are employed to connect the body support frame 56 to the rear end of the A-arm 64 and the upper end of the scissors 66.

With the foregoing arrangement, the A-arm 64 is adapted to be pivoted up and down about the pivot points where the A-arm is connected to the ride vehicle chassis 12, while the body support frame 56 is adapted to be rolled from side to side about the pivot points where the frame is connected to the A-arm 64 and scissors 66 by the universal joints 82. This configuration of the motion base 24 allows the body 22 to be rolled from side to side about an imaginary roll axis, pitched forward and backward about an imaginary pitch axis, and elevated up and down with respect to the ride vehicle chassis 12. However, the A-arm 64 constrains longitudinal forward and rearward shifting, lateral side to side shifting and yaw movement of the body 22 with respect to the ride vehicle chassis 12.

It will be appreciated that alternative forms (not shown) of the motion base 24 can be provided. For example, the motion base 24 may comprise six actuators arranged in combinations of two to form a 2+2+2 motion base arrangement. By controlling movement of these actuators, the body 22 may be rolled from side to side, pitched forward and backward and elevated up and down with respect to the ride vehicle chassis, as in the embodiment of the motion base of FIG. 3. Other motion capabilities with these six actuators, however, include longitudinal front and rear shifting, lateral side-to-side shifting and yaw movement of the passenger supporting structure 20 and body 22, with respect to the ride vehicle chassis 12.

Another alternative form of the motion base 24, for example, can include six actuators forming a 3+3 motion base arrangement, with three of the actuators rearward mounted and three forward mounted. This configuration of the motion base 24 allows the body 22 to be rolled from side to side, pitched forward and backward and elevated up and down with respect to the ride vehicle chassis, as in the embodiment of the motion base of FIG. 3. Other movements, however, include longitudinal forward and rearward shifting, lateral side to side shifting and yaw movement of the passenger supporting structure 20 with respect to the ride vehicle chassis 12.

In still another alternative embodiment of the motion base 24, for example, three actuators can be arranged in a 1+2 motion base arrangement, in combination with a Watts linkage, to allow body movement with respect to the ride vehicle chassis 12 similar to that described above in connection with the embodiment of FIG. 3. However, the Watts linkage constrains longitudinal front and rear shifting, lateral side-to-side shifting, and yaw movement of the passenger supporting structure 20 with respect to the ride vehicle chassis 12.

In the preferred configuration of the all-terrain ride vehicle 10, discussed herein, the passenger supporting structure 20 and the body 22 are fixed with respect to one another and are articulated together by the motion base 24. However, one aspect of the present invention encompasses articulation of the passenger supporting structure 20 with respect to the ride vehicle 10, and it should be understood that any reference to articulation of the body 22 is a particular reference to the structure of the preferred embodiment, mentioned just above, where both of the body and the passenger supporting structure are articulated as a single unit. Articulation of the passenger supporting structure 20, with or without the body 22, is a design choice, and both implementations are equivalent and within the scope of the present invention.

FIG. 3 is a side elevational view, partly in cross-section, showing the passenger supporting structure 20 in a normal, horizontal position relative to the ride vehicle chassis 12. In this position, each of the motion base servo actuators 50, 52 and 54 is retracted to a totally collapsed condition such that the ride vehicle 10 appears to resemble any other typical roadway ride vehicle. The motion base 24, including its actuators 50, 52 and 54 and other controls, is adapted to react to a wide range of motion commands, including high accelerations, low velocities, smooth transitions and imperceptible washout to a static condition. The motion base 24 preferably is designed to be interchangeable from one ride vehicle to another, as are all of the other components of the ride vehicle 10 described herein.

The motion base 24 is intended to replicate a broad range of ride vehicle motions during a ride. As explained in more detail below, these motions can be programmed in conjunction with an amusement park attraction to provide a unique ride experience to the passengers 48. Moreover, each ride vehicle 10 is adapted to store more than one such sequence of motion patterns, so that the ride vehicle ride and action is not necessarily the same from one ride to the next. These alternative sequences of data (that create the motion patterns) are programmed and stored by a programmer during the development of an attraction, with the aid of a separate programming console (discussed below). The ride programs are then burned into $E^2PROM$ for subsequent alternative use by the ride vehicles' computerized vehicle-control systems.

When the ride first starts, the passenger supporting structure 20 will be in the fully settled or down position, as shown in FIG. 3, to allow the passengers 48 to unload and load. In this position, the motion base servo actuators 50, 52 and 54 are fully collapsed and the forces of gravity can move the passenger supporting structure 20 and the body 22 to the down position. If desired, the actuators 50, 52 and 54 can be commanded to go to a collapsed condition when it is necessary to quickly move the passenger supporting structure 20 to the down position, such as at the end of the ride.

Figure 4:
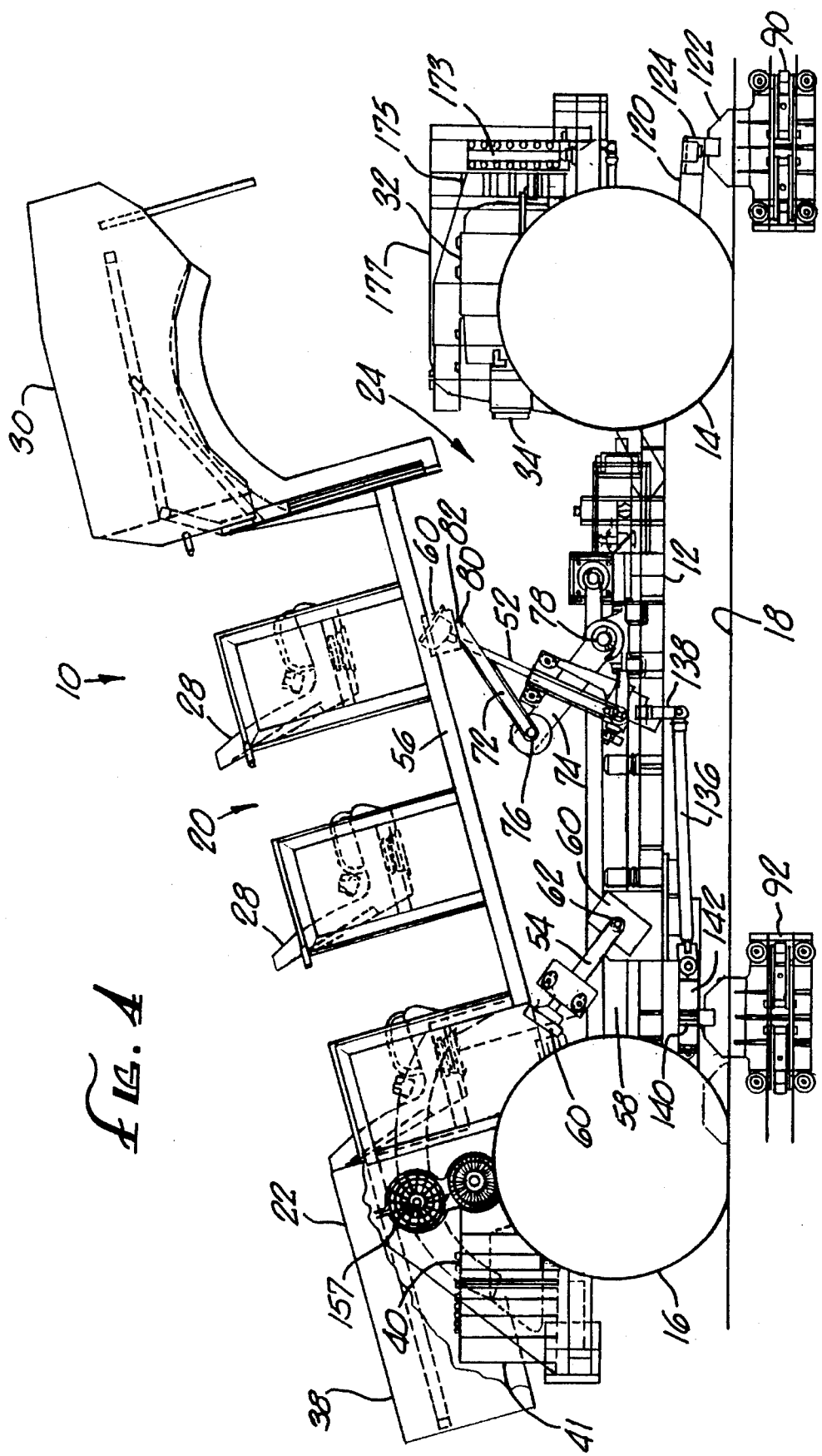
FIG. 4 is another side elevational view of the ride vehicle, similar to FIG. 3, showing the passenger supporting structure pitched rearward with respect to the chassis about a pitch axis.

FIGS. 4–7 show examples of the range of motion of the passenger supporting structure 20 and body 22 with respect to the ride vehicle chassis 12. By using three motion base servo actuators 50, 52 and 54, the motion base 24 is capable of providing motion in three degrees of freedom to provide body movements with respect to the ride vehicle chassis. For example, FIG. 4 shows the passenger supporting structure 20 pitched in a rearward direction about the pitch axis of the ride vehicle 10. The two front actuators 50 and 52 provide movement of the passenger supporting structure 20 in this manner, while the rear actuator 54 is moved only slightly or not at all. Power for movement of the actuators 50, 52 and 54 is derived from the on-board ride vehicle hydraulic system and position sensors 84 on the actuators that provide the position of the passenger supporting structure 20 to the computerized vehicle-control system 40. In the preferred embodiment, these sensors 84 are non-contact, absolute position, magnetostrictive-type sensors that provide a servo signal output, fed to the computerized vehicle-control system, as discussed below. Using the sensors 84, the degree of pitch of the passenger supporting structure 20 with respect to the ride vehicle 10 may be accurately controlled as desired. In the preferred embodiment, the passenger supporting structure 20 and the body 22 can be pitched rearward by as much as 15.9 degrees.

Figure 5:
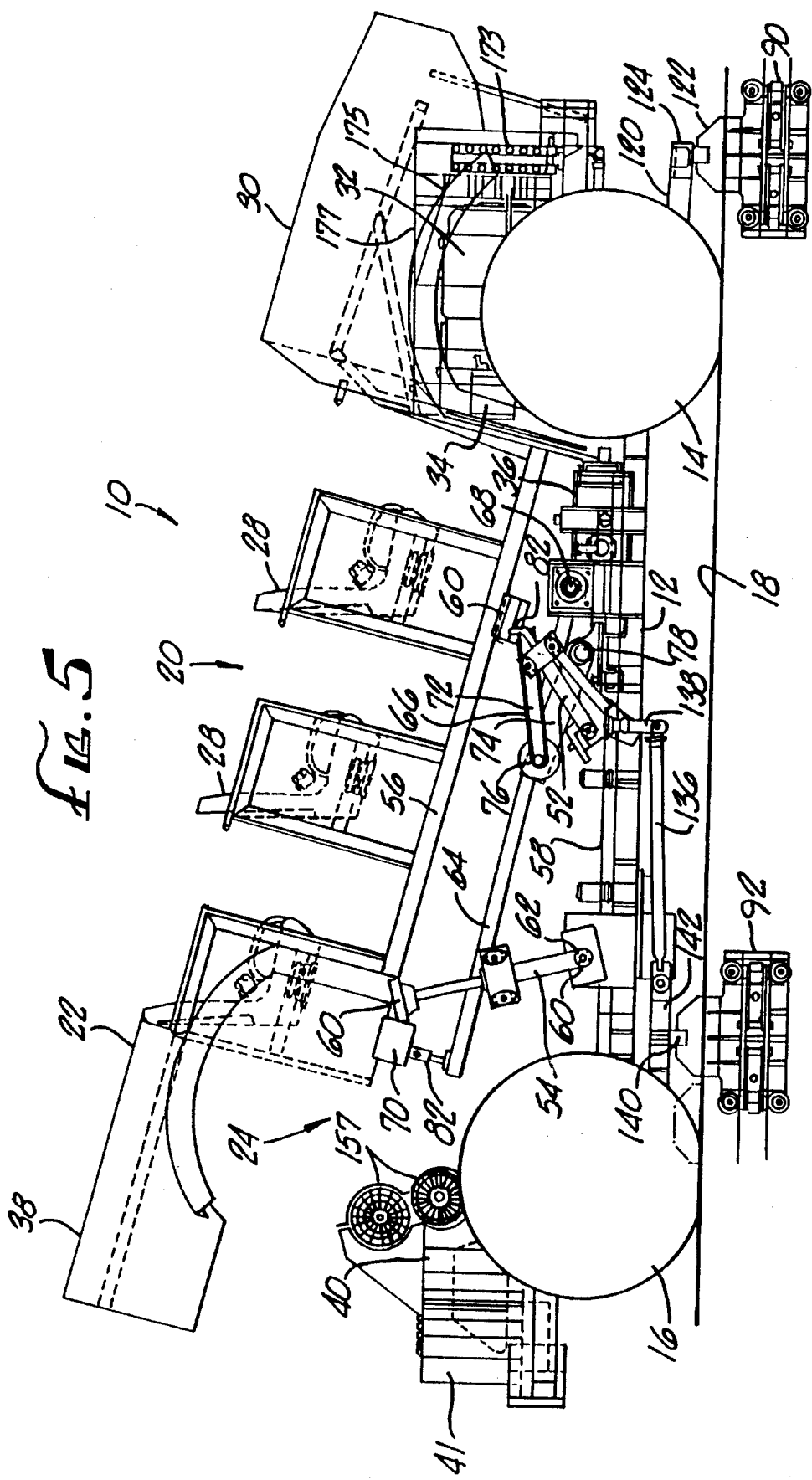
FIG. 5 is another side elevational view of the ride vehicle, similar to FIG. 3, showing the passenger supporting structure pitched forward with respect to the chassis about the pitch axis.

FIG. 5 shows the passenger supporting structure 20 and the body 22 pitched in a forward direction relative to the ride vehicle chassis 12. This pitching motion is achieved by supplying appropriate hydraulic power to the rear actuator 54 to raise the rear end of the body 22, while the two forward actuators 50 and 52 are moved only slightly or not at all. This forward pitching motion of the body 22 with respect to the ride vehicle chassis 12 occurs about the pitch axis of the ride vehicle 10. In the preferred embodiment, the passenger supporting structure 20 and the body 22 can be pitched forward by as much as 14.7 degrees. In both cases of forward or rearward pitching of the body 22, the movement of the actuators 50, 52 and 54 causes either a constant velocity movement or rotational acceleration of the passenger supporting structure 20 and the body 22 with respect to the ride vehicle chassis 12 about the pitch axis.

Figure 6:
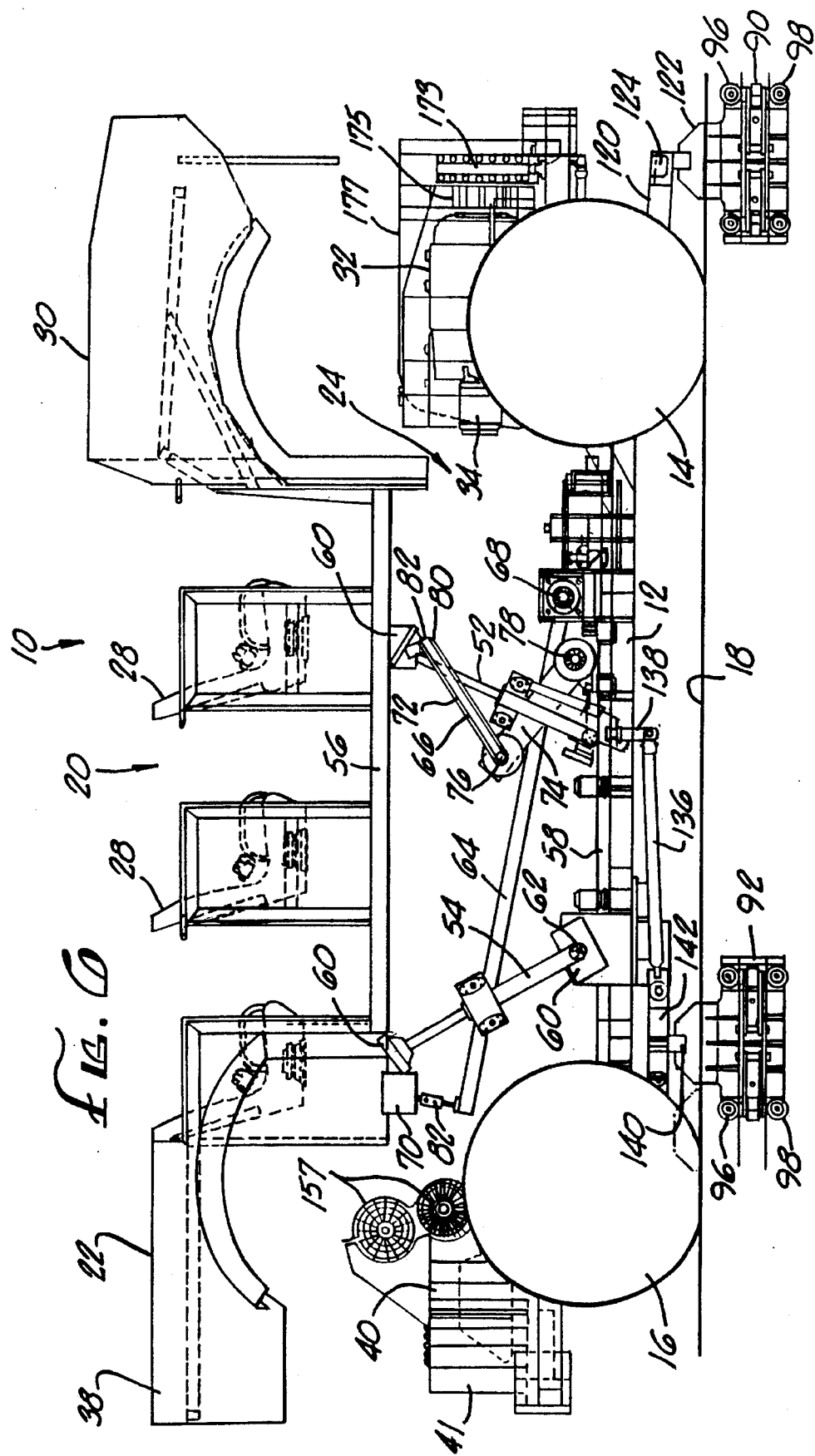
FIG. 6 is another side elevational view of the ride vehicle, similar to FIG. 3, showing the passenger supporting structure in an elevated, horizontal position with respect to the chassis.

FIG. 6 shows all three actuators 50, 52 and 54 in a fully extended position, raising the passenger supporting structure 20 to an elevated, horizontal position with respect to the ride vehicle chassis 12. This is accomplished by supplying appropriate hydraulic power to all three actuators 50, 52 and 54 so that they are fully extended. In the preferred embodiment, the passenger supporting structure 20 and body 22 can be elevated by as much as 15 inches above the ride vehicle chassis.

Figure 7:
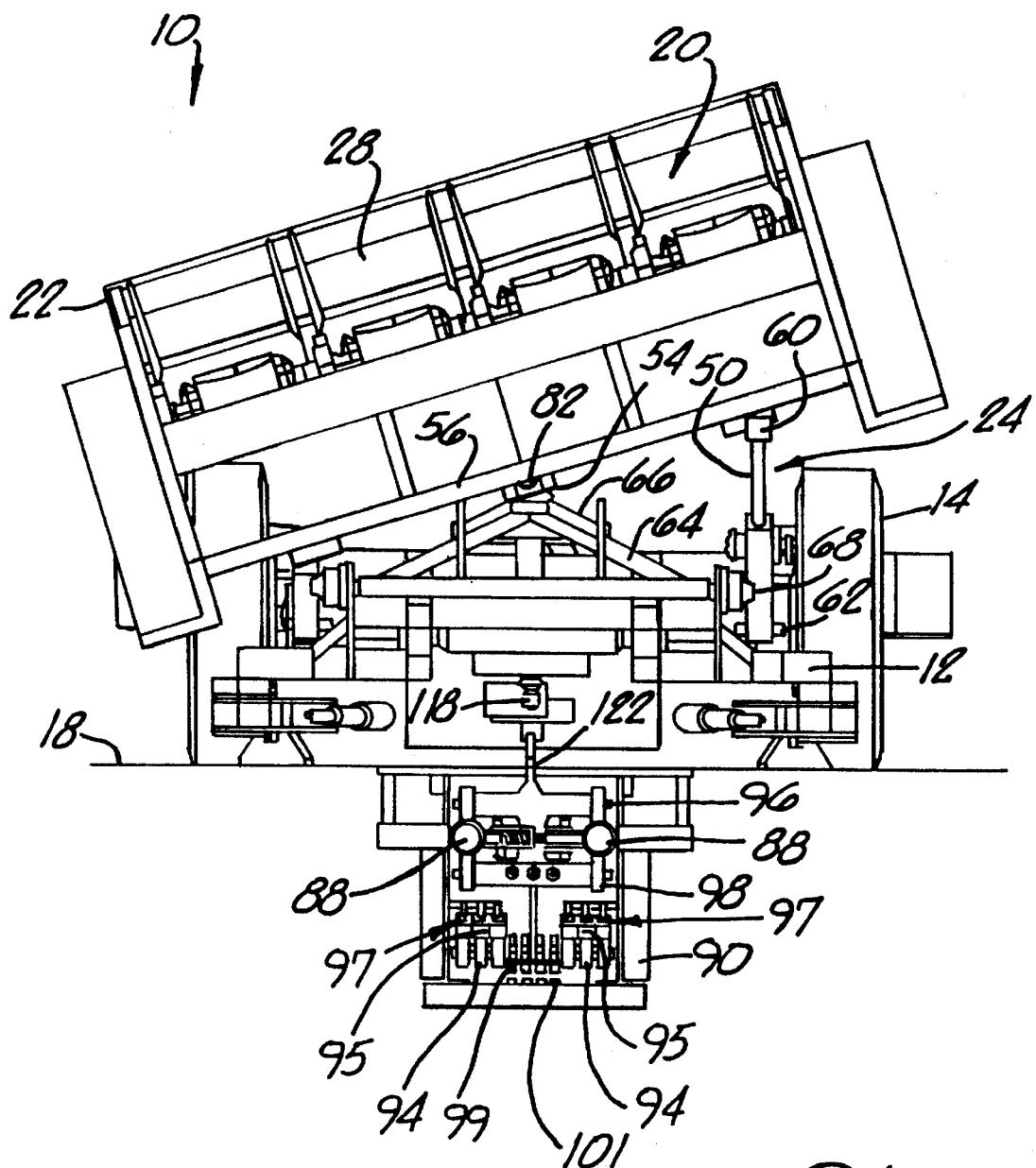
FIG. 7 is a front elevational view of the ride vehicle, partly in cross-section, showing the passenger supporting structure rolled to one side with respect to the chassis about a roll axis.

FIG. 7 is a front elevational view of the ride vehicle 10, showing the passenger supporting structure 20 and the body 22 rolled with respect to one side of the ride vehicle chassis 12. This is accomplished by supplying appropriate hydraulic pressure to the actuators 50, 52 and 54, resulting in rotational acceleration of the passenger supporting structure 20 and the body 22 with respect to the ride vehicle chassis 12 about the roll axis of the ride vehicle 10. In this condition, one of the two front actuators 50 is extended while the other actuator 52 is collapsed. The rear actuator 54 also is partially extended to the extent necessary to accommodate extension of the one front actuator 50. In the preferred embodiment, the passenger supporting structure 20 and the body 22 can be rolled by as much as 16.1 degrees to either side of the ride vehicle chassis 12. Again, it will be understood that various intermediate ranges of motion, and motion in the opposite direction to that shown in FIG. 7, are possible about the roll axis of the ride vehicle 10.

It also will be understood that intermediate ranges of motion are possible, beyond the full range of motions described above and depicted in FIGS. 4–7. For example, the passenger supporting structure 20 and the body 22 can be both pitched forward and rolled to one side with respect to the ride vehicle chassis 12 by as much as 8.2 degrees (pitch) and 15.4 degrees (roll). Similarly, the passenger supporting structure 20 and the body 22 can be both pitched rearward and rolled to one side with respect to the ride vehicle chassis 12 by as much as 7.2 degrees (pitch) and 17.4 degrees (roll). These motions can be carried out by appropriate control and extension and retraction of the motion base servo actuators 50, 52 and 54 in a multitude of combinations. Therefore, it is understood that the motions described herein are by way of example only and not limitation.

FIGS. 8–10 show a bogie apparatus 86 for connecting the ride vehicle 10 to underground rails 88 below the surface of the path 18 upon which the ride vehicle 10 travels. In the preferred embodiment, as shown in FIG. 3, for example, there are two bogies comprising a front bogie 90 and a rear bogie 92. These bogies 90 and 92 have several common features. With reference to FIGS. 8–10, each of the bogies 90 and 92 has several sets of wheels for rolling engagement with a pair of spaced, parallel rails 88 positioned under the path or surface 18 on which the ride vehicle 10 travels. As explained below, these sets of wheels securely attach the bogies 90 and 92 to the rails 88. The front bogie 90 also is provided with two bus bar collectors 94 for each of six bus bars 95 of a power bus 97. These bus bar collectors 94 are spring-tensioned to maintain the necessary contact forces between the collector and the bus bars 95 to provide the A.C. electrical power used to drive the electric motor 32 and certain control system signals for the ride vehicle 10.

Each bogie 90 and 92 has a multiple wheel arrangement comprising load wheels 96, up-stop wheels 98, static guide wheels 100 and active guide wheels 102. The load wheels 96, of which there are four, ride on the top of the rails 88 and support the weight of the bogies 90 and 92. The up-stop wheels 98, which also are four in number, are located on the bottom of the bogies 90 and 92 and inhibit upward motion. These wheels 98 preferably are designed with a small clearance relative to the rails 88 so as not to add to the rolling resistance of the bogie 90 or 92. There are two static guide wheels 100 to prevent lateral motion of the bogie 90 or 92 into the side of the rail 88. Finally, two active guide wheels 102 mounted on pivoting arms 104 pre-load and center the bogie 90 or 92 and also inhibit lateral motion of the bogie into the side of the opposing rail 88. Each of these wheels 104 also is provided with a spring-tensioner 106 for the pre-loading and centering function.

The front bogie 90 is connected to the ride vehicle's front steering system and, therefore, is subjected to front steering loads. The rear bogie 92 is essentially free of normal operating loads, other than its own weight, and is towed along the path through its connection to the ride vehicle's lateral energy absorbing system, described below.

In the preferred embodiment, the bus bars 95 of the power bus 97 are aluminum with a stainless steel wear surface, and have a 200 amp capacity. For example, the Wampfler Model 812 bus bar has been used and found to be suitable. The collector (not shown) preferably has a wear surface comprising copper graphite. The bus bars 95 preferably are installed in an open downward position to prevent debris from entering the bars and shortening their life.

Figure 11:
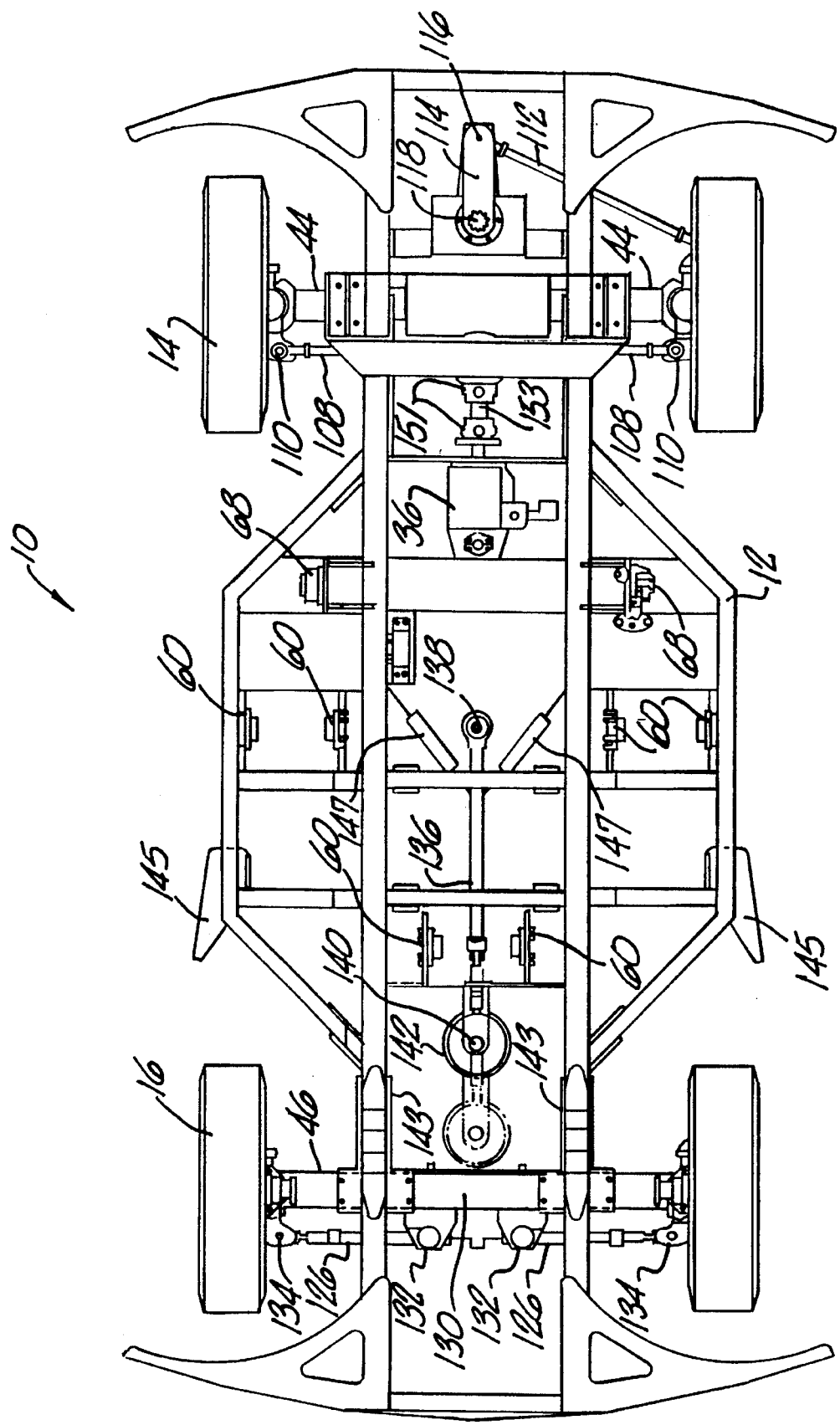
FIG. 11 is a top plan view of the ride vehicle chassis illustrating the steering mechanisms and a lateral energy absorbing system of the ride vehicle.
Figure 12:
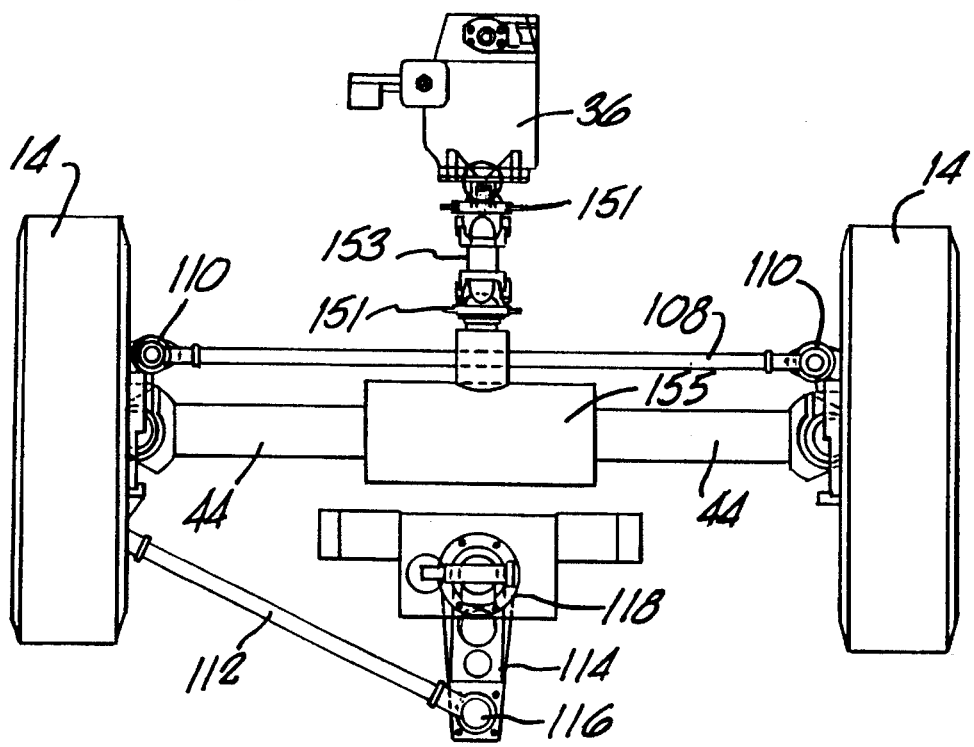
FIG. 12 is an enlarged top plan view of the front steering mechanism.
Figure 13:
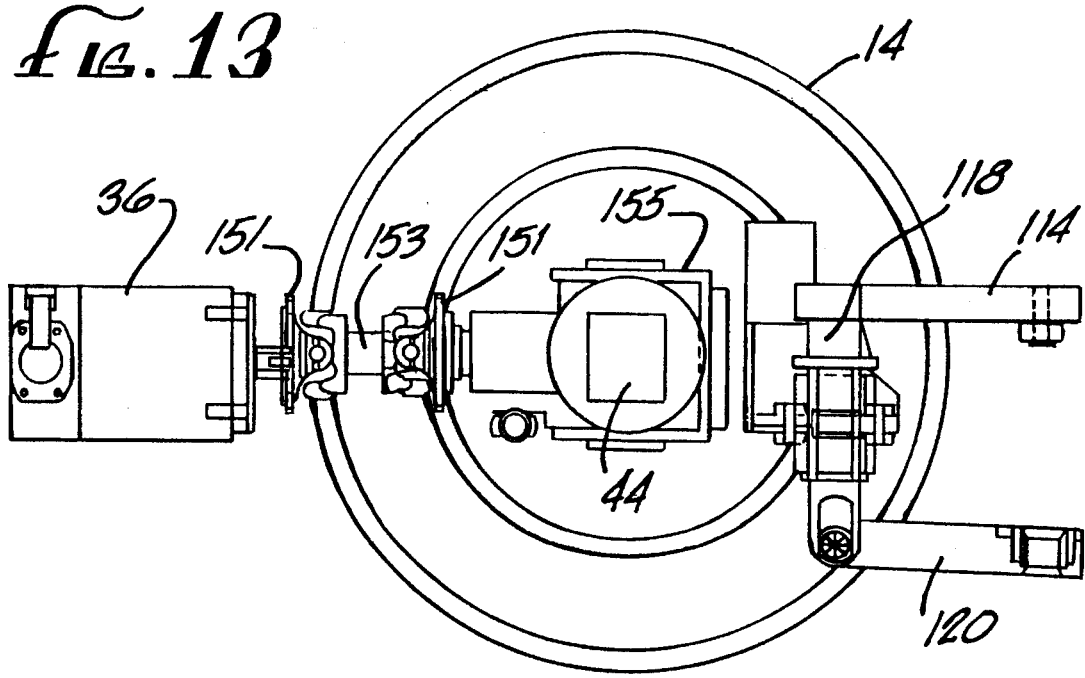
FIG. 13 is an enlarged side elevational view of a portion of the front steering mechanism shown in FIG. 12.

As shown best in FIGS. 11–13, the ride vehicle's front wheels 14 are steered via a mechanical steering system that uses the curvature of the path 18 to steer the front wheels. More particularly, the two front wheels 14 are connected to the ride vehicle chassis 12 for rotation by the front axles 44, using zero king pin inclination. The two front wheels 14 also are linked together by a linkage arm 108, such that turning motion of one front wheel 14 is automatically transferred via the linkage arm 108 to the other front wheel 14. The two ends of the linkage arm 108 are connected to the front wheels 14 by conventional ball and joint connections 110.

One of the front wheels 14, such as the right-front wheel, is connected by a steering bar 112 to an upper steer arm 114 via ball and joint connections 116. The upper steer arm 114 is connected by a vertical spline shaft 118 to a lower input arm 120 such that horizontal pivoting motion of the lower input arm 120 about the axis of the vertical spline shaft 118 is directly translated into corresponding horizontal pivotal movement of the upper steer arm 114. The lower end of the spline shaft 118 is pivotally connected to the lower input arm 120 to accommodate up and down movement of the lower input arm caused by the grade of the path 18. The lower input arm 120 is, in turn, bolted to the front bogie 90 via a front follower 122 and a plain spherical bearing 124.

With the foregoing front steering arrangement, it can be seen that steering of the front wheels 14 is governed by the curvature of the path 18. Thus, on a straight path 18, the front wheels 14 point straight ahead. However, when the front bogie 90 follows a turn in the path 18, causing non-linear movement of the front bogie, the lower input arm 120 is caused to pivot with respect to the bogie 90 via the plain spherical bearing 124. This pivoting motion of the lower input arm 120 is transferred via the spline shaft 118 to the upper steer arm 114 which, in turn, moves the steering bar 112 causing the right-front wheel 14 to turn in the direction of the turn. This turning motion of the right-front wheel 14 is transferred via the linkage arm 108 to the left-front wheel 14 to provide coordinated steering of the two front wheels in unison.

In one aspect of the configuration of the preferred ride vehicle, steering of the rear wheels 16 is independent of steering of the front wheels 14 to increase the versatility of motion of the ride vehicle 10. As shown in more detail in FIGS. 11 and 14, the steering of each rear wheel 16 is controlled by separate hydraulic steering servo actuators 126. These steering actuators 126 are connected to the hydraulic control system of the ride vehicle 10 and are controlled by the ride vehicle control system in combination with feedback signals from sensors 128 to control the movement of the actuators 126 and, thus, the steering of the rear wheels 16. FIGS. 15 and 16 show the range of steering motion of rear wheels 16 in more detail.

In particular, the inner ends of the steering actuators 126 are mounted to the ride vehicle's rear axle beam 130 by brackets 132 with pivotal connections. The outer ends of the steering actuators 126 are mounted to trunion mountings 134 at the rear axle 46 via plain bearings. The trunion mounting 134 for the actuators 126 incorporates motion in two axes to allow for build tolerances. The steering actuators 126 are controlled by the hydraulic control system through appropriate tubing.

The foregoing arrangement, which provides independent steering of the front wheels 14 and the rear wheels 16, allows a wide range of ride vehicle motion not otherwise possible with conventional ride vehicles, which have either had front wheel steering or rear wheel steering (but not both), or no steering capabilities at all for ride vehicles that are totally path dedicated. The examples of ride vehicle motion enabled by four-wheel steering include the simulated effect of the ride vehicle 10 fishtailing, such as during rapid acceleration or deceleration of the ride vehicle, or sliding sideways as on ice or an oil slick. The turning of corners can also be exaggerated by using four-wheel steering, which substantially enhances the general overall mobility and turning capabilities of the ride vehicle 10.

FIG. 11 also illustrates a special lateral energy absorbing system of the vehicle. With reference also to FIGS. 15 and 16, the lateral energy absorbing system is adapted to allow the vehicle 10 to move laterally with respect to the rear bogie 92 within a pre-determined tracking envelope boundary during movement of the vehicle 10 along the path 18. The lateral energy absorbing system comprises a rear follower lockout actuator 136 pivotally connected to the vehicle chassis 12 by a pivot shaft 138 and to the rear bogie 92 via a spherical bearing 140 on a rear follower 142. The lockout actuator 136 is designed to preferably operate in two distinct modes related to the vehicle's path 18.

The lockout actuator 136 is designed to preferably operate in a first mode when the vehicle 10 may move within a large envelope, as shown in FIG. 16. In the first mode, the lockout actuator 136 is in a retracted position. In this retracted position, an energy absorbing pad 142 at the rear portion of the actuator 136 is laterally confined between two vertical plates 143 spaced apart by a first distance on the vehicle chassis 12.

The lockout actuator 136 is designed to operate in the second mode when the vehicle 10 follows a path 18 within a confined space, when it is desired that lateral offset from the center of the path be restricted, such as illustrated in FIG. 15. In the second mode, the lockout actuator 136 is in a fully-extended position. In this fully-extended position, the energy absorbing pad 142 at the rear portion of the lockout actuator 136 is laterally confined between two oppositely facing vertical blades 145 on the vehicle chassis 12 which are spaced apart by a second distance that is smaller than the first distance previously described.

In the event that the vehicle chassis 12 attempts to move laterally with respect to the rear bogie 92 by an amount that exceeds the distance (when the lockout actuator 136 is extended in the first mode, as shown in FIG. 16, or when the lockout actuator 136 is fully retracted in the second mode, as shown in FIG. 15), then the energy absorbing pad 142 will contact either the vertical plates 143 or the vertical blades 145 on the vehicle chassis 12 to prevent further lateral movement. Moreover, when the lateral movement of the vehicle chassis 12 attempts to exceed the first distance, when the lockout actuator 136 is fully extended in the first mode, or when the lateral movement of the vehicle chassis 12 attempts to exceed the second distance, when the lockout actuator 136 is fully retracted in the second mode, a sensor 147 coupled to the lockout actuator 136 will be activated to cause an E-stop and completely disable the vehicle 10.

With reference to FIG. 11, two sensors 147 are designed to measure the amount of lateral travel of the energy absorbing pad 142 by sensing the amount of rotation of the pivot shaft 138 which connects the front end of the lockout actuator 136 to the vehicle chassis 12. Each of the two sensors 147 is a piston-type linear sensor that either extends or retracts when the energy absorbing pad 142 moves laterally, thereby causing rotation of the pivot shaft 138. Under appropriate operating conditions and proper programming of the ride vehicle 10, the lateral motion of the vehicle with respect to the rear bogie 92 is designed such that the energy absorbing pad 142 will not completely travel either the first or second distance and will avoid contacting one of the vertical plates 143 or blades 145. Instead, the energy absorbing pad 142 will stop just short of the plates 143 or blades 145 under a maximum travel condition (i.e., the tracking envelope boundary). However, should the energy absorbing pad 142 attempt to exceed the tracking envelope boundary, the sensors 147 will cause the E-stop and completely disable the vehicle 10. The lockout actuator 136 is moved to the extended and retracted positions by the hydraulic control system based on commands provided by the computerized vehicle-control system 40.

FIG. 17 is a block diagram illustrating the hydraulic control system for providing hydraulic power to the various actuators and other components of the ride vehicle 10. A three-phase, 480 volt power supply, tapped from the power bus 97, drives the electric motor 32, which in turn drives the hydraulic power unit 34. The hydraulic power unit 34 is responsible for providing the energy for all of the ride vehicle's actuators, and operating the hydraulic motor 36. As shown in FIG. 12, the output of the hydraulic motor 36 is transferred by couplings 151 to a differential ratio gear box 155. Differential and planetary gears inside the gear box 155 create a 20:1 ratio for driving the front wheels 14. In the preferred embodiment, the hydraulic motor 36 is a 125 cubic centimeter variable displacement hydraulic motor (manufactured by the Rexroth Corporation, of Bethlehem, Pa.) and is mounted to the ride vehicle chassis 12. A tachometer (not shown) measures the motor's output shaft rotations-per-minute. This information is sent as a signal input to the computerized vehicle-control system 40, which monitors an overspeed condition of the motor, while stroke displacement transducers (also not shown) measure hydraulic displacement of the hydraulic motor's pistons to provide for controlled acceleration, deceleration and velocity of the ride vehicle 10. Using a nested control loop in software to monitor this arrangement, the ride vehicle 10 travels at speeds of up to about 15 miles per hour.

An important function of the hydraulic power unit 34 is to charge high-pressure accumulators 157 with hydraulic energy. FIG. 3 shows the location of these accumulators 157 at the rear of the ride vehicle. These accumulators are used for ride vehicle propulsion, actuation of the motion base 24 and for steering of the rear wheels 16. The hydraulic power unit 34 supplies this hydraulic energy by pumping hydraulic fluid through a pressure filter 159 through a central manifold 161 and subsequently to the high-pressure accumulators 157. The primary function of the high-pressure accumulators 157 is to store and save energy for supply on demand to the various energy users of the hydraulic system. These energy users comprise the hydraulic motor 36, the left-front motion base servo actuator 50, the right-front motion base servo actuator 52, the rear motion base servo actuator 54, the right-rear steering servo actuator 126, the left-rear steering servo actuator 126 and the rear follower lockout actuator 136. Each of these actuators, except for the follower lockout actuator 136, has a servo valve which controls the flow of pressurized hydraulic fluid to the actuators according to a command from the computerized vehicle-control system 40.

The hydraulic control system also includes a back pressure valve 163 that maintains a predetermined amount of back pressure in a low-pressure accumulator 165. In the preferred embodiment, the back pressure valve 163 has a one-hundred and thirty-five pounds-per-square-inch gauge ("psig") setting. The low-pressure accumulator 165 is designed to store extra hydraulic fluid that may be needed by the hydraulic propulsion motor 36 when the ride vehicle 10 is decelerating, to thereby provide regenerative braking, as will be explained below.

An anti-cavitation valve 169, a return filter 171 and a heat exchanger 173 also are provided to complete the hydraulic control system. The anti-cavitation valve 169 prevents damage to the hydraulic propulsion motor 36 in the event that the low-pressure accumulator 165 is completely depleted of hydraulic fluid. Under these circumstances, the anti-cavitation valve 169 supplies hydraulic fluid under atmospheric pressure to the hydraulic propulsion motor 36 to prevent it from cavitation damage. The return filter 171 filters the returning hydraulic fluid, and the heat exchanger 173 cools the fluid before it is returned to a reservoir 301.

In addition to the heat exchanger 173, cooling of the hydraulic fluid also is provided by a cooling fan 175 driven by an output shaft of the electric motor 32. The cooling fan 175 is designed to run whenever the hydraulic system is powered. The fan 175 includes a shroud 177 that directs airflow through the heat exchanger 173 and over the electric motor 32. The shroud 177 also encloses the electric motor 32, hydraulic pump 34 and cooling fan 175. The return filter 171 is used to keep debris out of the hydraulic fluid before it enters the heat exchanger 173.

The hydraulic control system also is used to control operation of the ride vehicle's emergency brakes. These brakes comprise a right-front brake 179, a left-front brake 181, a right-rear brake 183 and a left-rear brake 185. In the preferred embodiment, the ride vehicle's brakes 179, 181, 183 and 185 are spring applied disc brakes of the failsafe type. The hydraulic system for the brakes involves a bi-directional hydraulic fluid flow. To apply the brakes 179, 181, 183, and 185, hydraulic fluid is withdrawn from the brakes through a return line to the central manifold 161 and return filter 171. This releases the brake springs and applies spring force to cause braking action. To release the brakes 179, 181, 183 and 185, pressurized hydraulic fluid is supplied to the brakes to compress the springs and remove the spring force. The emergency brakes are used primarily during an emergency stop, or during passenger unloading and unloading, to thereby "park" the ride vehicle. During movement of the ride vehicle 10 in accordance with one of the ride programs, however, dynamic braking of the ride vehicle using the hydraulic motor 36 is preferred means of braking vehicle motion.

The hydraulic control system includes several special features. In one aspect of the hydraulic control system, illustrated diagrammatically in FIGS. 18A and 18B, the hydraulic motor 36 is designed to recover kinetic energy that is created when the ride vehicle 10 is braking or decelerating.

As noted above, pressurized hydraulic fluid flows from the high-pressure accumulators 157, through the hydraulic motor 36 to propel the ride vehicle 10, and then into the low-pressure accumulator 165 when the ride vehicle is accelerated (according to ride program data from a sequence of data). The motor speed is controlled according to a predetermined vehicle speed profile, defined by a sequence of data of a particular ride program. Each particular piece of data represents vehicle speed at a particular position (defined in the preferred embodiment according to one of distance and time), and a software loop adjusts the angle of a swashplate via a control valve 303 to allow appropriate displacement of the hydraulic motor 36 to match vehicle speed and the hydraulic energy presently stored in the high-pressure accumulators 157 (which is at approximately 3500 psig pressure). Spent hydraulic fluid pressurizes the low-pressure accumulator 165 to approximately 135psig, and additional hydraulic fluid is dumped through the back pressure valve 163 through a return line 305 to the reservoir 301.

The swashplate angle, although driven to a positive angle when the vehicle is called upon to accelerate or maintain a velocity, is generally driven to a negative angle when the vehicle is called upon to decelerate. In this case, the hydraulic motor 36 provides resistance to continued vehicle motion, and the kinetic energy of the ride vehicle 10 causes the motor to pump hydraulic fluid from the low-pressure accumulator into the high-pressure accumulators 157, to thereby transfer the kinetic energy of the ride vehicle 10 to hydraulic energy stored in the high-pressure accumulators.

The recovered energy is thus stored in the high-pressure accumulators 157 for future use by any of the hydraulic control system's other energy users, such as the motion base servo actuators 50, 52 and 54, the steering actuators 126, or the hydraulic motor 36. The energy stored in the high-pressure accumulators 157 can be especially useful when it is necessary to execute rapid and continuous movements with the motion base servo actuators 50, 52 and 54 requiring a high-horsepower output.

By recovering energy during braking and decelerating and storing it in the high-pressure accumulators 157, the hydraulic motor 36 essentially functions as a pump and allows the system to store and subsequently provide higher peak output horsepower upon demand than would otherwise be obtainable from a conventional hydraulic power unit and control system. As a result, a relatively smaller horsepower hydraulic power unit 34, on the order of about 50 horsepower, may be used. However, in view of the ability of the system to store large volumes of hydraulic energy, the system can still provide peak horsepower outputs that far exceed the horsepower of the hydraulic power unit 34, by a factor of three or more.

In another aspect of the hydraulic control system, the functions of blocking and settling valves to control the flow of hydraulic fluid to the motion base servo actuators 50, 52 and 54 are made separate and distinct. Thus, instead of using a blocking and settling valve on each motion base servo actuator 50, 52 and 54, a single blocking valve 182 is used to control the flow of hydraulic fluid to all of these actuators. A separate settling valve also is provided for each of these three actuators. The foregoing arrangement of using a single blocking valve 182, as opposed to three separate blocking valves, enables accurate and coordinated control of the actuators 50, 52 and 54 in the event that the motion base 24 is disabled.

Each motion base servo actuator 50, 52 and 54 is vertically erect and supports a load. Each actuator 50, 52 and 54 includes a high-pressure coupling, by which hydraulic energy is provided from the manifold 161 and blocking valve 182, which is normally-closed and motivated open by the presence of an electric control signal. Thus, in the event of a power failure, the blocking valve 182 is automatically closed to block the further supply of hydraulic fluid to the actuators 50, 52 and 54.

A servo valve receives hydraulic energy via the high-pressure coupling, and is electronically controlled to supply varying amounts of hydraulic energy (up to 3200 psig) to each of first and second fluid chambers and of a cylinder of the actuator 50, 52 and 54, to precisely control the stroke of a piston to articulate the passenger holding structure 20. The servo valve further includes a low-pressure coupling, by which hydraulic fluid may be discharged to the return line, and an electronic control signal input (not shown) from the computerized vehicle-control system 40. Relief valves and are also provided, which allow the venting of excess pressure above 3200 psig and the return of hydraulic fluid via the return line to the reservoir.

The settling valve of each actuator 50, 52 and 54 couples the second chamber of the cylinder to the return line. Each settling valve is normally-open, such that in the event of loss of power, the weight of gravity of the passenger holding structure 20 and body 22 (on the order of several tons) will force the piston to retract the second fluid chamber and expel the hydraulic fluid from that chamber through the settling valve to the return line, and ultimately, to the reservoir. A special orifice is provided to limit the rate at which hydraulic fluid can flow through the settling valve, to thereby limit the rate of settling of the motion base 24.

Each motion base servo actuator provides a ten-inch stroke of the piston with respect to the cylinder, and includes a Linear Variable Differential Transformer ("LVDT") sensor that provides a feedback signal to the computerized vehicle-control system 40, to enable feedback control over actuator displacement.

A single blocking valve 184 and 186 also is provided for the rear steering servo actuators 126, and separately for the hydraulic motor 36, respectively, which do not use any settling valves. The blocking valve 186 for the hydraulic motor 36 isolates this motor from the high-pressure accumulators 157. When this blocking valve 186 is opened, the deceleration of the ride vehicle 10 will charge these accumulators, and when closed, one hundred percent dynamic braking torque will be generated.

All of the blocking valves 182, 184 and 186 described above preferably are incorporated inside the central manifold 161. All of these blocking valves, when opened, function as slow-shifting, moderating type valves to allow relatively slow movement of the system's actuators when opening. This prevents sudden movements of these actuators and associated undesired and uncontrolled movement.

As mentioned, the blocking valve 186 on the hydraulic motor 36 also permits one hundred percent dynamic braking torque when the ride vehicle 10 is decelerating and when the blocking valve is closed. During braking, the hydraulic motor 36 acts as a pump to pressurize the high-pressure accumulators 157, as monitored by the computerized vehicle-control system. However, when the pressure in the high-pressure accumulators 157 is too low, or when large dynamic braking torque is required, the blocking valve 186 on the hydraulic motor 36 may be closed and increases the resistance provided to the pumping of hydraulic fluid toward the high-pressure accumulators by the hydraulic motor. Consequently, closing of the blocking valve permits one hundred percent dynamic braking capabilities. To this effect, a relief valve (not shown) located in the central manifold 161 is set at approximately 3,500 psi. In the preferred embodiment, a hydraulic motor 36 having 6,000 maximum psi is used. Therefore, if the relief valve is set at 6,000 psi, approximately two hundred percent braking torque could be achieved. It will be understood that various other amounts of braking torque can be provided by appropriate adjustment of the relief valve.

Each rear steering actuator 126 includes a servo valve, mounted vertically above a first end of a cylinder of the actuator, and a high-pressure coupling that permits the supply of hydraulic energy from the blocking valve 184 of the manifold 161. The servo valve permits the supply of hydraulic energy to stroke a piston away from a first fluid chamber, toward a second opposing end of the cylinder, and via hydraulic line to a second fluid chamber at the opposing end of the cylinder. The software control of the rear steering actuators 126 uses a feedback signal from a magnetostrictive-type sensor 128 to precisely control vehicle steering along the path, within a predefined envelope. Details of the feedback control are discussed further below, in connection with the description of the electronic control system.

Introduction To The Electronic Control System.

Control over the path 18 and all ride vehicles 10 currently running on the system is achieved by a central controller, called the "Wayside Interface" in the preferred embodiment. The primary human interface portions of the Wayside Interface are in a "Wayside Station," where passengers embark and disembark, and where a human operator can control the operation of the entire attraction. The Wayside Interface uses the power bus 97, comprised of six bus bars 95 (FIG. 11), to control ride vehicle power by path segment, or zone, and also radio (rf) communication to interact with computerized vehicle-control system 40 on each ride vehicle 10.

The computerized vehicle-control system aboard each ride vehicle 10 includes two vehicle computers that are responsible for conducting the ride experience in a programmable manner, and accordingly, the ride experience may be distinct for each ride vehicle 10. Programming and maintenance are effected by a special programming console, assisted by use of an off-line editor. More details about ride vehicle control will be discussed further below.

Description Of The Power Bus System, From Which Each Ride vehicle Derives Electrical And Motor Power.

As shown in FIGS. 9 and 10, the power bus 97 is comprised of six adjacent bus bars 95, three just left of the center of the path 18 and three just to the right of the center of the path. The left three bus bars 95 supply four hundred eighty volts in three phases, one voltage phase carried by each bus bar, for meeting each ride vehicle's power requirements. Most aspects of ride vehicle control, including propulsion, are achieved by hydraulic power, which is derived from the hydraulic power unit 34, essentially a large electric pump. In addition, the power bus 97 supplies electric power that drives each ride vehicle's other electric elements, for example, a pneumatic compressor motor (not shown) and peripherals, including headlights 187 and the sound module 41. The three bus bars 94 just right of center provide a ground signal, a twenty-four volt go signal and a twenty-four volt, variable-impedance, "no-go" signal (which indicates the presence of a ride vehicle), the latter two of which are specific to each zone, or path segment. That is, in cases of emergency, the central controller can lower the go signal for each specific zone or all zones to disable forward motion of the ride vehicle 10 along the path.

Each ride vehicle 10 when operating, and in response to the go signal, places a voltage upon the "no-go" bus bar, which indicates to the Wayside Interface that a first ride vehicle is present in the particular zone. If a second ride vehicle becomes too close in spacing along the path 18 to the first vehicle, the central controller detects the presence of two ride vehicles in adjacent zones and disables the go signal to the zone of the second vehicle, until the first vehicle has left the zone that it occupies. A hypothetical alternative embodiment could, within the context of the present invention, utilize a no-go signal by direct communication between vehicle and central controller by defining a zone to be a variable quantity, determined by the location of the first vehicle. In other words, ride vehicle position could equivalently be directly monitored by the central controller without the use of zone-specific bus bars.

During use of these two bus bars 95 (go and no-go), power is continuously supplied to the ride vehicles via the three bus bars just left of center.

The Wayside Interface also communicates with each ride vehicle 10 for monitoring the ride vehicle's status, principally when the ride vehicle is in a zone where it loads and unloads passengers 48. Thus, each rf signal may be digitally addressed to a specific ride vehicle, or in the alternative, infrared communication may be used (instead of rf communication) and communication confined to a small, ride vehicle specific area adjacent to the Wayside Station.

These digital communications are utilized by the wayside Interface to request and receive ride vehicle diagnostic information, and to select a particular ride program stored among a plurality of such programs in electronic memory 189 aboard each ride vehicle. The diagnostic information requested by the Wayside Interface includes, for example, ride vehicle operating status, mode, ride vehicle subsystem fault indications, computer fault indications, current ride program, longitudinal position with respect to the path length, ride vehicle ID, and time of day.

The front bogie of the ride vehicle mounts two position sensors 99 on each side, for a total of four track position proximity-type update sensors. These sensors sense the proximity of path-mounted position markers 473 and 475, each consisting of a number of metal targets 101 mounted within the track, just below the front bogie, as seen in FIG. 9.

In addition to these proximity sensors 99, two idler wheels 103 of the front bogie are used as redundant incremental longitudinal position sensors, in the form of rotary encoders. These encoders, each a quadrature sensor, provide 360-pulse-per-rotation 90-degree phase-shifted output signals, which are coupled to a velocity polarity sensor (which detects forward and reverse velocity) and to high-speed counter inputs 215. These inputs 215 are read and formatted to a total distance measurement, in feet, by the computerized vehicle-control system 40, and are loaded into a distance register. Thus, the ride vehicle 10 keeps track of incremental distance using the idler wheels 103, and uses the update sensors 99 to detect the presence of the path-mounted position markers 473 to detect and correct errors in the tracked position of the ride vehicle. A logic error is ascertained by the computerized vehicle-control system if position errors exceed a relatively small quantity, or if the counter inputs 215 differ by more than a predetermined amount.

Importantly, the idler wheels 103 are utilized instead of a tachometer, which may be subject to error occasioned by slippage and wear of the wheels 14 of the ride vehicle 10. The high speed counter inputs 215 are reset each time that they are read by the CPU 205, and the incremental position measurement is expected to be sufficiently accurate that the position markers 473 may be spaced at great distances, for infrequent detection and update of the incremental position measurements.

As discussed below, the computerized vehicle-control system includes two (principally) redundant computer systems, each operating in parallel to monitor position and other vehicle functions.

Description Of The Computerized Vehicle-Control System Aboard Each Ride Vehicle.

Figure 19:
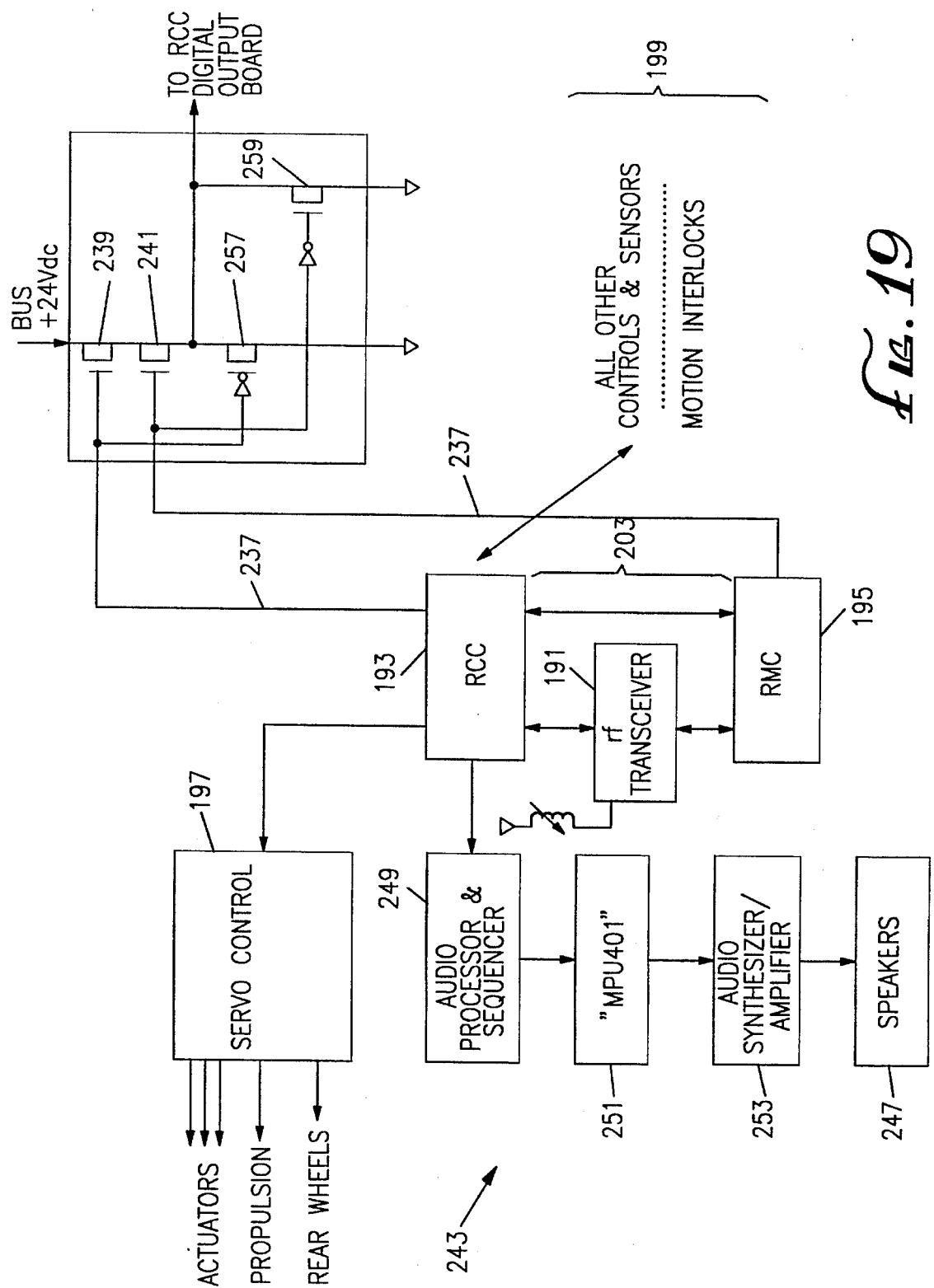
FIG. 19 is another block diagram showing further aspects of the computer control system.

With reference to FIG. 19, the computerized vehicle-control system 40 of a single ride vehicle 10 will be briefly described. All of the ride vehicle's digital functions, including the computerized vehicle-control system 40, are driven by a twenty-four volt direct current (dc) power supply. This power is derived from the 480-volt, three phase ac power supply provided by the power bus 97, discussed above, through the use of step-down transformers aboard each vehicle that provide 480-volt ac primary to 115-volt ac secondary and a twenty-four volt dc power supply. All other vehicle electronics, including a cooling fan, air compressor, and the vehicle's non-digital audio functions, such as amplification, are driven at 115-volts ac.

Each ride vehicle 10 carries an rf transceiver 191 and two on-board computers 193 and 195, which are nearly identical in configuration, and which are utilized in parallel for safety purposes, as part of a "voting" implementation. One computer 193, called the ride control computer ("RCC"), controls the audio aspects of the ride experience and the servo and digital control elements 197 that control propulsion and ride vehicle motion. Both the RCC 193 and its companion ride monitor computer 195 ("RMC") are separately coupled to the rf transceiver 191 and to parallel sensors and bus controls for shut-down of the ride vehicle. The computers 193 and 195 communicate with each other regarding ride vehicle faults, action and status, by the voting scheme, and alert the Wayside Interface if there is a disagreement between the two computers, indicating a logic fault, or an agreement about a serious status that requires ride vehicle shutdown, for example, critical overheating. Depending upon the status, fault or action, both computers 193 and 195 wait a specific time period to receive a related signal from their companion computer before reaching a conclusion as to agreement or disagreement, mostly necessitated due to tolerance differences between different sensors used in parallel by each computer. The system described, by utilizing two computers 193 and 195 in parallel and the mentioned-voting procedure, provides for added reliability and passenger safety.

As indicated in FIGS. 18A and 18B, each computer 193 and 195 carries its own memory 189, which contains all the program information necessary to run a plurality of different ride programs. In the preferred embodiment, this memory includes eight megabytes of $E^2PROM$. Each program is stored in a plurality of program portions, each consisting of a plurality of commands which are indexed by time and distance. In this manner, the ride vehicle computers 193 and 195 may independently determine when and where a particular command is to be executed during the ride, and confirm this determination and resultant ride vehicle reaction with the other computer. Each command of each ride program includes a number of digital data values, or commands of each parallel data track, including ride vehicle velocity (including "reverse"), motion base position for each of three axes, offset for the rear of the ride vehicle, audio cues, ride vehicle headlights on and off, and safety functions (including engagement and disengagement of rear follower offset lock-out, lock and release of seat belt tongue and retractor reel, and engagement and disengagement of the motion base actuator block and settling valves). As further discussed below, each ride computer 193 and 195 possesses a math co-processor 201 which is used for all floating point calculations. As indicated above, both the RCC 193 and the RMC 195 are substantially identical in architecture and operate in parallel, and both are generally represented by the reference numeral 203 in FIGS. 18A and 18B.

FIGS. 18A and 18B illustrate the architecture and wiring of one of the computers 203 (RCC and RMC) to the various sensors and controls utilized by the ride vehicle. Each computer has a CPU 205 that includes a Motorola "68030" microprocessor for monitoring ride vehicle sensors and for directing communications, voting, and activities of the servo mechanisms. A real-time clock 207 is utilized for computation of time based segments and overall system control. In addition to random access memory 209, each computer 203 features a modular E$^2$PROM board 211 which generally includes 8 Mbytes of memory for storing eight ride programs which may be accessed. In addition, the math co-processor 201 (having a math specialized co-processor, a Motorola "68882" in the case of the preferred embodiment) is provided for the CPU 205 to all floating point calculations. Each computer 203 also possesses several serial ports 213, as mentioned above, and a set of high-speed counter inputs 215 and digital and analog I/O boards 217 and 219, for monitoring ride vehicle sensors and providing digital control signals. Lastly, servo mechanism control is supplied by a servo control board 221 having eight servo outputs and eight feedback inputs, collectively designated by the reference numeral 223. In the preferred embodiment, only six of these outputs are used, including outputs for each of the three motion base servo actuators 50, 52 and 54, propulsion (swashplate angle of the hydraulic motor 36), and steering for each of the two rear wheels 16 (angular).

The servo control board 221 is installed only in the RCC 193, to drive the servo actuated elements, whereas in an alternative embodiment, each of the RCC 193 and the RMC 195 includes the servo control board 221, which accepts servo feedback signals from the motion base 24, rear steering actuators 126 and the swashplate. However, in the preferred embodiment, all feedback signals from these elements are derived using linear sensors, and the feedback signals fed to the analog I/O board 219 in a zero-to-ten volt format, and are monitored by both of the RCC 193 and the RMC 195 using analog feedback.

Referring again to FIG. 19, the interaction of the two (parallel) computers 193 and 195 and the ride vehicle control functions are diagrammatically presented. As indicated, since the RMC 195 is provided primarily for added safety and backup in the RCC's control of the various mechanical elements of the ride vehicle 10, it would be redundant to require both computers to be electronically coupled to convey identical commands that require a ride vehicle response, i.e., acceleration. Thus, only the RCC 193 is used to control the ride vehicle's servo actuated elements. In the alternative embodiment mentioned above, where each of the RCC 193 and the RMC 195 includes a servo control board 197, control is achieved wiring only the servo control board 197 to the actual servo mechanisms (the three actuators 50, 52 and 54, the swashplate of the HPU 34 and steering actuators 126 for the rear wheels 16), whereas the servo control board of both the RCC and RMC are wired to accept feedback.

Also, in the preferred embodiment, only the RCC 193 provides digital control signal output 255 to control safety features of the ride vehicle, such as motion interlocks 227 and 229 which activate emergency brakes 231 and 233, and block out steering and motion by valve actuation within the hydraulic system. Both computers 193 and 195, however, receive sensor inputs (collectively designated by the reference numeral 225) from the ride vehicle 10, for monitoring ride vehicle status and response, for example, ride vehicle velocity and position of the motion actuators. Both computers are also coupled to the bus controls, collectively 239, 241, 257 and 259, which supply the digital I/O board 217 with power. This construction enables either computer 193 or 195, in the event of a disagreement in the voting that occurs with each directed action or fault analysis, to disable if necessary the ride vehicle's mechanical elements by disabling the bus controls. Both computers 193 and 195, through software, monitor expected position and actual ride vehicle position via position update signals, which are provided from position switches located on the front bogie 90.

Control of the mechanical elements by the computerized vehicle-control system 40, described above, consists of providing a servo actuation signal to hydraulic cylinders for the motion base 24, rear offset (deviation in steering of the rear wheels in relation to the path 18) and vehicle velocity. With respect to the motion base 24, control is achieved by simple use of linear feedback position signals, or servo feedback position signals 223 in the case of the alternative embodiment mentioned above, to ensure that each of the servo actuators 50, 52 and 54 are driven to their commanded position, and by determining whether a fault status exists if the actuators are not so driven. Control over vehicle velocity and rear offset is slightly more complicated, and is discussed below.

1. Control Of Vehicle Velocity.

vehicle velocity, including acceleration and deceleration, is controlled by the hydraulic motor, which as mentioned, is a variable displacement, rotary hydraulic motor. More particularly, the speed of the ride vehicle 10, including dynamic braking, is controlled by varying a swashplate of the hydraulic motor, which directly determines the displacement. The swashplate preferably has an integrated position feedback sensor which provides a propulsion motor swashplate angle analog signal input to the RCC 193.

Speed of the ride vehicle 10 is controlled using two control loops, an inner loop and an outer loop. The inner loop controls the swashplate angle to thereby control motor torque, in aid of providing a commanded amount of acceleration or deceleration. The outer loop, on the other hand, compares actual vehicle velocity with velocity desired by the ride program, and controls the inner loop with this feedback to drive the swashplate angle, such that the provided motor torque and acceleration or deceleration provided yields exactly the desired vehicle velocity.

2. Control Of Vehicle Steering.

The maximum rear offset and rear steering are controlled by a linear hydraulic cylinder (including a servo valve driven by a proportional-derivative servo control), and a position feedback sensor, while front wheel steering, as mentioned above, is controlled by a mechanical mechanism that is linked to the bogie. While the preferred embodiment uses the aforementioned bogie configuration, with front wheel steering being controlled by the path 18, a contemplated alternative embodiment utilizes front wheel steering independent of the path, with permitted lateral displacement from the bogie. Thus, in this alternative embodiment, front and rear wheels may be separately driven within the envelope, and an additional servo output from the servo control board 221 utilized to control front offset.

The linear hydraulic cylinders used for steering control directs the wheel angle of each wheel of the rear steering system. As with the velocity control, mentioned above, a similar two loop control system is provided to respectively apply (1) feedback to correct for steering errors, and (2) use of the rear steering offset value to calculate the required angle of each rear wheel, based upon desired rear offset and the direction of the path 18 and front wheel steering, and to convert the calculated steering angle to a required stroke for each of the linear actuators, based upon the steering linkage geometry.

Description Of The Sound Module 41.

Each ride vehicle command stored in each of computer's memory 189 may also include audio cue information which is also synchronized to motions of the ride vehicle 10, moving show sets, or of the motion base 24. In the preferred embodiment, sounds are generated by the ride vehicle 10 including 4 engine pitches, screeching tires, a thump and brakes. These sounds are directed to, and are actually produced by, speakers 247 located under the seat of the passengers 48 to simulate sounds coming from the vehicle itself. The ride vehicle 10 also features an independent sound system including speakers located within the seat backs of the passengers that generates music and announcements from analog electronic signals. In addition to the speakers 247 on the ride vehicle 10, additional speakers (not shown) may also be placed at strategic locations along the path 18 followed by the ride vehicle. As illustrated in FIG. 19, the RCC 193 is coupled to an audio processor and sequencer 249 to which it feeds the audio signal information to simulate vehicle and ride sounds which are produced by the speakers 247 located under the passengers' seats. This processor 249 configures a MIDI format command having "on" and "off" note values, which effectively indicate note duration.

MIDI data is formatted to include data representing pitch, instrument type and a command that turns the note either on or off. In the case of the preferred embodiment, only a few different sounds are used, for example, screeching tires and brakes.

The audio processor and sequencer 249 formats these commands to have a "countdown time," expressed in a number of musical beats, and sends these commands to a musical interface board 251, such as a "MPU401." The musical interface board 251, in abstract terms, maintains an electronic calendar for each of a number of channels, each representing a single sound, and loads each received note command into a corresponding calendar. Once the "countdown time" corresponding to the note on or off command is elapsed, the musical interface board 251 sends the note to an audio amplifier and synthesizer 253, which creates the actual sound to be produced by the appropriate speaker 247.

The actual sounds and actions reproduced by the ride vehicle 10 are created during an off-line programming state, following actions by a programmer in recording basic motions of the ride vehicle and the motion base 24. These programmed actions are initially time-based, and are recorded in digital format, much as music would be recorded by a tape machine. However, since the playback information for these time-based activities is in digital format, it may be readily edited using the off-line editor. Once the time-based sounds are generated, they are then sequenced within one of the parallel data tracks of the selected ride program to commence at a specific position along the path 18, or during a hold-pattern. As indicated above, additional time-based and position-based motion and sound routines are preferably configured to be run when the ride vehicle 10 is in a hold-pattern; that is, when the ride vehicle is stopped, the ride vehicle may implement a motion sequence where only the motion base 24 of the ride vehicle 10 is used, or certain audio sounds, such as engine-revving, etc. It is emphasized that ride vehicle actions are recorded in a digital format, preferably using a disk operating system ("DOS"), and stored in a software file which may be readily sequenced and edited, and even stored on a floppy disk medium. Once a complete ride program has been generated, it is electrically merged with ride profile data generated by the programming console and burned into $E^2PROM$ 211 for implementation and use, as directed by the Wayside Interface.

As noted above, typical sounds generated by the sound module 41 include the sounds of the ride vehicle's engine, tires and brakes. More specific examples of some of these sounds include roaring, straining, free-wheeling and screaming sounds of the engine, as well as skidding, spinning, squealing, sliding and flapping sounds of the ride vehicle's tires. Further sounds include gear whine, screeching brakes, thumping, scraping, crashing, banging, splashing water, whistling air, creaking and cracking wood sounds. It will be appreciated that various other sounds can be generated as desired to create a particular audio effect.

To further enhance the ride experience of the passengers as the ride vehicle 10 moves through the attraction, means may be provided for introducing special effects corresponding to the ride vehicle's interaction with the path 18 and scenery 42 in the attraction. In one form of the preferred amusement attraction, the means for introducing special effects comprises an apparatus that is adapted, for example, to create the effect of blowing wind, dust clouds, flying gravel, dirt, mud, sparks, water spray and fog. Of course, other special effects may be employed as desired, in combination with special scenery, props and audio effects, to create the most realistic ride vehicle experience possible. Therefore, the foregoing examples of audio effects and special effects have been listed for the purposes of illustration only and not by way of limitation.

Attached as Appendix "A" to this detailed description is an audio cue list that serves to illustrate the synchronization of audio data as one of several parallel data tracks as part of each ride program, to actions of the ride vehicle 10 and show sets.

Description Of The Central Controller.

Figure 52:
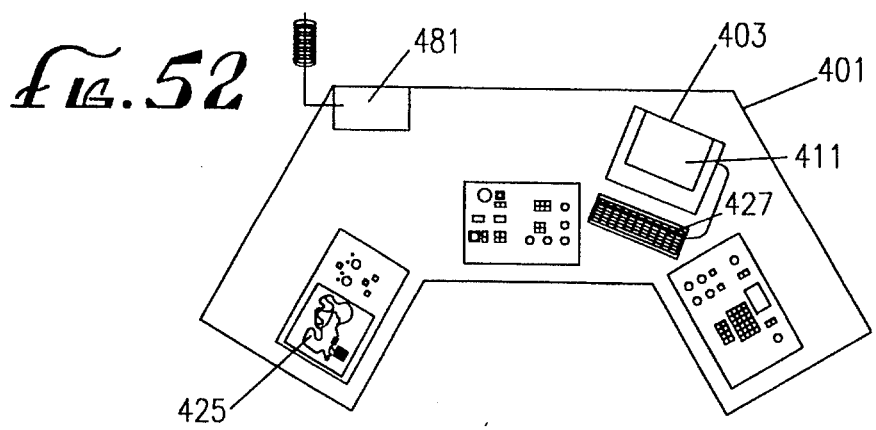
FIG. 52 is a plan view of a control tower of a "Wayside Interface" which orchestrates the conduct of the amusement attraction, including control over system power and zones, advancement of vehicles, interface with the human operator, and ride program selection. Also, the control tower includes a plurality of controls for conducting the progress of ride vehicles within the Wayside Station and a computer system that reports diagnostic information transmitted by each vehicle to the human operator and controls ride program selection for each vehicle.

With reference to FIG. 52, a control tower 401 of the Wayside Interface is shown as including a computer system 403 that controls (1) the supply of 480-volt ac power to the entire path 18, (2) maintenance of the go signal in the various zones 405 of the path 18 and the dispatch of ride vehicles within the Wayside Station 407, (3) collection and presentation of vehicle status and fault messages for ride vehicle operating within the attraction, for display to the human operator 409, and (4) selection of ride program for each ride vehicle, either automatically or with aid of the human operator. The computer system 403 is a duplex computer arrangement, nearly identical to the computerized vehicle-control system 40, and includes a computer monitor 411 which displays the status messages which each of the ride vehicles have transmitted to the central controller by rf transmission, including information indicative of operating mode, path position and ride program selection. In this way, it may be seen that if a fault condition arises on one or more of the vehicles, the human operator may take action as appropriate, including removing the vehicle from active operation within the attraction, shutting-down a particular zone, or shutting-down ac power for the entire attraction.

Figure 50:
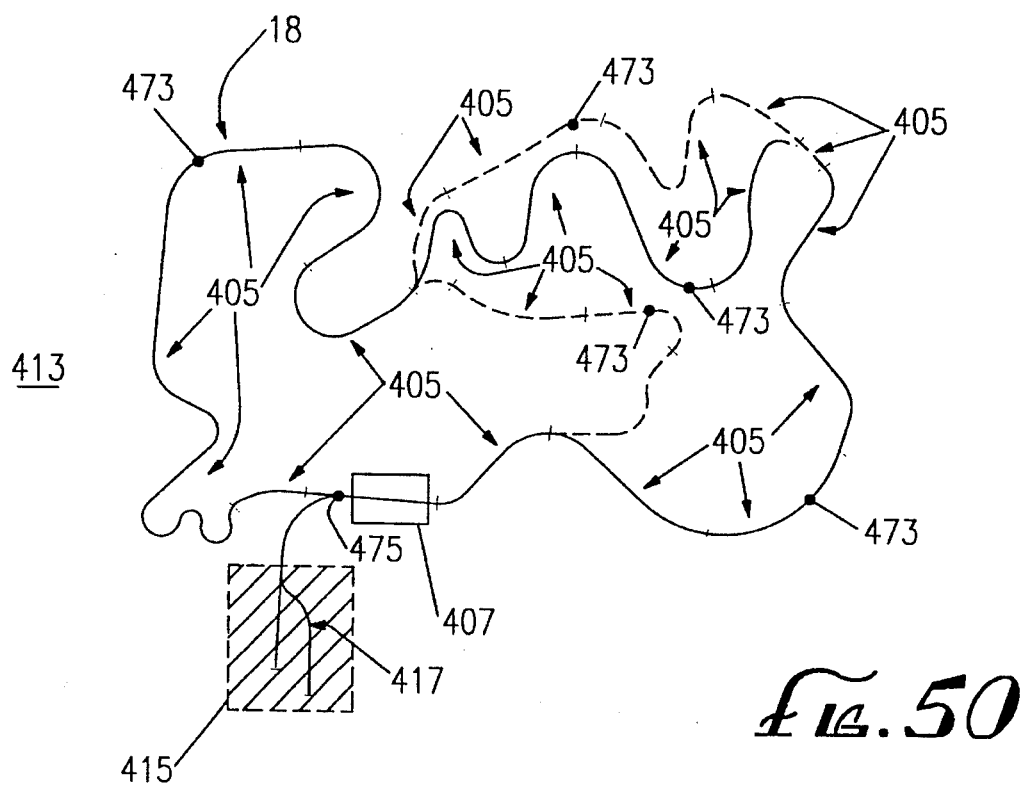
FIG. 50 is a schematic of a closed-loop path, Wayside Station and maintenance yard of an amusement attraction, upon which a plurality of ride vehicles may be operated. A plurality of zones of the closed-loop path are also shown, and in addition, a number of selective, alternative closed-loop paths are shown in phantom.

Ideally, the control tower 401 is mounted within the Wayside Station 407, at which passengers 48 may embark and disembark each of the plurality of the ride vehicles 10. FIG. 50 shows a schematic layout of one possible amusement attraction 413 showing this arrangement of Wayside Station 407, the closed-loop path 18, and a maintenance yard 415, consisting of a branched-track portion 417 and other repair and maintenance facilities (not shown). The closed-loop path 18 and branched-track portion 417 each feature the above-mentioned six bus bar 95, power bus 97 arrangement, and are divided into contiguous zones 405, as described earlier.

The computer system 403 at the Wayside Interface is coupled to receive the no-go signal for each zone 405. It is also coupled to the go signal for each zone with the ability to, in response to receipt of a no-go signal for a particular zone, selectively stop ride vehicle motion in the immediately preceding zone. In addition, the computer system 403 also controls three power switches (not shown) which are operated as a single unit to turn on and off three-phrase power to the path 18 on a global-basis. In this manner, if an emergency condition should develop, all ride vehicles within the attraction may be instantaneously halted.

One of the primary purposes of control tower 401 is to control vehicle movement within the Wayside Station area (FIG. 51), including the assumption of control over a ride vehicle that enters the Wayside Station 407 (in the direction indicated by the reference numeral 425), subsequent advancement to a hold area 419, to a subsequent passenger loading/unloading area 421, to a seat belt check area 423, and finally, the return of control over vehicle movement to the particular ride vehicle, in accordance with the selected ride program. Consequently, as shown in FIG. 52, the control tower 401 also mounts a number of manually-operated dispatch controls 425 that control the advancement of ride vehicles within the above-mentioned framework, e.g., to passenger loading/unloading area 421, and a computer keyboard or other interface 427. Upon activation of the appropriate control, the computer system 403 selectively controls the go signal within each of several zones 405 within the Wayside Station 407, to permit each vehicle to proceed to the next stop according to programmed, continuous motion. The Wayside Interface, prior to releasing control over vehicle motion to the selected ride program, requires a go signal from the human operator 409 that effectively indicates that all seatbelts aboard the vehicle have been fastened, and that the Wayside Interface may relinquish control to the particular ride vehicle. In addition to the above-mentioned controls 427 for vehicle advancement within the Wayside Station 407, the Wayside Interface will be primarily relied upon to move each ride vehicle between the closed looped path 18 and branched-track portion 417.

Periodically, the computer system 403 of the Wayside Interface requests each ride vehicle 10 to report its operating status. In addition, a ride vehicle 10 which is approaching the Wayside Station 407 is queried for its most recent operating status prior to entering the station. As described below, each ride vehicle develops diagnostic information which is transmitted to the Wayside Interface, including the vehicle's operating status, operating mode, fault indications for each vehicle's subsystem, logic fault indications from the vehicle's onboard computerized vehicle-control system 40, indicated by the voting mechanism above, current ride program selection, longitudinal position of the ride vehicle 10 along the path 18, vehicle I.D. and time of day.

Fault indications are generated as they arrive onboard each ride vehicle and are stored within a stack of each of the RCC 193 and RMC 195 for display at each of (1) the computer system 403 of the Wayside Interface, (2) a maintenance monitor (not shown in FIGS. 50–52) located within the vehicle's computerized vehicle-control system 40, at the rear of the ride vehicle 10, and (3) the programming console, mentioned below, when the programming console is used for maintenance and diagnostics. These messages principally include lateral (offset) and longitudinal (path) position errors, velocity and motion base errors, and hydraulic fluid over-temperature, warning and shutdown signals. Specific messages within the stack may be cleared at terminals associated with any of these three systems.

The remaining diagnostic information is requested by our communications by the Wayside Interface on both a periodic basis and at times when each ride vehicle is proximate to, and about to enter, the Wayside Station 407.

Thus, the Wayside Interface is responsible for coordinating vehicle motion along the path 18, and communicates with each ride vehicle 10 to obtain diagnostic information and to perform ride program selection from among a plurality of such programs. In addition, the Wayside Interface monitors the path 18 to advance the vehicles within the Wayside Station 407 and branched-track portions, to ensure that vehicles do not come too close to one another, and to ensure that no emergency conditions develop. To control these latter-activities, the Wayside Interface is placed in control of the 480-volt ac power supply on a global basis, and in addition, the go signals for each zone 405 along the path 18. Finally, the Wayside Interface through the control tower 401 provides the human operator 409 with information, digitally-transmitted from each vehicle, which informs the human operator as to the status of each vehicle, and permits alternate ride program selection. In the preferred embodiment, the software of the computer of the Wayside Interface randomly selects one ride program from among the plurality of programs stored in the $E^2PROM$ 211 of each ride vehicle 10, as a default operation. The software permits an additional mode of operation where the human operator 409 may select a particular ride program prior to the departure of the ride vehicle from the Wayside Station 407.

Another important feature of the Wayside Interface is to select particular ones of a plurality of ride vehicle programs. In one embodiment, this is done by radio frequency communication with each particular ride vehicle as it enters the Wayside Station. To this effect, both of the Wayside Interface and each vehicle features a radio frequency transceiver which allows their respective computer systems to remain in contact, transmitting digital information therebetween. Other contemplated embodiments respectively use one of infrared communication, transmission by a dedicated digital communication line of the power bus 97, or by power modulation of one of the phases of 480-volt power or the go signal.

In the preferred embodiment, however, portions of the path 18 include moving show sets that are actuated according to a predefined motion pattern. Ideally, this motion pattern is controlled by a motion computer of the computer system 403 of the Wayside Interface, which stores a plurality of motion patterns. The computer system 403 selects a particular pattern to be presented in the vicinity of a particular ride vehicle, and prior to that vehicle's attainment of a predetermined position, communicates corresponding selection information to the ride vehicle, which selects a particular ride program in response to the selection signal provided by the computer system 403. In this way, moving show sets may be manipulated in synchronicity with the ride vehicles, both cooperating to provide a number of different ride experiences. Thus, in this preferred embodiment, the computer system 403 uses radio frequency communication, and digitally addresses signals to specific vehicles to communicate show selection information prior to the time that they engage corresponding scenery, including moving show sets.

Exemplary Motions Patterns Illustrating The Use Of The Computerized Vehicle-Control System 40.

In accordance with one principal use of the invention, the amusement ride vehicle 10 is capable of enhancing the sensation of ride vehicle movement that is actually taking place, as well as providing the passengers 48 with realistic moving ride vehicle experiences that are not actually happening. Even when travelling along a path 18 without scenery, props, audio or other special effects, the ride vehicle 10 can be made to execute several distinct motion patterns, or sequences of motion patterns. These patterns can be programmed into the computerized vehicle-control system 40, or alternatively, provision can be made for motion control in response to manual control of the ride vehicle 10 or other manual command. In the context of the present invention, a motion pattern is defined as a sequence of movements by or attitudes of the motion base 24 and its corresponding actuators 50, 52, 54 and 126 that cause the passenger supporting structure 20 to move in a repeatable path in relation to the ground, and which may occur while the ride vehicle 10 is in motion along the path 18. The resulting motion pattern gives the passengers 48 a sensation that the ride vehicle 10 is undergoing directional maneuvers or surface conditions which may or may not actually be present. Below, a description of a number of exemplary motions and effects which may be created using ride vehicle motion and scenery will be described. This set of exemplary motions are a set of best presently contemplated motion patterns that the ride vehicle 10 will be called upon to perform in a typical amusement attraction. With this description of specific motions in mind, the steps of programming of the ride vehicles will be described, including description of the special programming console to program the ride vehicles and the off-line editor which are used to generate ride programs.

Figure 20:
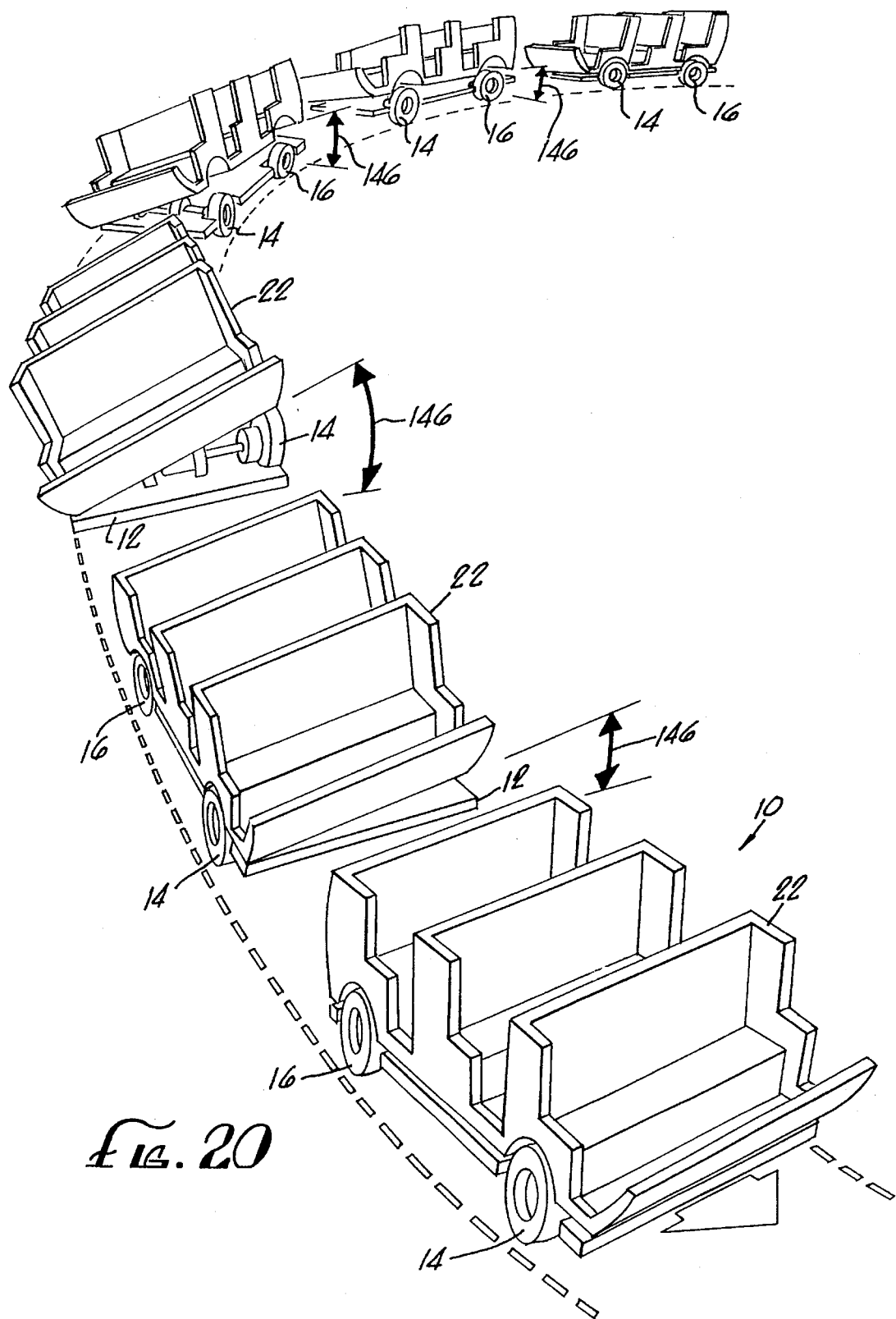
FIG. 20 is a perspective view of the ride vehicle showing it in various stages of turning a corner with outward roll of the passenger supporting structure.

FIG. 20 shows a motion pattern in which the ride vehicle 10 is in various stages of turning a corner 144. The sensation of turning the corner 144 is exaggerated by outward body roll relative to the ride vehicle chassis 12. This is accomplished by rotational acceleration of the passenger supporting structure 20 and the body 22 with respect to the ride vehicle chassis 12 about the roll axis of the ride vehicle 10. Prior to initiating the turn, the ride vehicle 10 is moved forward along the path 18 with the passenger supporting structure 20 in a substantially level position with respect to the ride vehicle chassis 12. As the wheels 14 or 16 are turned in a direction to follow the curved path 18, the passenger supporting structure 20 is simultaneously accelerated about the roll axis, in an outward direction with respect to the curved path 18, as indicated by the motion arrows 146. The degree of outward roll is increased until it reaches a maximum at the point where the ride vehicle is substantially at the apex of the curved path 18. This has the effect of exaggerating and enhancing the passenger's sensation of the speed and sharpness of the corner 144, thereby supplementing the normal sensations that would be experienced by the passenger when turning a corner in the absence of the outward roll. As the ride vehicle 10 begins to come out of the turn, the passenger supporting structure 20 is rolled back inward until it reaches a substantially level position with respect to the ride vehicle chassis 12, at the end of the turn.

During execution of the foregoing motion pattern, a further effect can be provided known as a wheel hopping effect. When turning a corner very sharp at a high rate of speed in a conventional automobile, it is common for the tires to alternately skid across the pavement an then grab the pavement in quick succession. This transmits a kind of "hopping" acceleration through the suspension of the conventional automobile. This same wheel hopping effect can be simulated very closely in the ride vehicle 10 by appropriate actuation of the motion base servo actuators 50, 52 and 54. These actuators can be manipulated to cause up and down movement of the passenger supporting structure 20 during the turning of the corner 144 which simulates the wheel hopping sensation.

Figure 21:
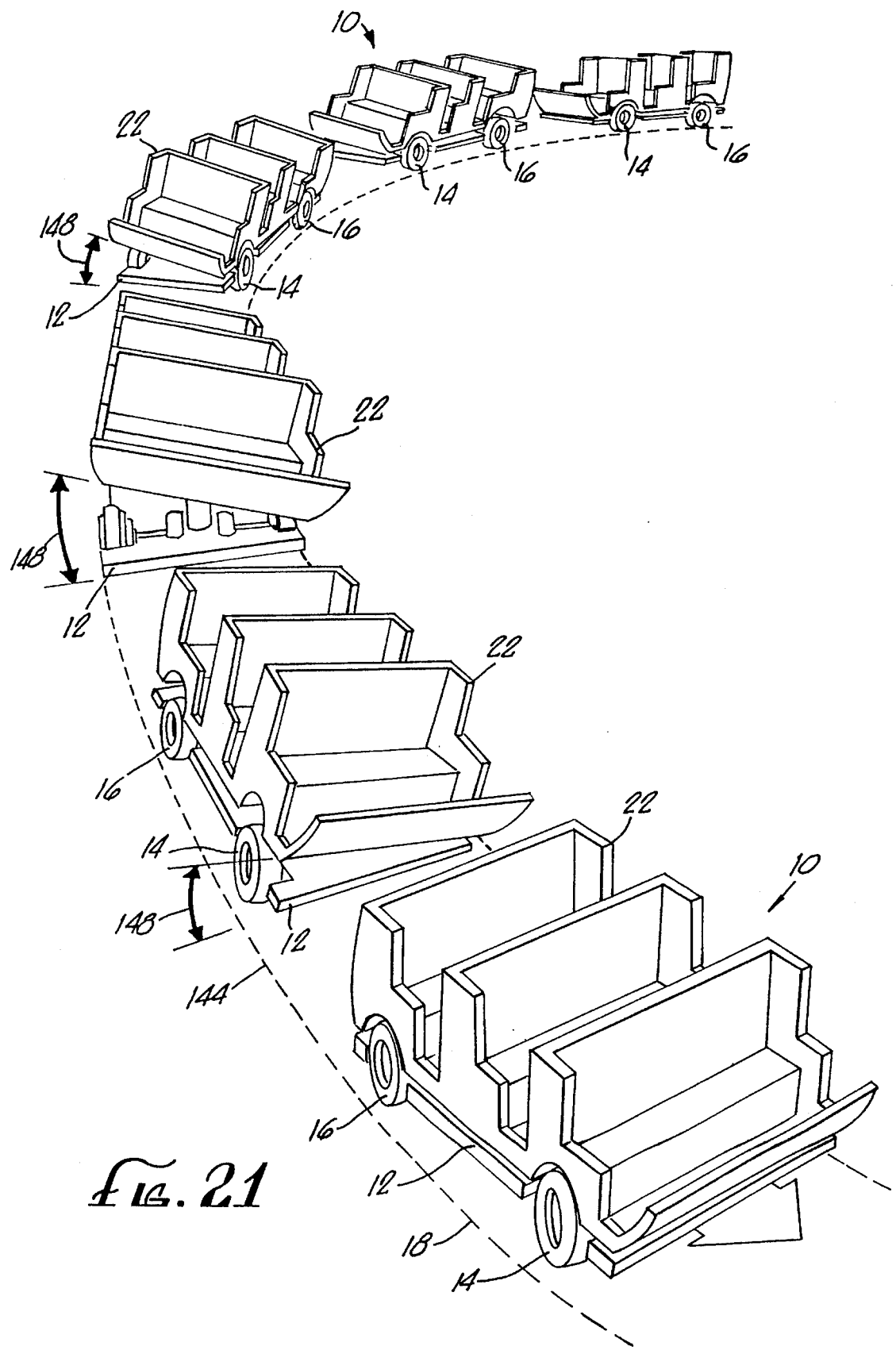
FIG. 21 is a perspective view of the ride vehicle showing it in various stages of turning a corner with inward roll of the passenger supporting structure.

FIG. 21 shows the ride vehicle 10 in various stages of turning a corner 144 with an inward roll. In this motion pattern, the ride vehicle 10 is moved along the path 18, prior to initiating the turn, with the passenger supporting structure 20 in a substantially level position with respect to the ride vehicle chassis 12, similar to the motion pattern described above in connection with FIG. 20. As the wheels 14 and 16 are turned in a direction to follow the curved path 18, the passenger supporting structure 20 is simultaneously accelerated about the roll axis in an inward direction with respect to the curved path 18, as indicated by the motion arrows 148. The degree of inward rolling movement of the passenger supporting structure 20 reaches a maximum point at the apex of the curved path 18. This has the effect of subduing and minimizing the passengers' sensation of the speed and sharpness of the corner 144, much like turning a corner on a banked road. As the ride vehicle 10 begins to steer out of the turn, the passenger supporting structure 20 is then rolled back outward until it reaches a relatively level position with respect to the ride vehicle chassis 12, at the end of the turn.

Figure 22:
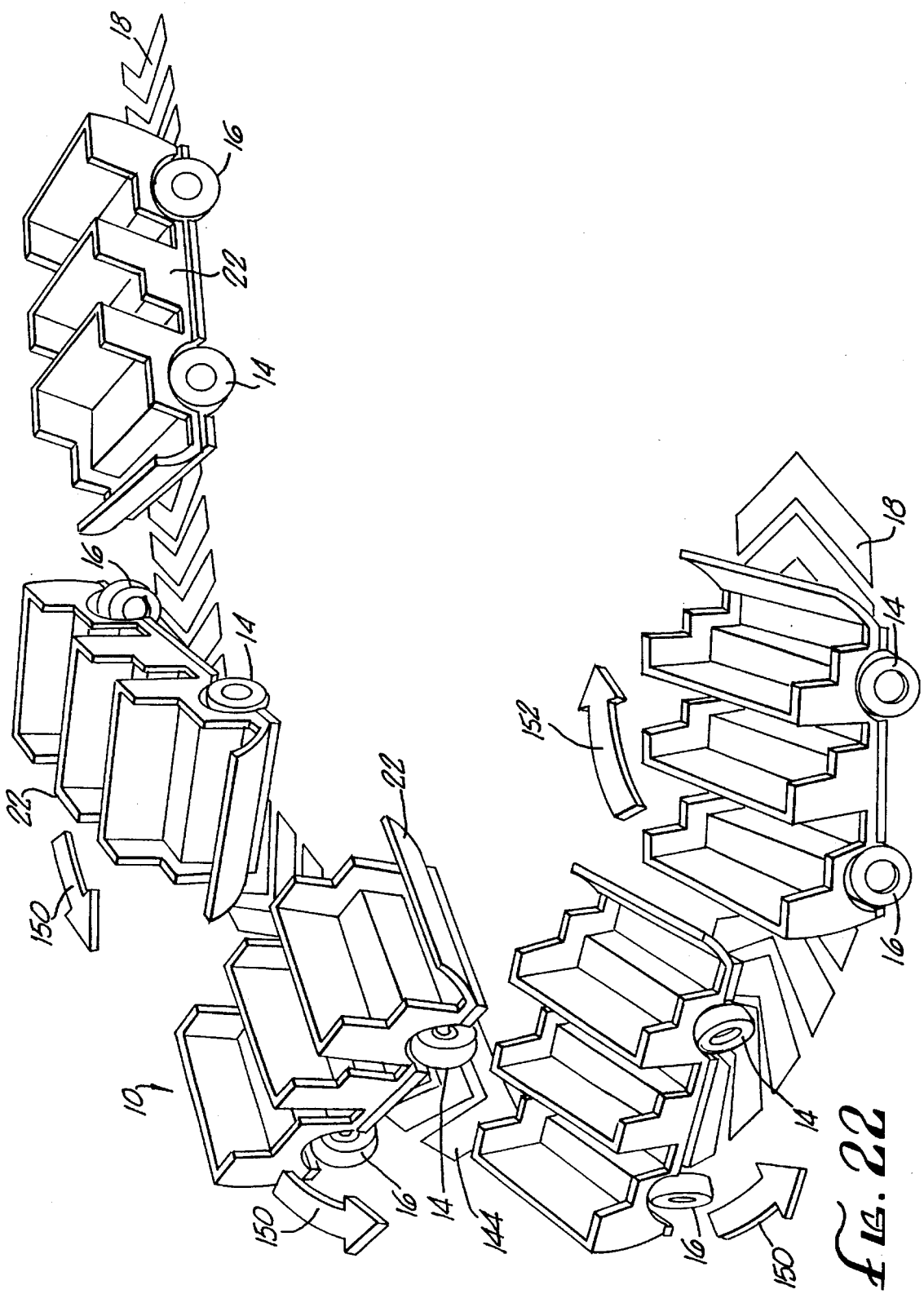
FIG. 22 is a perspective view of the ride vehicle showing it in various stages of turning a corner with four-wheel steering.

FIG. 22 shows another motion pattern in which the ride vehicle 10 is in various stages of turning a corner 144. In this motion pattern, however, the turning sensation experienced by the passengers is exaggerated by four-wheel steering, rather than by outward roll as shown in the motion pattern of FIG. 20. Accordingly, the ride vehicle 10 is moved forward along the path 18, and the passenger supporting structure 20 is kept in a substantially level position with respect to the ride vehicle chassis 12 at all times throughout the turn. As the ride vehicle 10 is about to enter the curved path 18 corresponding to the turn, both the front and rear wheels 14 and 16 of the ride vehicle 10 are simultaneously steered away from the direction of the turn. By steering the rear wheels 16 more than the front wheels 14, the back end of the ride vehicle 10 is caused to accelerate and swing outward during the turn, as indicated by the motion arrows 150, to give the simulated effect of sliding. After the ride vehicle 10 passes the apex of the turn, the front and rear wheels 14 and 16 are steered back inward into the turn, with the rear wheels 16 again steering more than the front wheels 14. This causes the back end of the ride vehicle 10 to accelerate and swing inward, as indicated by the motion arrow 152, and simulates the effect of further sliding of the ride vehicle 10 as it comes out of the turn. At the end of the turn, the wheels 14 and 16 can be made to steer straight ahead in preparation for the next motion pattern.

Figure 23:
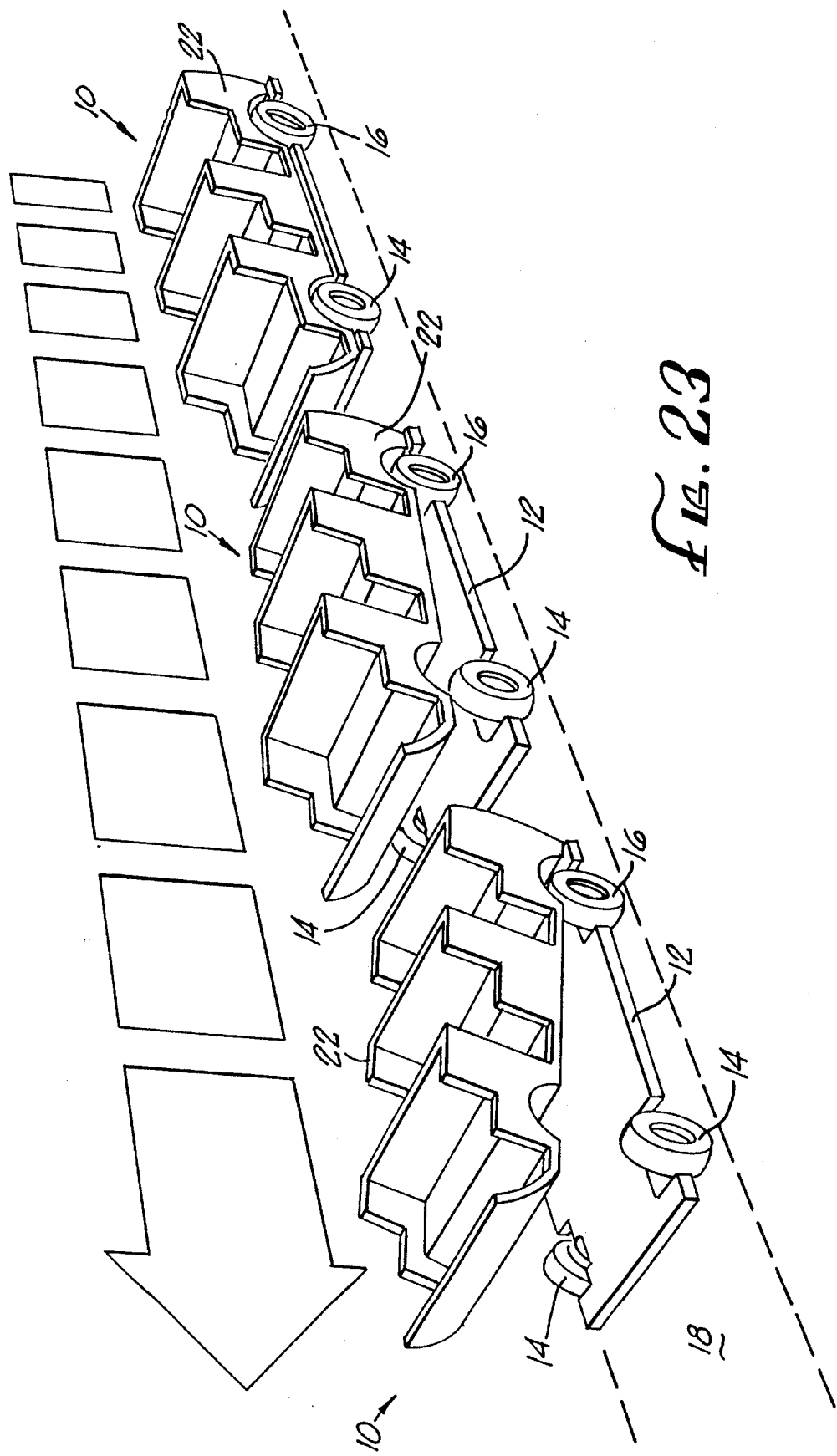
FIG. 23 is a perspective view of the ride vehicle showing it in various stages of forward acceleration with rearward pitch of the passenger supporting structure.

FIG. 23 shows the ride vehicle 10 in various stages of forward acceleration, utilizing rearward pitch to exaggerate the sensation of speed during acceleration. This is accomplished by rotational acceleration of the passenger supporting structure 20 with respect to the ride vehicle chassis 12 about the pitch axis of the ride vehicle 10. In this motion pattern, the ride vehicle 10 is accelerated quickly in the forward direction along the path 18. As soon as the ride vehicle 10 begins accelerating, the passenger supporting structure 20 is quickly pitched backward by accelerating and raising the front end about the pitch axis. This motion has the effect of exaggerating and enhancing the passengers' sensation of the acceleration of the ride vehicle 10 beyond the normal acceleration experienced in the absence of such pitching motion. When the ride vehicle 10 has substantially finished its forward acceleration, the passenger supporting structure 20 is gradually pitched forward by dropping the front end until it reaches a substantially level position with respect to the ride vehicle chassis 12. It will be understood that forward acceleration of the ride vehicle 10 may occur from a standing start or while the ride vehicle is already in motion.

Figure 24:
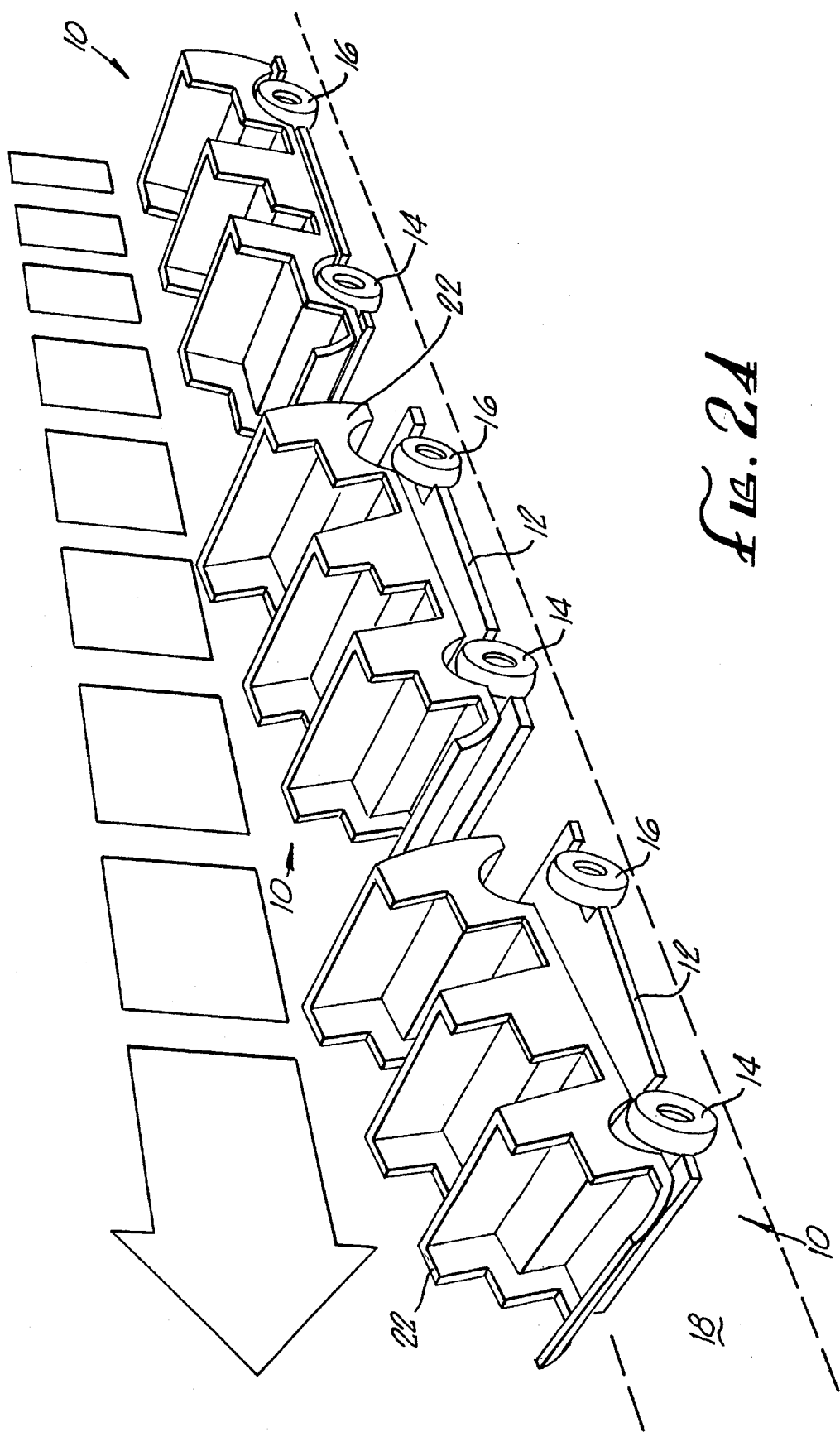
FIG. 24 is a perspective view of the ride vehicle showing it in various stages of decelerating or braking with forward pitch of the passenger supporting structure.

FIG. 24 shows the ride vehicle 10 in various stages of decelerating or braking, as exaggerated by forward pitch. In this motion pattern, as the ride vehicle 10 moves in a forward direction along the path 18, the ride vehicle is quickly decelerated, for example, by applying the brakes 46. As soon as the ride vehicle 10 begins decelerating, the passenger supporting structure 20 is quickly pitched forward with respect to the ride vehicle chassis 12 by accelerating and raising the rear end about the pitch axis. When the ride vehicle 10 has stopped or otherwise finished decelerating, the passenger supporting structure 20 is quickly pitched backward with respect to the ride vehicle chassis 12 by lowering the rear end to a substantially level position with respect to the ride vehicle chassis. This motion of the ride vehicle 10, as enhanced by forward pitching of the passenger supporting structure 20, substantially exaggerates and enhances the passengers' sensation of the braking of the ride vehicle.

In the motion patterns described above connection with FIGS. 20–21 and 23–24, it will be understood that the acceleration, speed and extent to which the passenger supporting structure 20 is rolled inward or outward during a turn, or pitched rearward or forward during acceleration or deceleration of the ride vehicle 10, will govern the simulated degree of ride vehicle motion sensed and experienced by the passengers. The quicker and further the passenger supporting structure 20 is rolled and pitched, the more exaggerated will be the sensation of motion, and vice versa.

Figure 25:
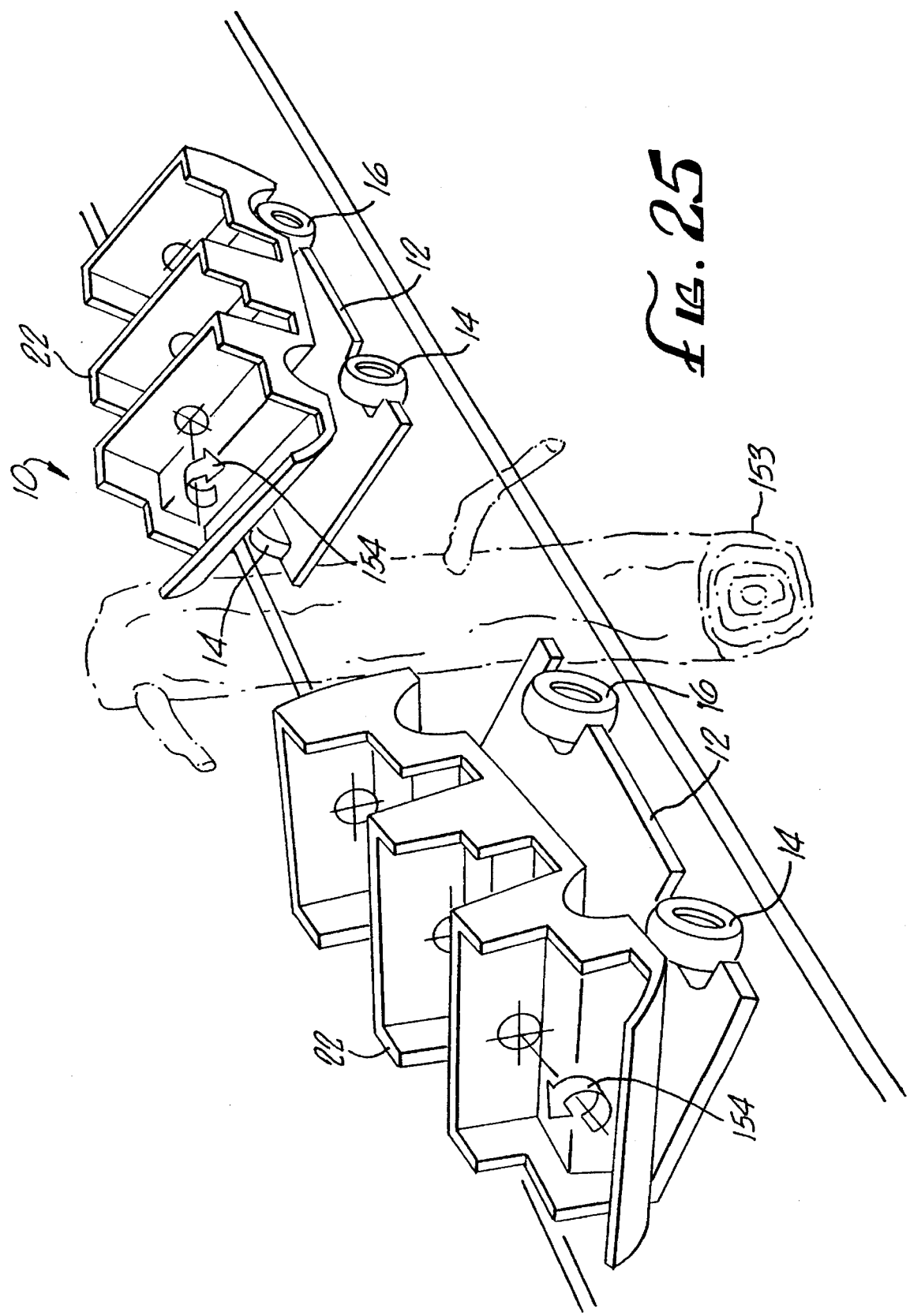
FIG. 25 is a perspective view of the ride vehicle showing it moving in a forward direction with motion of the passenger supporting structure to simulate the effect of travelling over a bump or other object.

FIG. 25 shows a motion pattern in which the ride vehicle 10 is moving in a forward direction with motion of the passenger supporting structure 20 designed to simulate the effect of traveling over a bump or other object. This motion pattern involves moving the ride vehicle 10 forward along the path 18 to a point corresponding to the location of an imaginary object. When the ride vehicle 10 reaches this point, the passenger supporting structure 20 is quickly pitched backward and then forward by causing the front end of the passenger supporting structure 20 to quickly raise up and then down with respect to the ride vehicle chassis 12 as the front of the ride vehicle passes the point corresponding to the location of the imaginary object. This simulates the effect of the front wheels 14 travelling over the object. After waiting for an elapsed distance travelled by the ride vehicle 10 that corresponds to the rear of the ride vehicle 10 reaching the imaginary object, the passenger supporting structure 20 is quickly pitched forward and then backward by causing the rear end of the passenger supporting structure 20 to quickly raise up and then down with respect to the ride vehicle chassis as the ride vehicle continues to move forward past the imaginary object. This simulates the effect of the rear wheels 16 traveling over the object. Depending upon the type of imaginary object to be "run over," the pitching motion of the passenger supporting structure 20 described above may be combined with outward roll (i.e., rotational acceleration) from one side to the other, as may be desired to achieve a particular effect. An example of rolling motion from side to side is designated by the motion arrows 154 of FIG. 25.

A further aspect of the motion pattern illustrated in FIG. 25 involves pitching the passenger supporting structure 20 forward and backward for several cycles after the ride vehicle 10 has passed the imaginary object. This gives the passengers the sensation normally experienced after a ride vehicle travels over an actual object. Thus, as the distance between the ride vehicle 10 and the imaginary object increases, the amplitude of the pitching motion is decreased until the passenger support structure 20 is returned to a substantially level position with respect to the ride vehicle chassis 12. Of course, the degree of pitching motion and the corresponding number of cycles and amplitude can be varied, depending upon the size of the object and the ride experience to be conveyed.

Figure 26:
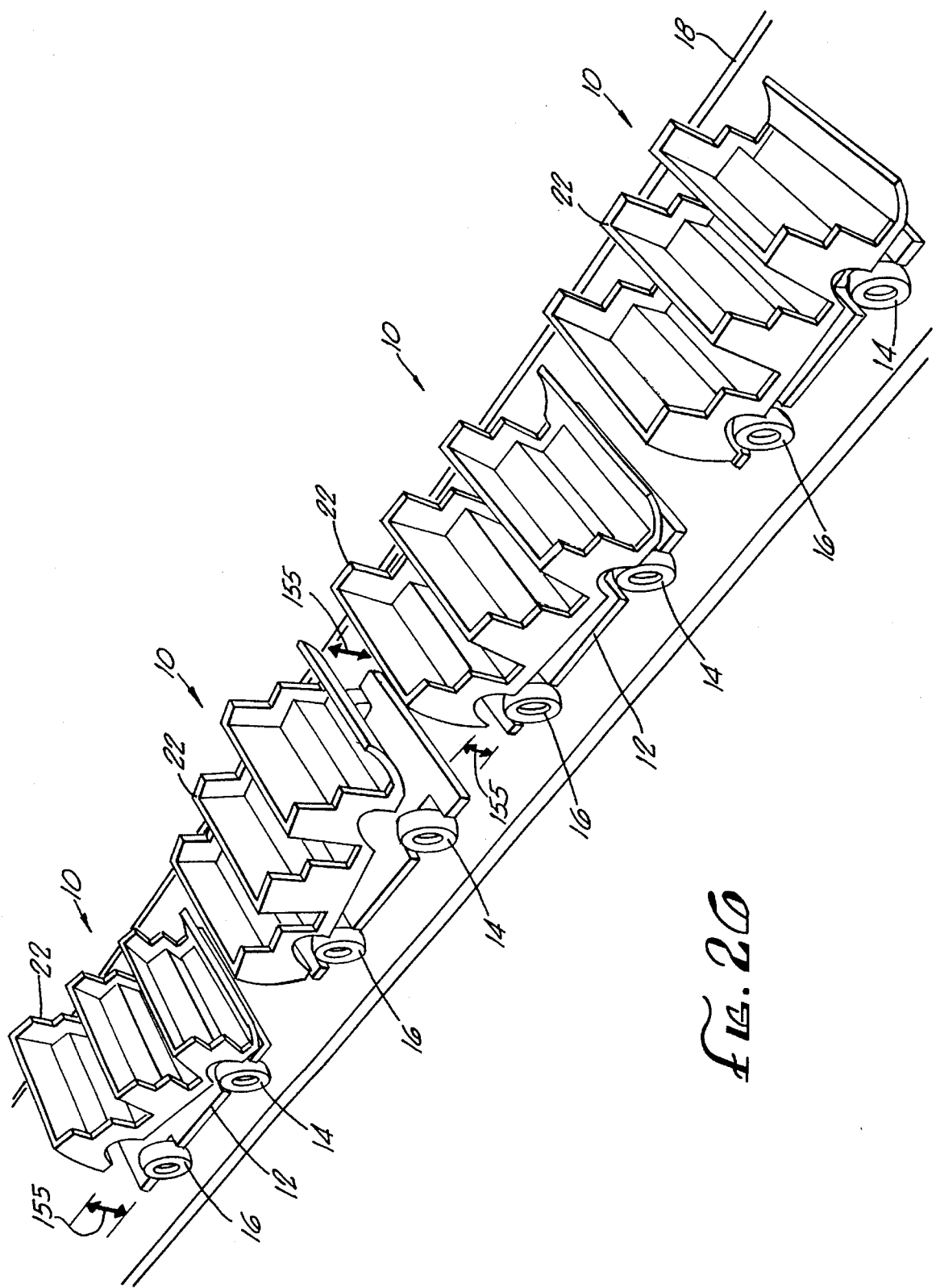
FIG. 26 is a perspective view of the ride vehicle showing it moving in a forward direction with motion of the passenger supporting structure to simulate the effect of travelling over a dip or ditch.

FIG. 26 shows the ride vehicle 10 moving in a forward direction with motion designed to simulate the effect of traveling over a dip or ditch. In this motion pattern, the ride vehicle 10 is moved forward to a point corresponding to the location of the imaginary dip. When the ride vehicle 10 reaches this point, the rear end of the passenger supporting structure 20 is raised up and then dropped back down as the ride vehicle passes the point corresponding to the location of the imaginary dip. This motion simulates the effect of the front wheels 14 entering the dip. After waiting for an elapsed distance travelled by the ride vehicle 10 that corresponds to the rear of the ride vehicle 10 reaching the imaginary dip, the front end of the ride vehicle is raised up and then moved back down as the ride vehicle continues to move forward past the imaginary dip. This motion simulates the effect of the rear wheels 16 traveling through the dip. Hence, the total experience conveyed by this motion pattern, indicated by the motion arrows 155, is the simulated effect of going over a dip that is not actually present in the path 18 followed by the ride vehicle 10.

In one aspect of the foregoing motion pattern, the forward and backward pitching motion of the passenger supporting structure 20 is continued for several cycles after the ride vehicle 10 passes the imaginary dip. As discussed above in connection with the motion pattern involving the simulated effect of driving over an imaginary object, this continuation of the pitching motion gives the passengers the sensation of being in a conventional ride vehicle having shock absorbers that dampen the ride vehicle's motion after traveling over the dip. Thus, as the distance between the ride vehicle 10 and the imaginary dip increases, the amplitude of the pitching motion of the passenger supporting structure 20 with respect to the ride vehicle chassis 12 is decreased until the passenger supporting structure 20 is returned to a substantially level position at a predetermined distance from the imaginary dip.

Figure 27:
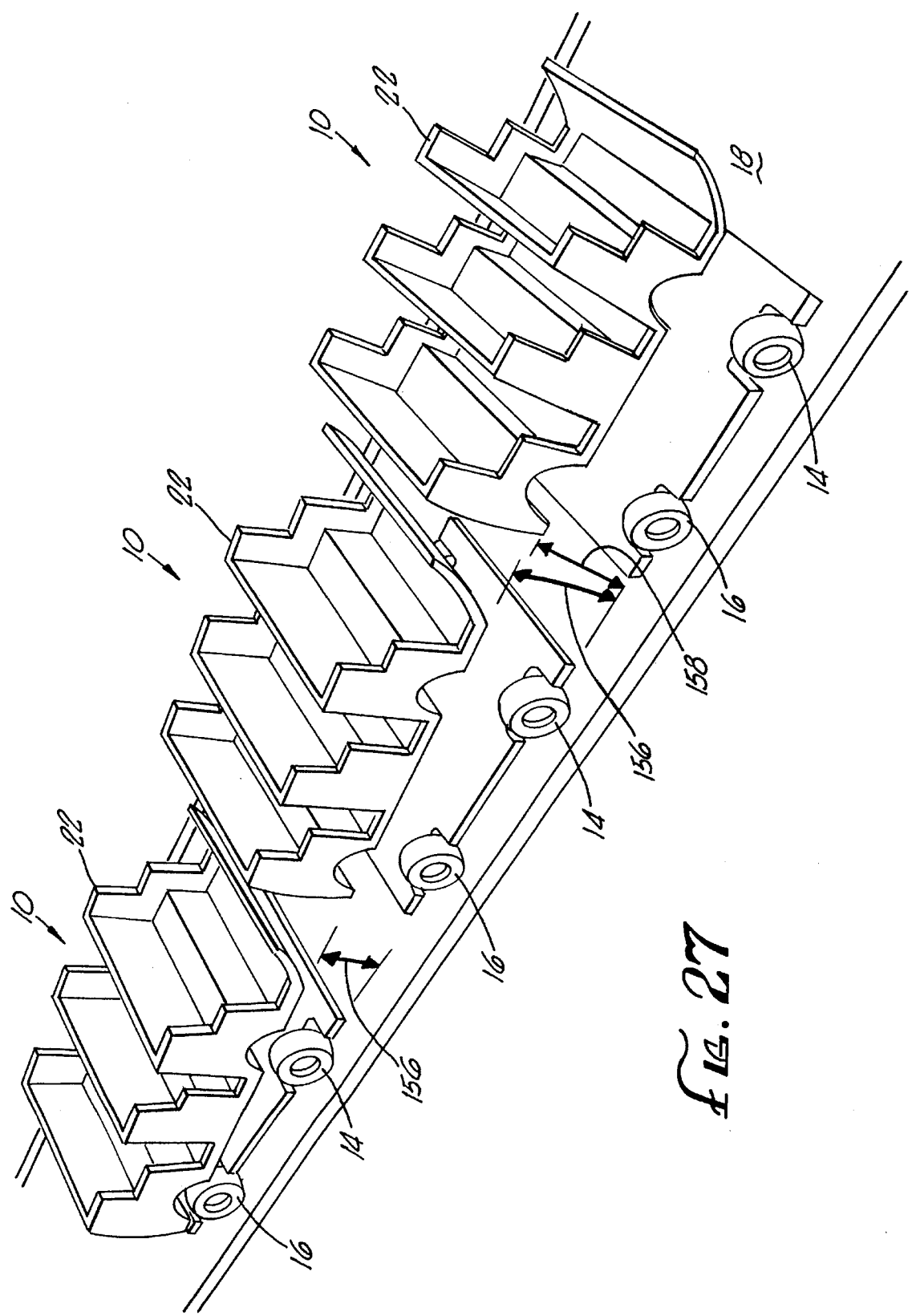
FIG. 27 is a perspective view of the ride vehicle showing it moving in a forward direction with motion of the passenger supporting structure to simulate the effect of climbing a hill.

FIG. 27 shows the ride vehicle 10 moving in a forward direction with motion designed to simulate the effect of climbing a hill. In this motion pattern, as the ride vehicle 10 moves in a forward direction along the path 18, the passenger supporting structure 20 is pitched backward by accelerating and raising the front end about the pitch axis, as indicated by the motion arrow 156. The passenger supporting structure 20 is kept in this pitched position, and then both the front and rear end are raised together as the imaginary hill is climbed. Finally, the front end is kept at a fixed, elevated position while the rear end of the passenger supporting structure 20 is raised until it reaches a position substantially level with respect to the ride vehicle chassis 12 at the end of the climb, as shown by the motion arrow 158.

Figure 28:
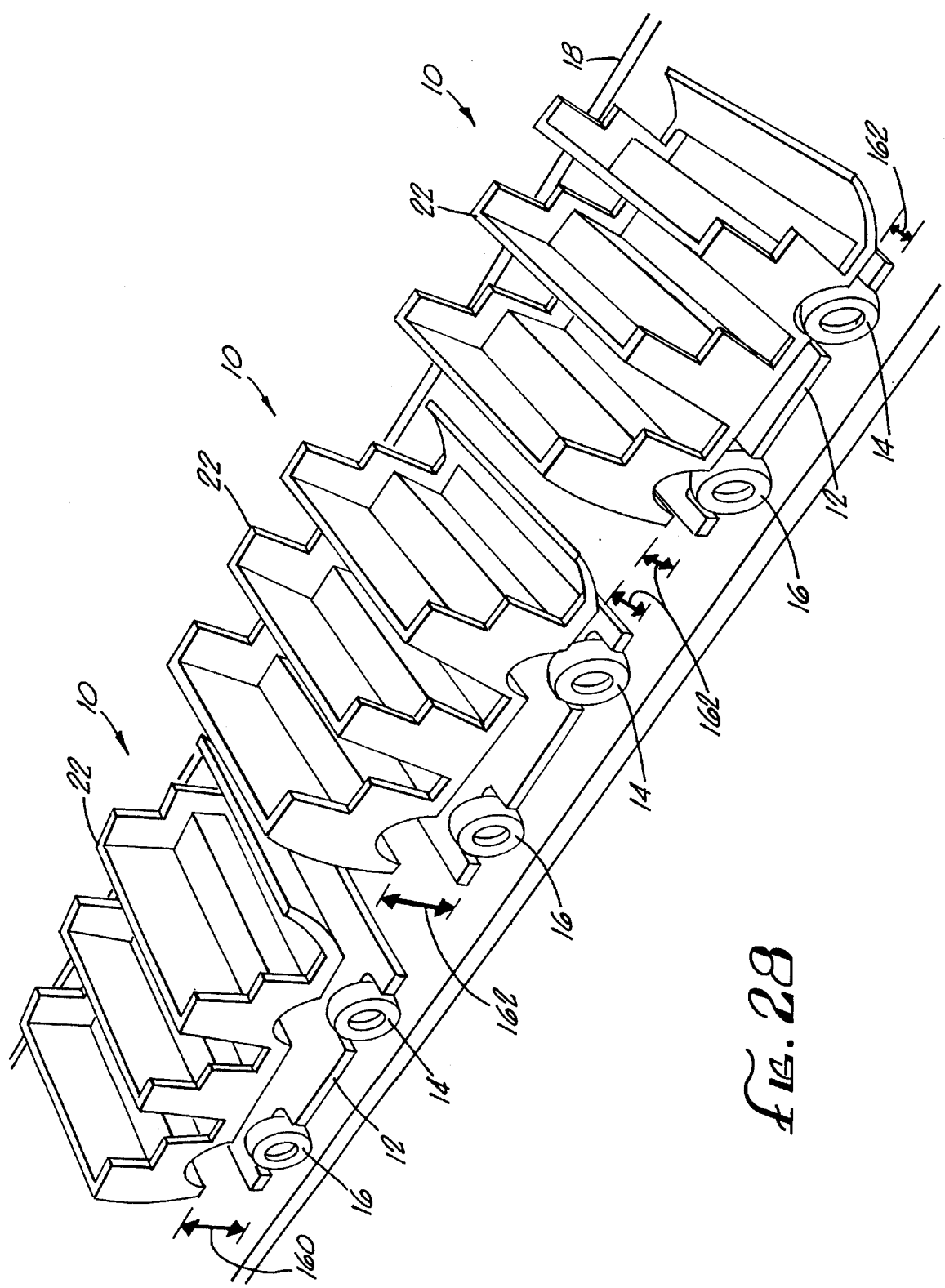
FIG. 28 is a perspective view of the ride vehicle showing it moving in a forward direction with motion of the passenger supporting structure to simulate the effect of descending a hill.

FIG. 28 shows the ride vehicle 10 moving in a forward direction with motion designed to simulate the effect of descending a hill. This motion pattern, which is essentially the reverse of the motion pattern of FIG. 27, involves moving the ride vehicle 10 forward along the path 18 with the passenger supporting structure 20 in a substantially horizontal but elevated position with respect to the ride vehicle chassis, as indicated by the motion arrow 160. The imaginary hill is descended by initially pitching the passenger supporting structure 20 forward by accelerating and lowering the front end about the pitch axis. The passenger supporting structure 20 is kept in this pitched position as the imaginary hill is descended, while both the front and rear end are lowered together, as indicated by the motion arrows 162. At the bottom of the imaginary hill, the rear of the passenger supporting structure 20 is dropped down until it reaches a position substantially level with respect to the ride vehicle chassis 12.

Figure 29:
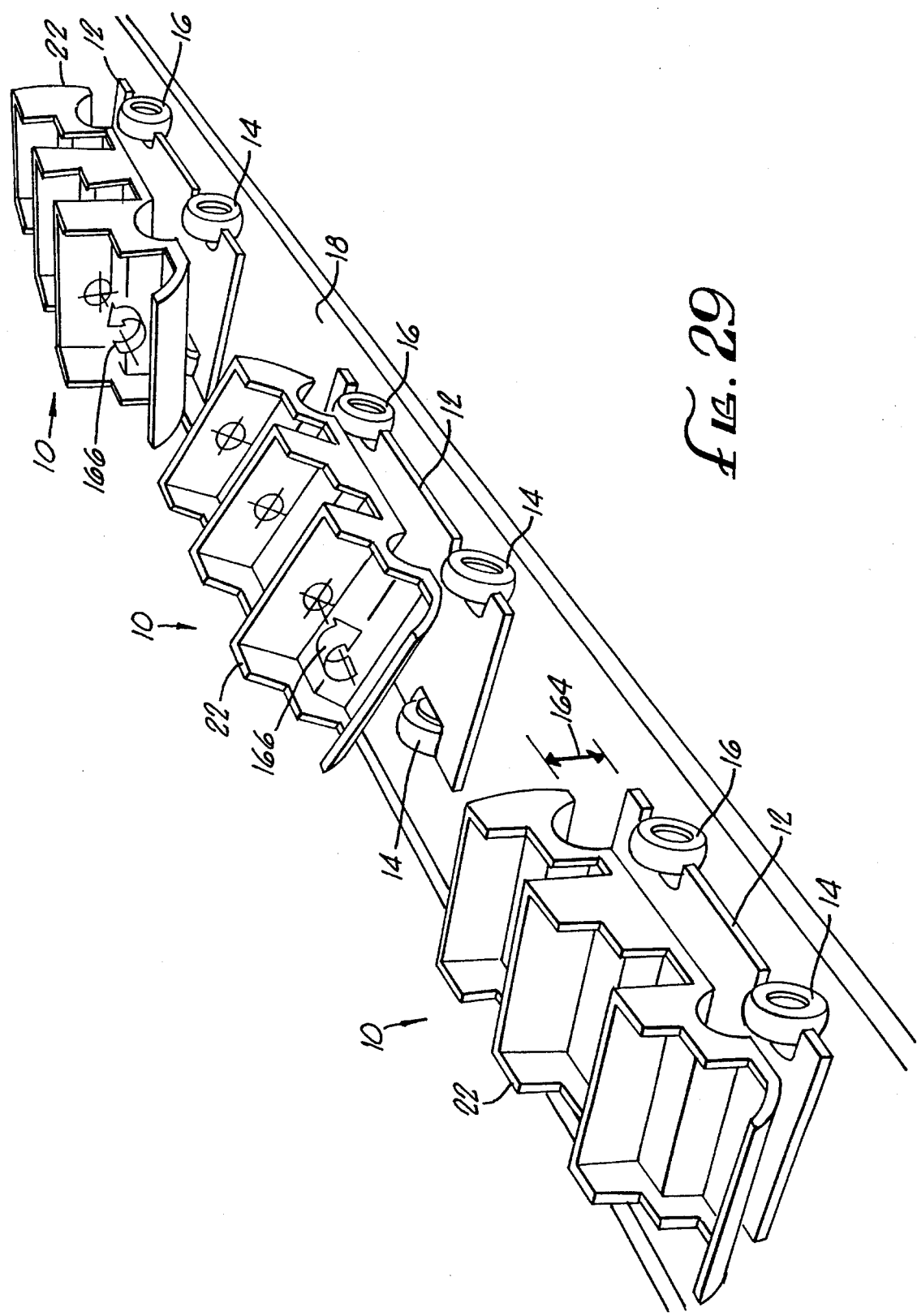
FIG. 29 is a perspective view of the ride vehicle showing it moving in a forward direction with motion of the passenger supporting structure to simulate the effect of floating or flying.

FIG. 29 shows the ride vehicle 10 moving in a forward direction with motion designed to simulate the effect of floating or flying. In this motion pattern, the ride vehicle 10 is moved forward along the path 18 while gently rolling and pitching the passenger supporting structure 20 through rotational accelerations about the roll and pitch axes in a random fashion with respect to the ride vehicle chassis 12, as indicated by the motion arrows 164 and 166. As described in more detail below, the addition of audio and special effects in combination with this motion pattern can provide a realistic moving ride vehicle experience which is not actually taking place.

Figure 30:
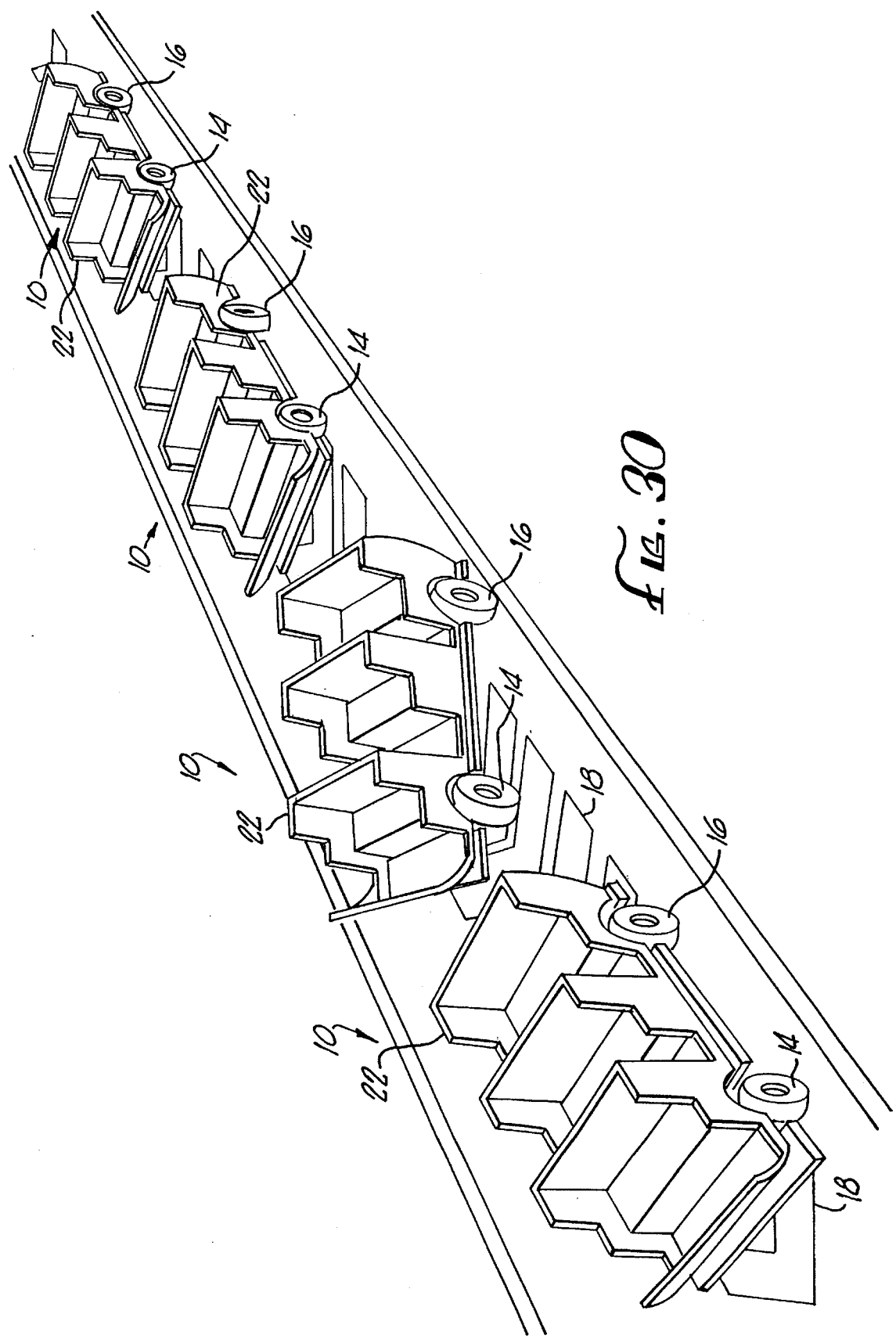
FIG. 30 is a perspective view of the ride vehicle showing it moving in a forward direction with four-wheel steering to simulate the effect of fishtailing.

FIG. 30 shows the ride vehicle 10 moving in a forward direction with four-wheel steering designed to simulate the effect of fishtailing. In this motion pattern, the ride vehicle 10 is initially moving forward along the path 18 in a substantially straight line. Then, both the front and rear wheels 14 and 16 are steered simultaneously in one direction, and then quickly in the opposite direction. This causes the ride vehicle 10 to move back and forth in the yaw direction, while keeping the center of gravity of the ride vehicle in substantially a straight line. Thus, even though the ride vehicle 10 is not actually fishtailing, the motion pattern described above accurately simulates that effect.

Figure 31:
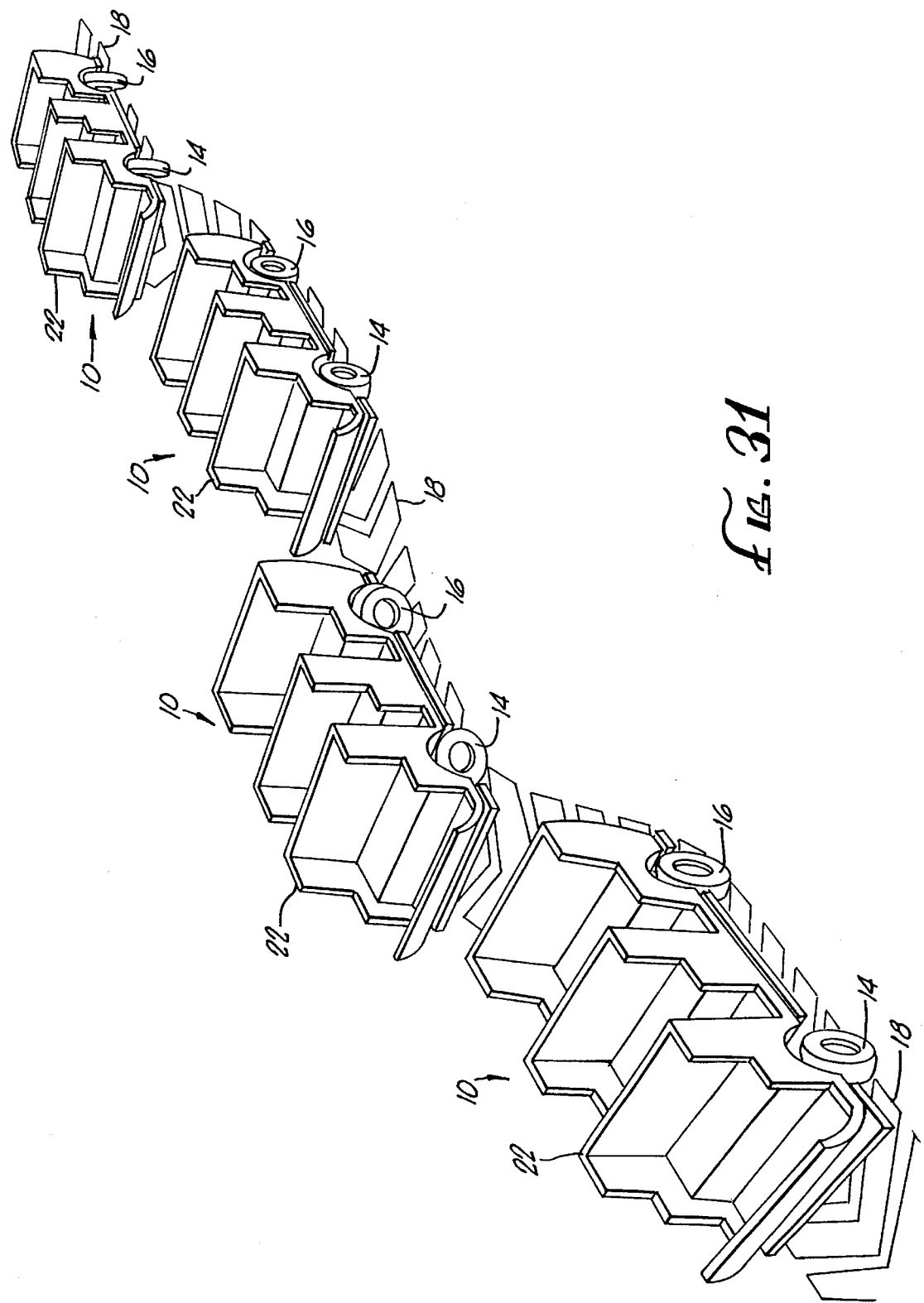
FIG. 31 is a perspective view of the ride vehicle showing it moving in a forward direction with four-wheel steering to simulate the effect of side to side swaying.

FIG. 31 shows the ride vehicle 10 moving in a forward direction with four-wheel steering designed to simulate the effect of side-to-side swaying. In this motion pattern, the ride vehicle 10 is initially moved forward along the path 18 in substantially a straight line. Both the front and rear wheels 14 and 16 are then steered simultaneously in one direction, causing the ride vehicle 10 to move to one side of the path 18. The wheels 14 and 16 are then straightened out momentarily to gradually move the ride vehicle 10 in the forward direction. Then, both the front and rear wheels 14 and 16 are steered simultaneously in the opposite direction causing the ride vehicle 10 to gradually move to the other side of the path 18. This ride vehicle motion caused by four-wheel steering can be repeated for as long as desired to simulate the effect of side-to-side swaying.

The motion patterns described above are examples of some of the many motion patterns that can be executed by the ride vehicle 10. It will be appreciated that appropriate articulation of the passenger supporting structure 20 in combination with the ride vehicle's speed and steering capabilities will enable additional motion patterns to be created beyond those illustrated here. Therefore, the invention should not be considered to be limited to only those specific motion patterns illustrated and described herein.

When the basic ride vehicle motion patterns described above are combined with scenery 42, props, and various special effects incorporated into an amusement attraction or other environment, a vast multitude of ride experiences are possible. Thus, various ride experiences may be provided by appropriately moving the ride vehicle 10 along the path 18 at a selected direction and rate of speed, by providing scenery 42 and other props that are appropriate to the ride experience to be conveyed, and by articulating the passenger supporting structure 20 with respect to the ride vehicle chassis 12 in a predetermined motion pattern to enhance, diminish, or entirely simulate the effect of ride vehicle motion through the attraction at selected locations along the path 18. Special effects also can be introduced for enhancing the sensations experienced by the passengers as the ride vehicle 10 interacts with the path 18 and scenery 42. FIGS. 32–49 illustrate, by way of example, specific sections of an amusement attraction which are combined with various motion patterns of the ride vehicle 10 and other effects to provide particular ride experiences to the passengers. These ride experiences will now be described.

Figure 32:
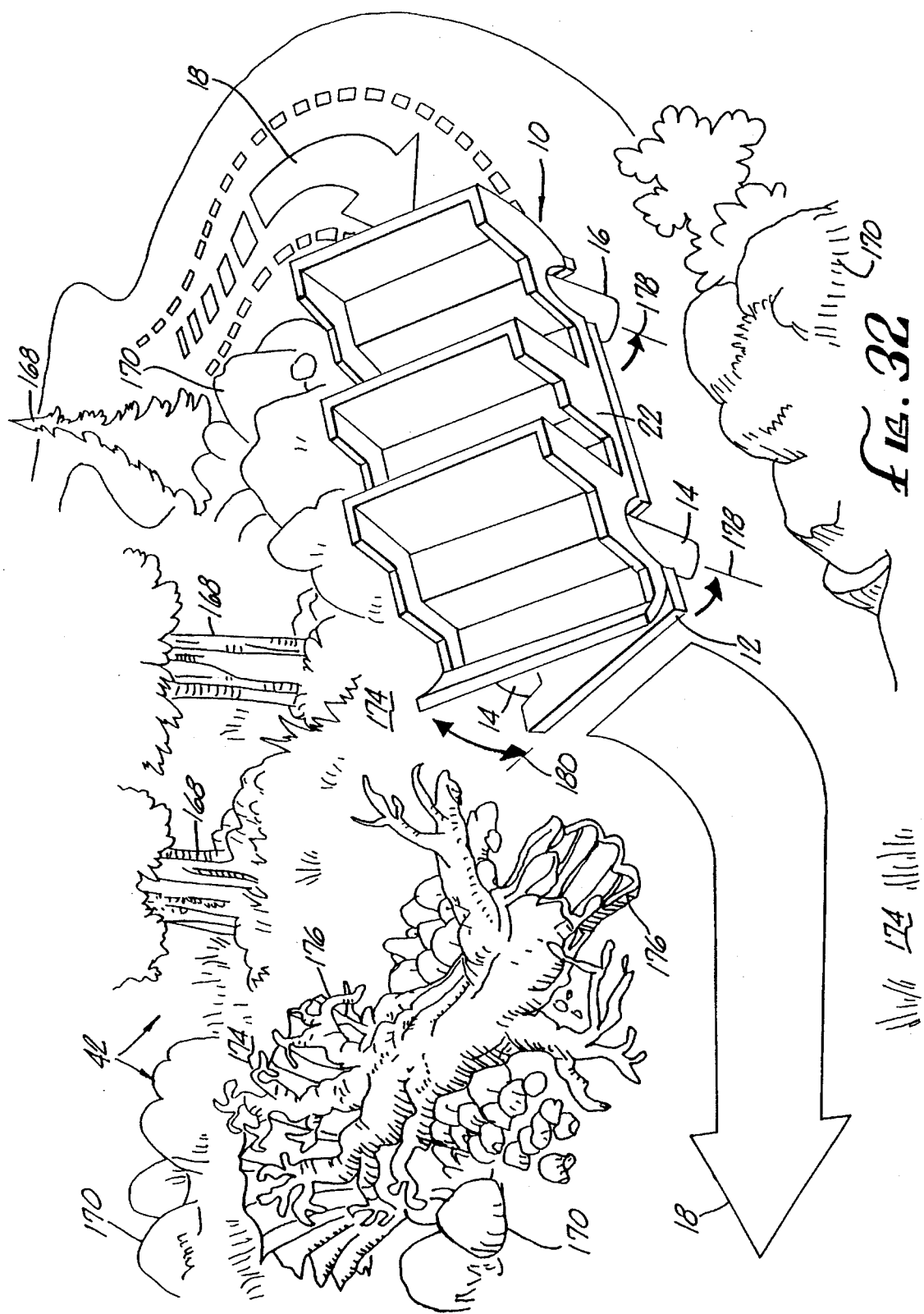
FIG. 32 is a perspective view of the ride vehicle as it moves through an attraction, in which four-wheel steering, outward body roll and other effects are used to simulate the effect of a sliding turn on a twisting road.

FIG. 32 shows the ride vehicle 10 moving along the path 18 in one area of the amusement attraction. In this area of the attraction, the ride experience to be provided is the simulated effect of a sliding turn on a twisting road. Accordingly, stationary scenery 42, having a horizontal horizon in the form of trees 168, rocks 170, bushes 172 and grass 174, is appropriately and artistically arranged along the path 18 that is to be followed by the ride vehicle. An object 176, such as a fallen tree or log, appears to protrude in the ride vehicle's path 18. As the ride vehicle 10 moves along the path 18 in a forward direction approaching the log 176, all four wheels 14 and 16 of the ride vehicle 10 are abruptly steered in a direction away from the log in the direction of the arrows 178. This quickly steers the ride vehicle 10 away from the log 176 in a manner that conveys the impression to the passengers that the log was almost hit by the ride vehicle. The four-wheel steering thus simulates the effect of a sliding turn. As soon as all wheels 14 and 16 of the ride vehicle 10 are steered in a direction away from the log 176, the passenger supporting structure 20 is also rolled simultaneously outward with respect to the ride vehicle chassis 12 in a direction away from the log 176. As shown by the motion arrow 180 in FIG. 23, this motion of the passenger supporting structure 20 can be accomplished by rotational acceleration and raising of the right side of the passenger supporting structure 20 with respect to the ride vehicle chassis 12.

As the ride vehicle 10 initiates and then completes its sliding turn, various special effects can be introduced to enhance the sensation of motion and the overall ride experience enjoyed by the passengers. These special effects include the sounds of engine roar and skidding corresponding to motion of the ride vehicle 10 along the path 18. The effect of flying gravel also can be introduced during the abrupt turning motion of the ride vehicle 10 away from the log 176, indicated by the arrows 178. Once the ride vehicle 10 safely passes the log 176, the passenger supporting structure 20 and the body 22 can be returned to a normal level position with respect to the ride vehicle chassis 12 and the ride vehicle can continue along the path 18 through the attraction and towards the next ride experience.

Figure 33:
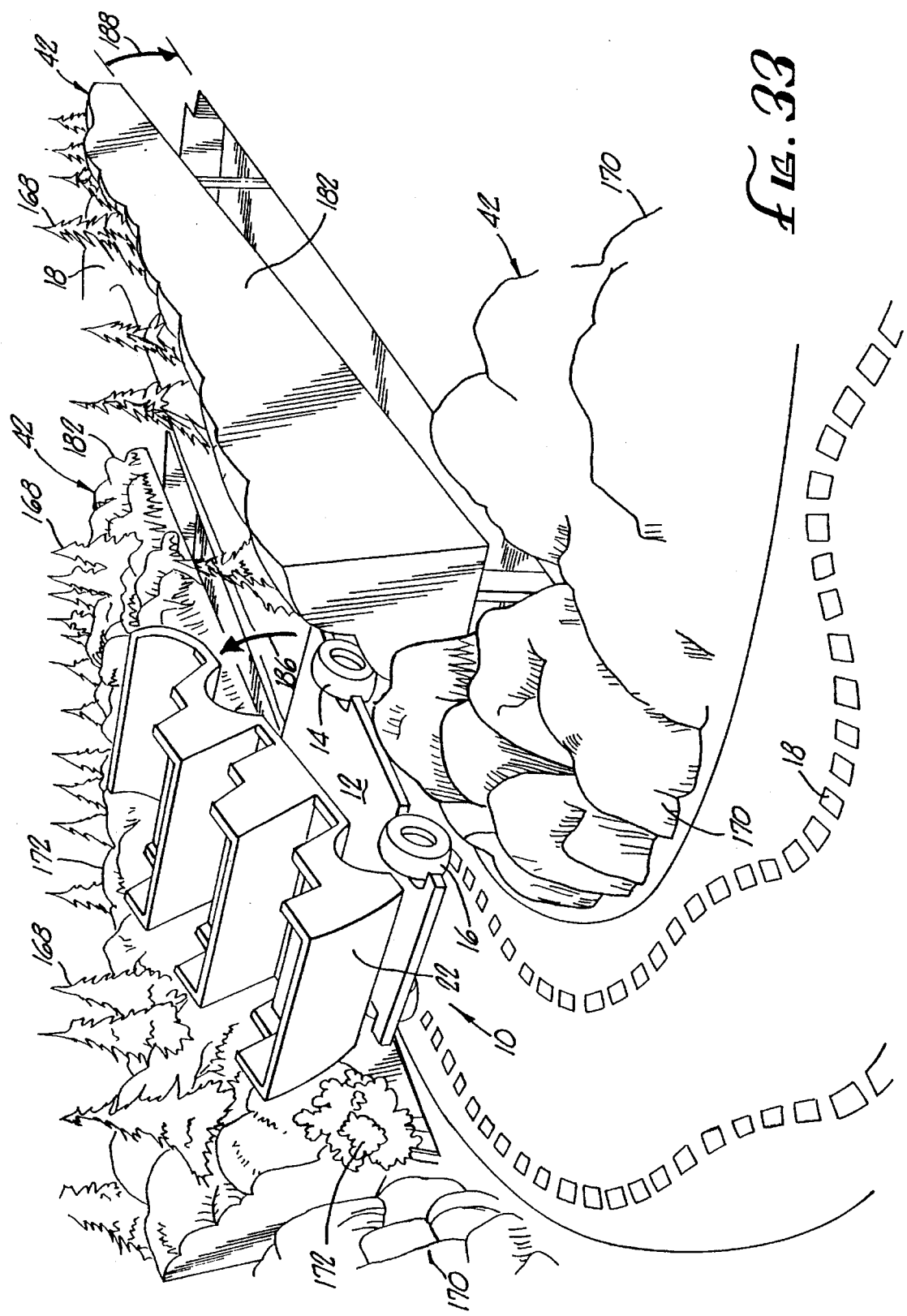
FIG. 33 is a perspective view of the ride vehicle as it moves through an attraction, in which rearward body pitch and other effects are used to simulate the effect of climbing a hill in the vehicle.

FIG. 33 shows the ride vehicle 10 in another area of the amusement attraction, where the ride experience to be provided is the simulated effect of climbing a hill in the ride vehicle. In this ride experience, the ride vehicle 10 travels along the path 18 to a point where it reaches the bottom of the hill. At that point, passengers in the ride vehicle 10 will be presented with initially stationary scenery 42, which has a horizon that angles downward in a direction towards the ride vehicle as it approaches. This scenery 42 may be constructed on moving show sets 182 on opposite sides of the path 18 in the form of trees 168, rocks 170 and bushes 172. Before the ride vehicle 10 actually approaches, the sets 182 are elevated by hydraulic actuators 184 or the like at the downward angle described above. After the ride vehicle 10 passes, the sets 182 can be returned to a normal horizontal position.

As will be described further below, there are a number of ways of actuating moving show sets such as those discussed above. The simplest way to do this is to have a sensor that is coupled to the hydraulic actuators 184, which detect the approach of a ride vehicle and trigger a predefined motion pattern of the sets 182. After a predefined period of time, or the sensed departure of the ride vehicle 10, the sets 182 can be moved back to their initial position and reset for actuation for the next ride vehicle and accompanying passengers.

However, as mentioned, in the preferred embodiment, articulation of the passenger supporting area 20 is ideally precisely synchronized with moving show sets 182. Consequently, each ride vehicle possesses an rf transceiver which is coupled by the computerized vehicle-control system 40 to communicate thereto selection of a particular ride program. Both of the ride vehicle 10 and the moving show sets 182 are precisely synchronized in their operation to produce a combined three-dimensional and motion effect upon the passengers. In one possible alternative embodiment, actuation of the moving show set may be instead by triggered by the central controller, which is directly coupled to each moving show set 182, and which signals the show set to commence its predefined movement pattern in response to selected ride program of the ride vehicle 10, and the attainment by the ride vehicle of a precise position along the path 18, measured by a number of feet. Position of each ride vehicle 10 is preferably maintained by each of the computers 193 and 195 of the computerized vehicle-control system 40, and periodically or specifically transmitted to the central controller by rf communication.

Referring again to FIG. 33, as the ride vehicle 10 reaches the base of the hill corresponding to the forward ends of the two sets of scenery 182, the ride vehicle's body 22 is pitched backward by rotational acceleration and raising of the front end about the pitch axis (indicated by the motion arrow 186). The passenger supporting structure 20 and the body 22 are kept in that position as the ride vehicle moves along the path 18 past the stationary, angled sets of scenery 182. It is noted here that the pitched angle of the passenger supporting structure 20 and the body 22 with respect to the ride vehicle chassis 12 is the same as the downward angle of the scenery sets 182. As the ride vehicle 10 begins climbing the hill, it is accelerated in the forward direction, while all four wheels 14 and 16 of the ride vehicle are steered in a motion pattern designed to create the simulated effect of fishtailing, as described previously.

During climbing of the hill, special effects are provided by introducing the sounds of a straining engine and wheels spinning on dirt. The special effect of flying gravel underneath the wheels 14 and 16 also may be provided. When the ride vehicle 10 has reached the top of the hill, the passenger supporting structure 20 and the body 22 may be dropped back down to a substantially level position with respect to the ride vehicle chassis 12, and the scenery sets 182 may be retracted (as shown by the motion arrow 188) to their normal level position along the path 18.

Figure 34:
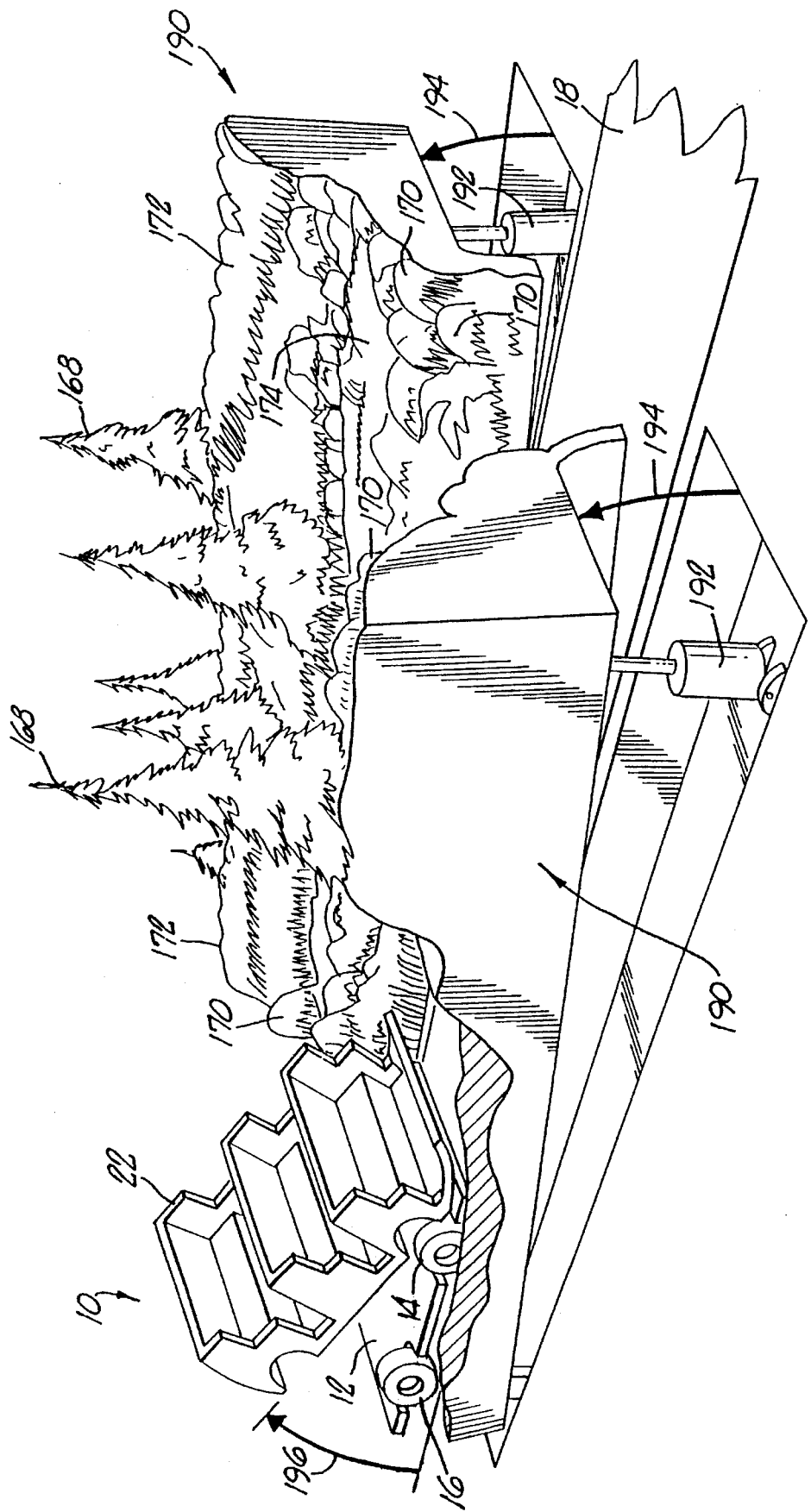
FIG. 34 is a perspective view of the ride vehicle as it moves through an attraction, in which forward body pitch and other effects are used to simulate the effect of descending a hill in the vehicle.

FIG. 34 shows the ride vehicle 10 in another area of the amusement attraction, in which forward body pitch and other effects are used to simulate the effect of descending a hill in the ride vehicle. In this ride experience, initially stationary scenery 42 is provided with a horizon that angles upward in a direction away from the ride vehicle 10 as the ride vehicle approaches the scenery. The scenery 42 in this ride experience may comprise, for example, trees 168, rocks 170, bushes 172, grass 174 and other shrubbery incorporated into movable sets 190 along opposite sides of the path 18. Before the ride vehicle 10 reaches these sets 190, the sets are pivoted by hydraulic actuators 192 or the like causing the scenery 42 to angle upward in a direction away from the ride vehicle 10, as shown by the motion arrow 194. After the ride vehicle 10 passes the scenery 42, the sets 190 may be retracted to a level position with respect to the path.

As the ride vehicle 10 is moved forward along the path 18 and reaches a point corresponding to the top of the hill, the ride vehicle is decelerated and the passenger supporting structure 20 and the body 22 are pitched forward by rotational acceleration and raising of the rear end about the pitch axis, as shown by the motion arrow 196. The passenger supporting structure 20 and the body 22 are kept in this pitched position as the imaginary hill is descended. At the bottom of the hill, the rear end of the passenger supporting structure 20 and the body 22 are lowered until it reaches a substantially level position with respect to the ride vehicle chassis 12.

As noted above, while the ride vehicle 10 is descending the imaginary hill, the ride vehicle is decelerated. Accordingly, special effects corresponding to the sounds of gear whine, a screaming engine and wheels sliding on dirt are appropriately provided as the ride vehicle 10 descends the hill. Other effects, such as slight fishtailing by four-wheel steering, and the effect of flying gravel underneath the wheels 14 and 16, also may be provided to enhance the ride experience even further.

Figure 35:
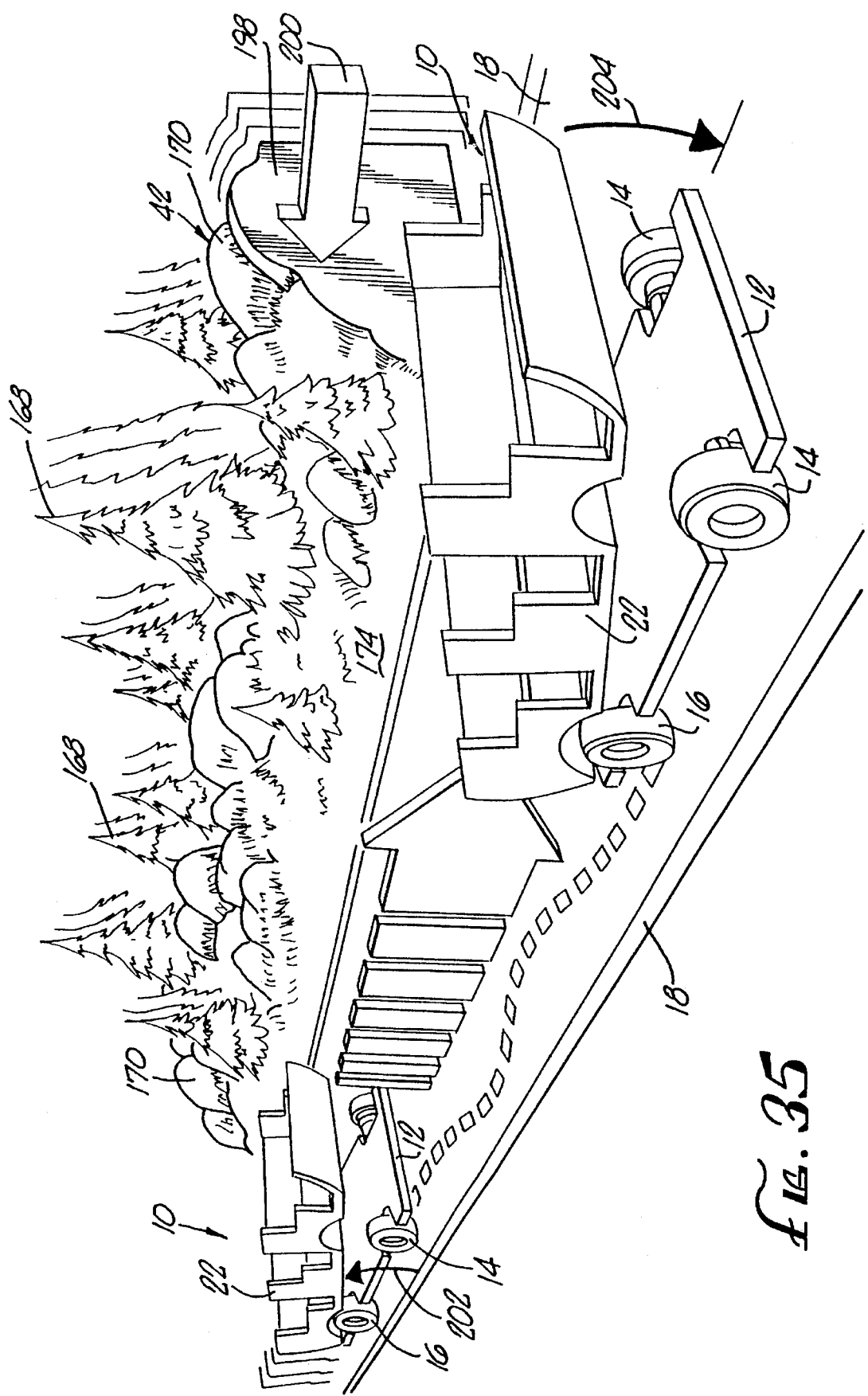
FIG. 35 is a perspective view of the ride vehicle as it moves through an attraction, in which rearward body pitch and other effects are used to enhance the effect of sudden forward acceleration of the vehicle.

FIG. 35 shows the ride vehicle 10 in another area of the amusement attraction where the ride experience to be provided is the simulated effect of sudden forward acceleration of the ride vehicle. Here, distant objects are provided along the path 18, which remains stationary, while close objects are provided generally in the area of ride vehicle acceleration which are adapted to move backwards. The close objects comprise scenery 42 in the form of trees 168, rocks 170 and grass 174 built onto another moving show set 198, with one set preferably on each side of the path 18. These sets 198 are adapted to accelerate rearward in a direction opposite from the ride vehicle 10 in the direction indicated by the arrow 200.

As the ride vehicle 10 moves along the path 18 and approaches the moving show sets 198, the ride vehicle is accelerated in a forward direction. Simultaneously, the ride vehicle's body 22 is pitched rearward by rotational acceleration and raising of the front end about the pitch axis, as indicated by the motion arrow 202, and kept in that position as the ride vehicle 10 continues to accelerate in a forward direction. Also, simultaneously, slight fishtailing of the ride vehicle 10 is provided by four-wheel steering in the motion pattern previously described. As the ride vehicle 10 accelerates along the path 18, the scenery sets 198 are accelerated rearward.

The rearward pitching of the passenger supporting structure 20 and the body 22 during normal ride vehicle acceleration, in combination with the moving show set of scenery 198, substantially enhances the feeling of sudden forward acceleration of the ride vehicle 10. To further enhance the ride experience, the sounds of a roaring engine and squealing tires are provided during acceleration of the ride vehicle 10. Blowing wind and the effect of flying gravel also may be included. When the ride vehicle 10 has stopped accelerating, and has passed the moving show sets of scenery 198, the passenger supporting structure 20 and the body 22 may be returned to a normal level position with respect to the ride vehicle chassis 12, as indicated by the arrow 204. The moving show sets of scenery 198 also may be returned to their initial positions.

FIG. 36 illustrates the next ride experience. In this area of the amusement attraction, the ride experience to be provided includes the simulated effect of a screeching stop by the ride vehicle 10. To this end, stationary scenery 42 in the form of trees 168, rocks 170, and grass 174 are appropriately and artistically arranged along the path 18 that is to be followed by the ride vehicle. As the ride vehicle 10 begins decelerating, the passenger supporting structure 20 and the body 22 are pitched forward by rotational acceleration and raising of its rear end about the pitch axis to enhance the sensation of the stopping motion. The passenger supporting structure 20 and the body 22 are kept in this position as the ride vehicle 10 continues to decelerate. Fishtailing of the ride vehicle 10 with four-wheel steering also may be provided to enhance the sensation of being somewhat out of control during the stop. When the ride vehicle 10 is fully stopped, the passenger supporting structure 20 and the body 22 are rapidly dropped back down to a horizontal position with respect to the ride vehicle chassis 12, as indicated by the motion arrow 206, giving the feeling of a very abrupt stop. To further enhance the ride experience, the sounds of screeching brakes and sliding tires can be provided during deceleration of the ride vehicle 10. The effect of a forward blowing dust cloud when the ride vehicle 10 is stopped adds an additional special effect.

FIG. 37 illustrates a ride experience that includes the simulated effect of sliding off of the side of a road while in a turn. In this area of the amusement attraction, the path 18 resembles a curved roadway, with stationary scenery 42 in the form of trees 168, rocks 170, bushes 172, and grass 174 along the path 18. Additionally, the appearance of a ditch 208, with a stream 210 that follows the curvature of the roadway 18, can be used to enhance the sensation of danger as the ride vehicle 10 appears to slide off the road while in the turn.

As the ride vehicle 10 enters the turn, four-wheel steering is used to turn the ride vehicle substantially sideways as it follows the curved path 18. This involves steering the rear wheels 16 more than the front wheels 14 causing the rear of the ride vehicle 10 to rotationally accelerate and swing outward. This outward swinging of the ride vehicle 10 is exaggerated by rolling the passenger supporting structure 20 and the body 22 outward, as indicated by the arrow 212, and by pitching the passenger supporting structure 20 and the body 22 backward by raising the front end, as indicated by the arrow 214. This combined motion simulates the effect of a sliding turn and, when the ride vehicle 10 approaches the outer portion of the road 18, gives the passengers the feeling that the ride vehicle will slide off the road.

To enhance the ride experience, the sounds of the tires sliding on the roadway 18, as well as thumping and scraping sounds, convey the impression that the ride vehicle 10 is sliding out of control. The effect of sparks flying out from under the ride vehicle 10 also may be introduced to heighten the passengers' sensation of danger and further enhance the ride experience.

FIG. 38 shows the ride vehicle 10 in another area of the amusement attraction, where the ride experience to be conveyed is the simulated effect of driving over a log. In this ride experience, stationary scenery 42 in the form of trees 168, rocks 170 and grass 174 are provided along the path 18 that is to be followed by the ride vehicle 10. A relatively large object 216, such as a log prop or fallen tree, is placed directly in the path 18 followed by the ride vehicle 10. This log 216 is divided into two sections 218 and 220, each of which is adapted to move quickly to one side of the path 18 and out of the way of the ride vehicle 10. Movement of the log 218 and 220 sections can be timed so that the ride vehicle 10 just misses them as it travels along the path 18.

As soon as the log sections 218 and 220 quickly move out of the way of the ride vehicle 10 and the ride vehicle is at the point which corresponds to the location of the log 216, the passenger supporting structure 20 and the body 22 are quickly pitched backward and then forward by causing the front end of the passenger supporting structure 20 and the body to quickly raise up and then down, as indicated by the arrows 222. This motion simulates the effect of the front wheels 14 traveling over the log 216. After waiting for an elapsed distance travelled by the ride vehicle 10 that corresponds to the rear of the ride vehicle 10 reaching the log 216, the passenger supporting structure 20 and the body 22 are quickly pitched forward and then backward by causing the rear end of the passenger supporting structure 20 and the body to quickly raise up and then down, as indicated by the arrows 224. This motion simulates the effect of the rear wheels 16 traveling over the log 216. When the ride vehicle 10 has safely passed, the log sections 218 and 220 are moved back to their initial position across the path 18. The ride experience is further enhanced by introducing the sounds of thumping and crashing while the passenger supporting structure 20 and the body 22 are pitched forward and backward, at the point where the ride vehicle 10 simulates the effect of driving over the log 216.

In one aspect of this ride experience, pitching motion of the passenger supporting structure 20 and the body 22 forward and backward may continue for several cycles after the ride vehicle 10 has passed the log 216. As the distance between the ride vehicle 10 and the log 216 increases, the amplitude of the pitching motion is decreased until the passenger supporting structure 20 and the body 22 are eventually returned to a substantially level position with respect to the ride vehicle chassis 12. As discussed previously in connection with some of the motion patterns described above, this gives the passengers the simulated effect experienced in a conventional ride vehicle where shock absorbers dampen body motion after driving over an object.

FIG. 39 illustrates a ride experience that includes the simulated effect of driving over a ditch. In this area of the attraction, stationary scenery 42 in the form of trees 168, rocks 170 and grass 174 are provided, along with river banks 226 on opposite sides of the path 18 giving the appearance of a ditch 228 that appears to be, but is not actually, present in the path 18 followed by the ride vehicle 10. Thus, before the ride vehicle 10 actually reaches the ditch 228, a movable section 230 of the path 18 corresponding to the location of the ditch 228 is lowered with respect to the normal roadway elevation. As soon as the ride vehicle 10 reaches the ditch 228, however, the section 230 of the path 18 is elevated to the same elevation as the normal roadway, as indicated by the arrow 232.

Once the front end of the ride vehicle 10 reaches a point corresponding to the location of the ditch 228, the rear end of the passenger supporting structure 20 and the body 22 are raised up and then dropped back down with respect to the ride vehicle chassis 12, as indicated by the arrow 234. This motion simulates the effect of the front wheels 14 entering the ditch 228. After waiting for an elapsed distance travelled by the ride vehicle 10 that corresponds to the rear of the ride vehicle 10 reaching the ditch 228, the front end of the ride vehicle is then moved upward, as shown by the arrows 236, as the ride vehicle continues to move forward, past the ditch. This motion simulates the effect of the rear wheels 16 leaving the ditch 228.

In one aspect of this ride experience, pitching motion of the passenger supporting structure 20 and the body 22 in the forward and backward directions may continue for several cycles after the ride vehicle 10 has passed the ditch 228. As the distance between the ride vehicle 10 and the ditch 228 increases, the amplitude of the pitching motion is correspondingly decreased until the passenger supporting structure 20 and the body 22 returns to a substantially level position with respect to the ride vehicle chassis 12. As discussed previously in connection with the ride experience which simulates the effect of driving over a log 216, pitching motion of the ride vehicle 10 for several cycles after it has passed the ditch 228 gives the passengers the experience of being in a conventional ride vehicle after it has driven through a ditch, and the effect of shock absorber dampening.

The ride experience that simulates driving through a ditch 228 is further enhanced by introducing the sounds of thumping and splashing, and the effect of flying dirt and splashing water from underneath the ride vehicle 10 as it travels through the ditch 228. As soon as the ride vehicle 10 has passed the location corresponding to the ditch 228, the section 230 of the roadway 18 may be dropped back down so that the appearance of the ditch will be preserved by any curious, rearward looking passengers.

Figure 40:
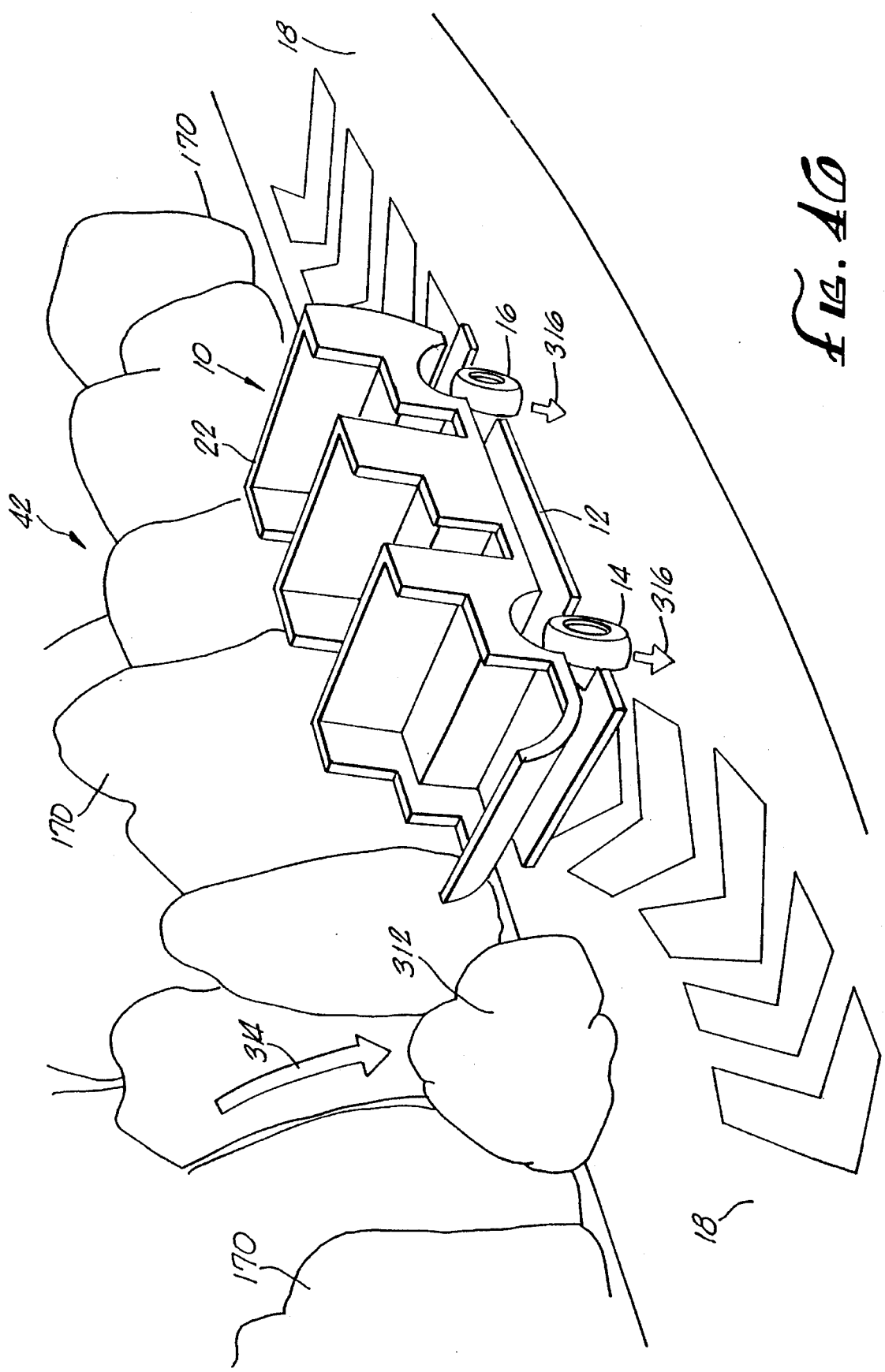
FIG. 40 is a perspective view of the ride vehicle as it moves through an attraction, in which forward and rearward body pitching and side-to-side body roll and other effects are used to simulate the effect of driving over rocks in the vehicle.

FIG. 40 shows the ride vehicle 10 as it moves through an amusement attraction in which forward and rearward pitching, side-to-side roll, and other effects are used to create a ride experience that simulates the effect of driving over rocks. In this ride experience, stationary scenery 42 in the form of trees 168 and rocks 170 are located along a curved path 18 followed by the ride vehicle 10. Second groups of artificial rocks 237 are also placed directly in the path 18 of the ride vehicle 10. These artificial rocks 237 are molded together or otherwise formed into a unitary set of rocks that is pivotally connected along the outer portions of the path 18 that is to be followed by the ride vehicle 10. Three sets 238, 240 and 242 of these artificial rocks 237 are shown in FIG. 40, and each is adapted to pivotally move out of the way, as indicated by the arrows 244, 246 and 248, just as the ride vehicle 10 is about to travel over them.

Just before one side of the ride vehicle 10 is about to run over the first set 238 of artificial rocks, the rocks 238 are quickly pivoted out of the way and the passenger supporting structure 20 and the body 22 are pitched rearward by raising the front end and rolling the passenger supporting structure 20 and the body outward away from the rocks, as indicated by the arrows 250 and 252. After the front of the ride vehicle 10 passes the location corresponding to the artificial rocks 238, the front end is dropped back down and the rear end is raised up, again with outward roll away from the rocks. This combined motion, including pitching the passenger supporting structure 20 and the body 22 rearward and then forward, in combination with outward roll away from the location of the rocks 238, realistically simulates the effect of driving over the rocks. To further enhance the ride experience, the sounds of thumping and banging are introduced as the ride vehicle 10 passes the location of the rocks 238.

As the ride vehicle 10 continues to travel down the curved path 18, the other sets of movable rocks 240 and 242 are encountered. Accordingly, appropriate pitching of the passenger supporting structure 20 and the body 22 rearward and then forward, in combination with outward roll away from the location of the sets of rocks 240 and 242, as indicated by the motion arrows 254, 256, 258 and 260, will simulate the effect of driving over the rocks. This pattern may be repeated as many times as desired, depending upon the duration of the ride experience to be provided.

Figure 41:
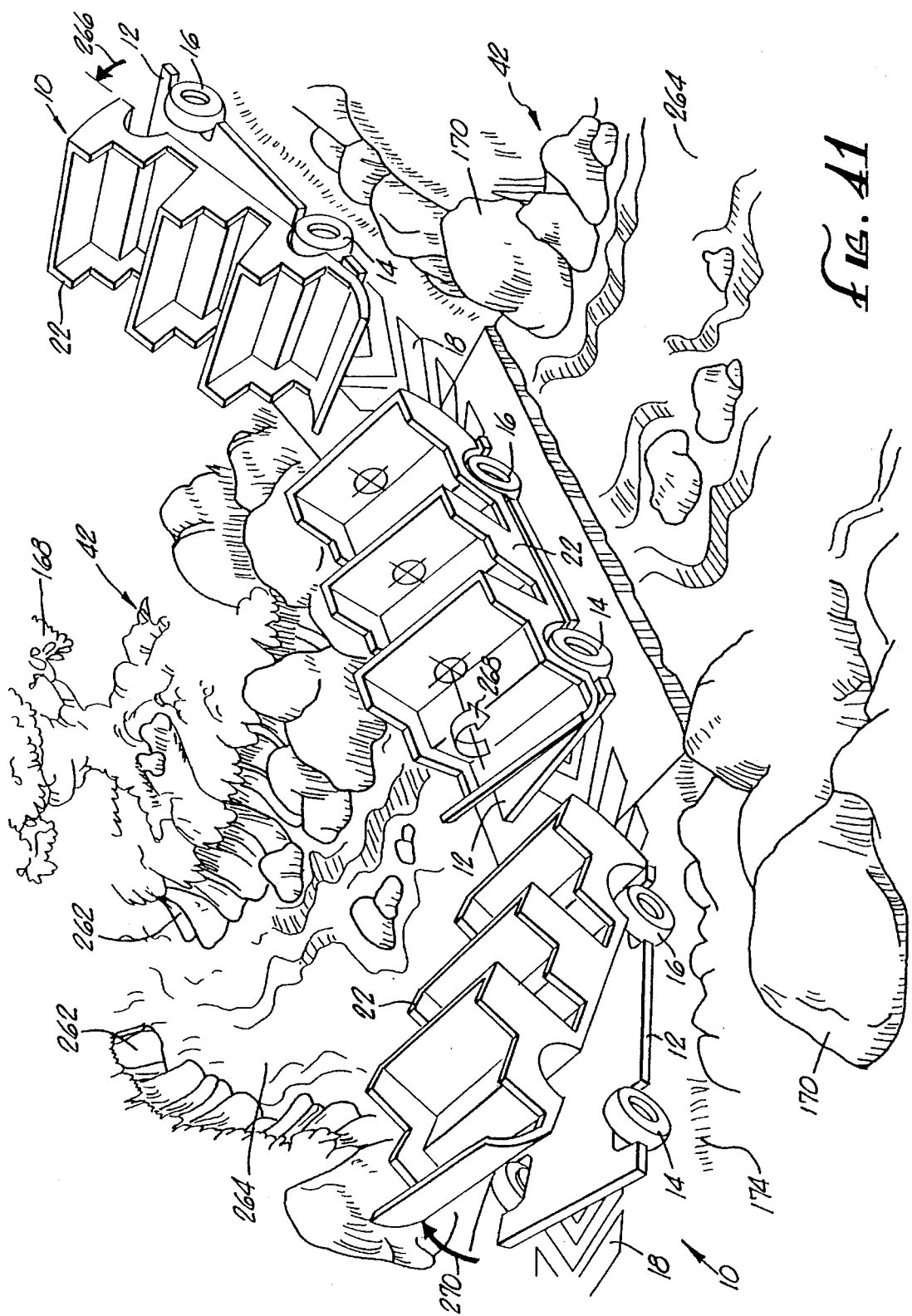
FIG. 41 is a perspective view of the ride vehicle as it moves through an attraction, in which pitching, bouncing and rolling body motion and other effects are used to simulate the effect of driving through a stream in the vehicle.

FIG. 41 illustrates the next ride experience. In this area of the amusement attraction, the ride experience to be conveyed includes the simulated effect of driving through a stream. In one preferred form, the scenery 42 resembles stream banks 262 on opposite sides of the path 18, with water pools resembling a stream 264 that appears to, but actually does not, cross the path that is followed by the ride vehicle. Trees 168, rocks 170, grass 174, and other props may be provided to enhance the realism of the stream banks 262.

The path 18, which is followed by the ride vehicle 10 towards the stream banks 262, angles downward where the ride vehicle enters the stream 264, becomes relatively horizontal in the stream itself, and becomes upwardinclined as the path extends out of the stream. As soon as the ride vehicle 10 begins descending the downward inclined path 18, the passenger supporting structure 20 and the body 22 are pitched forward by raising the rear end, as indicated by the arrow 266. This heightens the passengers' sensation of the steepness of the path 18 entering the stream 264. Upon entering the stream 264 and the horizontal portion of the path 18, the passenger supporting structure 20 and the body 22 are leveled out and are then pitched slightly in the forward and rearward directions, in combination with outward body roll from side-to-side according to the motion arrow 268. This creates a bouncing and rolling motion of the passenger supporting structure 20 and the body 22 with respect to the ride vehicle chassis 12, to simulate the effect of floating as the ride vehicle 10 appears to be but is not actually traveling through the stream 264.

While in the stream 264, the sounds of splashing, engine roar and spinning tires further simulate the effect of traveling through the stream. The effect of splashing and spraying from underneath the ride vehicle 10 also adds to this effect. When the ride vehicle 10 reaches the upward inclined path 18 leaving the stream bank 262, the passenger supporting structure 20 and the body 22 are pitched backward by raising the front end relative to the ride vehicle chassis 12, as indicted by the arrow 270. This exaggerates the steepness of the path 18 leaving the stream bank 262.

Figure 42:
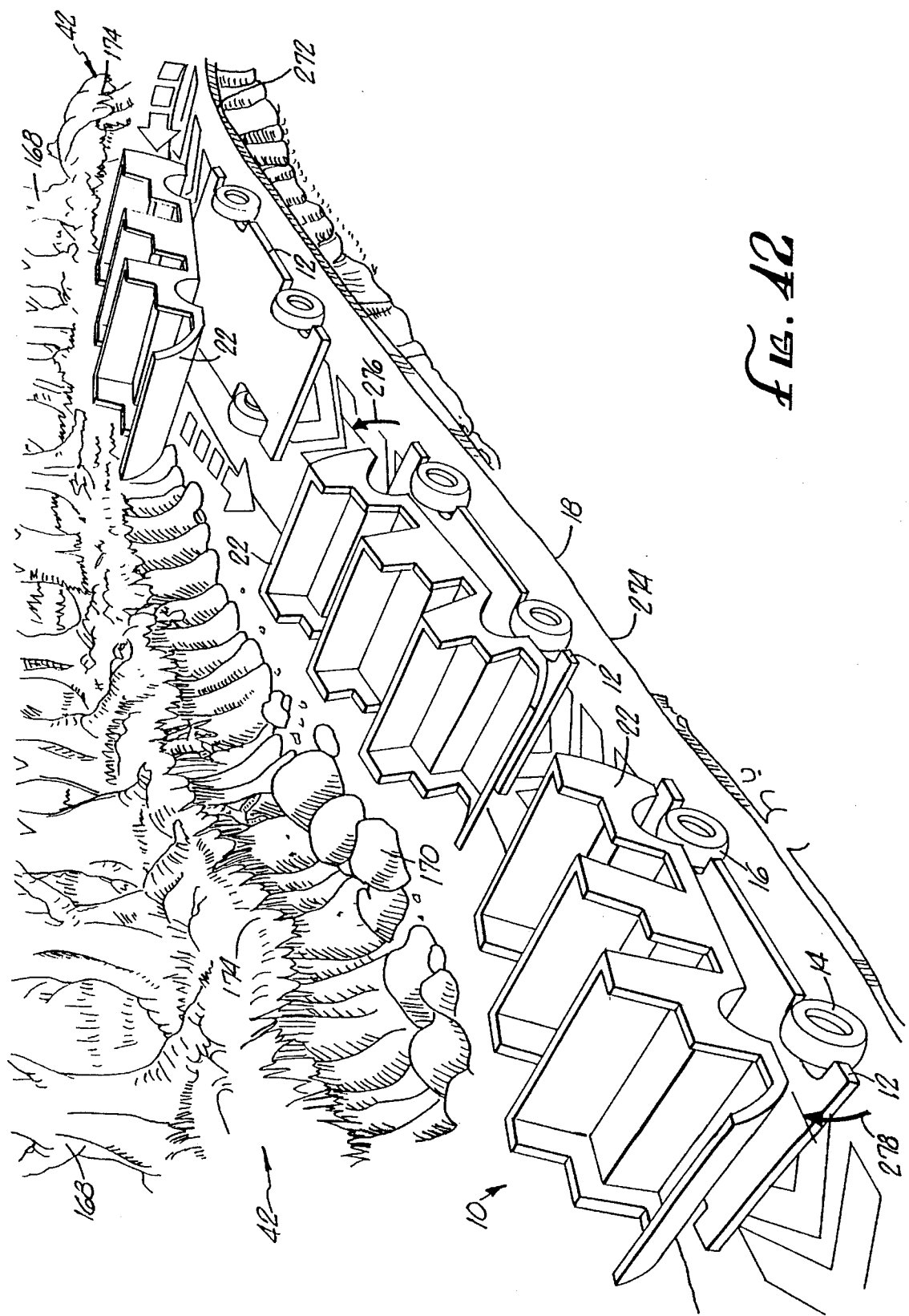
FIG. 42 is a perspective view of the ride vehicle as it moves through an attraction, in which pitching body motion and other effects are used to simulate the effect of cresting a hill and going airborne in the vehicle.

FIG. 42 shows the ride vehicle 10 moving along the path 18 in another area of the amusement attraction. In this area of the attraction, the ride experience is the simulated effect of cresting a hill and becoming airborne in the ride vehicle. Accordingly, stationary scenery 42 is provided along the path 18 that is to be followed by the ride vehicle 10. The scenery 42 may include, for example, trees 168, rocks 170 and grass 174. The path 18 followed by the ride vehicle is relatively straight, but forms a small hill 272, and then a slight dip 274 at the base of the hill.

When the ride vehicle 10 reaches the crest of the hill 272 at a relatively fast pace, further travel of the ride vehicle actually causes the ride vehicle chassis 12 to go down the side of the hill towards the dip 274. At the crest of the hill 272, however, the entire body 22 is elevated relative to the ride vehicle chassis 12, with the front end being raised slightly more than the rear end. This simulates the effect of going airborne as the ride vehicle 10 crests the hill 272. As the distance between the ride vehicle 10 and the crest of the hill 272 increases, the passenger supporting structure 20 and the body 22 are gradually pitched forward by dropping the front end faster than the rear end. By then abruptly dropping the rear end and quickly raising the front end at the location of the dip 274, as indicated by the motion arrows 276 and 278, a crashing drop can be simulated.

Additionally, when the ride vehicle 10 crests the hill 272 and simulates the effect of going airborne, the sounds of engine roar and free wheeling of the tires are introduced. During the crashing drop, the sounds of skidding and crashing also are introduced. The effect of sparks and dirt flying from underneath the ride vehicle 10 further enhance the effect of the crashing drop.

In a further aspect of this motion pattern, forward and backward pitching motion of the passenger supporting structure 20 and the body 22 continues for several cycles after the ride vehicle 10 has completed its crashing drop. As the distance between the ride vehicle 10 and the crest of the hill 272 increases, the amplitude of the pitching motion is decreased until the passenger supporting structure 20 and the body 22 are eventually returned to a substantially level position with respect to the ride vehicle chassis 12.

Figure 43:
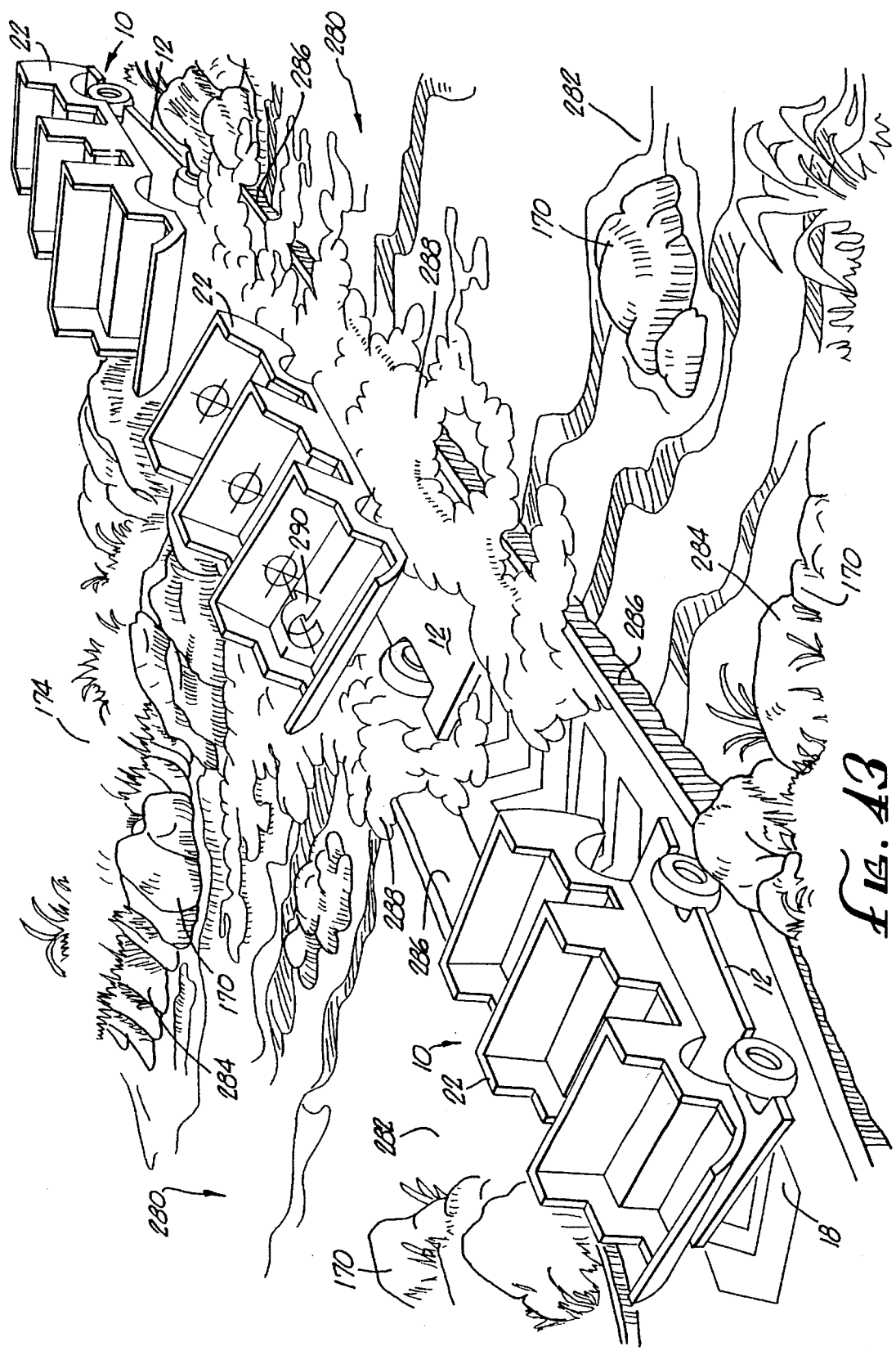
FIG. 43 is a perspective view of the ride vehicle as it moves through an attraction, in which gentle pitching and rolling body motion and other effects are used to simulate the effect of the vehicle floating in water.

FIG. 43 illustrates the next ride experience. In this area of the attraction, the ride experience comprises the simulated effect of floating in water. To this end, an appropriate water scene 280 is provided in the path 18 followed by the ride vehicle 10. As shown in FIG. 43, this scene 280 may resemble a river 282 with river banks 284, rocks 170, grass 174, and other shrubbery on opposite sides of the path 18. The path 18 in this area of the attraction is specially constructed, and includes retaining walls 286 on opposite sides of the path in the area where the path extends through the river 282. Thus, the path 18 is downward-inclined as it enters the river 282 and upward-inclined as it leaves. The section of the path 18 that actually traverses the river 282 includes the retaining walls 286 that keep water in the river from entering the path. A special effect, such as simulated fog 288, hides the section of the path 18 in the river 282 and creates the illusion that the ride vehicle 10 is actually traveling through the river 282.

As the ride vehicle 10 begins to travel down the path 18 into the river 282, the passenger supporting structure 20 and the body 22 are pitched backward by raising the front end relative to the ride vehicle chassis 12. This corresponds to the front end of the ride vehicle 10 entering the river 282. As the ride vehicle 10 continues to travel along the path 18 through the river 282, the passenger supporting structure 20 and the body 22 are first elevated, and then gently pitched forward and backward and rolled from side-to-side with respect to the ride vehicle chassis, as indicated by the motion arrow 290. This gentle pitching and rolling motion is designed to simulate the effect of floating in the river 282. Appropriate elevation of the passenger supporting structure 20 and the body 22 with respect to the ride vehicle chassis 12, in combination with these body movements, keeps the passenger supporting structure 20 and the body substantially in a horizontal, floating position while the ride vehicle seemingly fords the river 282.

While passing the river 282, the sounds of splashing water and waves are introduced. These sounds, in combination with the fog 290, realistically simulate the effect of floating in the river 282. When the ride vehicle 10 reaches the opposite side of the river 282, the passenger supporting structure 20 and the body 22 are moved back down to their normal, level position, in preparation for the next ride experience.

Figure 44:
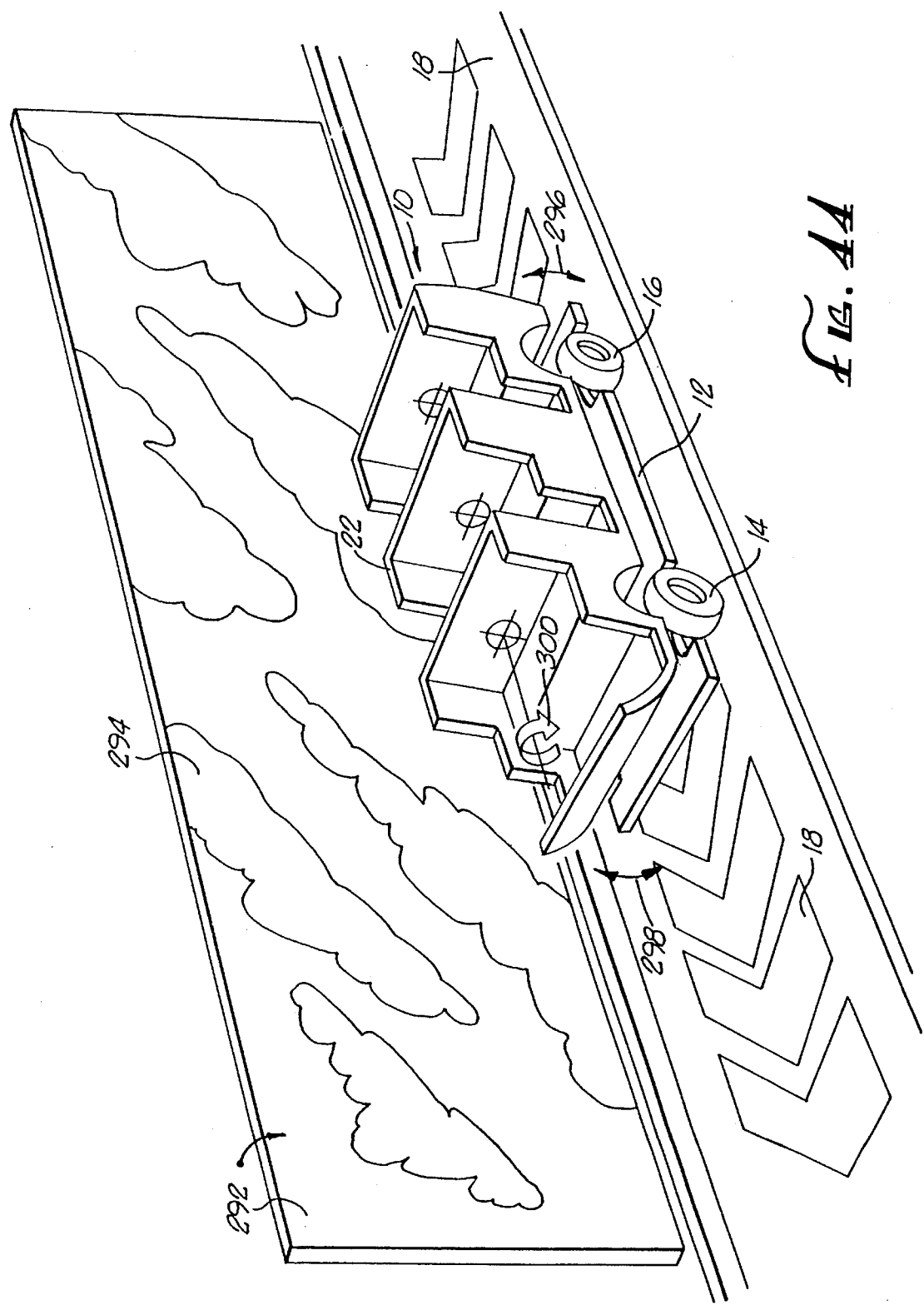
FIG. 44 is a perspective view of the ride vehicle as it moves through an attraction, in which gentle pitching and rolling body motion and other effects are used to simulate the effect of the vehicle flying or falling through the air.

FIG. 44 illustrates a ride experience that includes the simulated effect of flying or falling through air. Here, the ride vehicle 10 follows a relatively straight path 18 past a large projection screen 292, with movements of the ride vehicle synchronized to projected images. Although not illustrated for purposes of clarity, a projection screen 292 may be provided on both sides of the path 18 followed by the ride vehicle 10. In the preferred embodiment, the projection screen 292 is of the rear projection type and is adapted to project rapidly moving scenes, such as clouds 294.

Once the ride vehicle 10 has reached a location on the path 18 alongside the projection screen 292, the passenger supporting structure 20 and the body 22 are gently pitched forward and backward and rolled from side-to-side with respect to the ride vehicle chassis 12, as indicated by the motion arrows 296, 298 and 300. Simultaneously, wind is blown against the passengers and the sounds of whistling air are introduced. These special effects, in combination with the passenger supporting structure 20 and the body motion and rapidly moving scenes 294 on the projection screen 292, realistically simulate the effect of flying or falling through the air.

Figure 45:
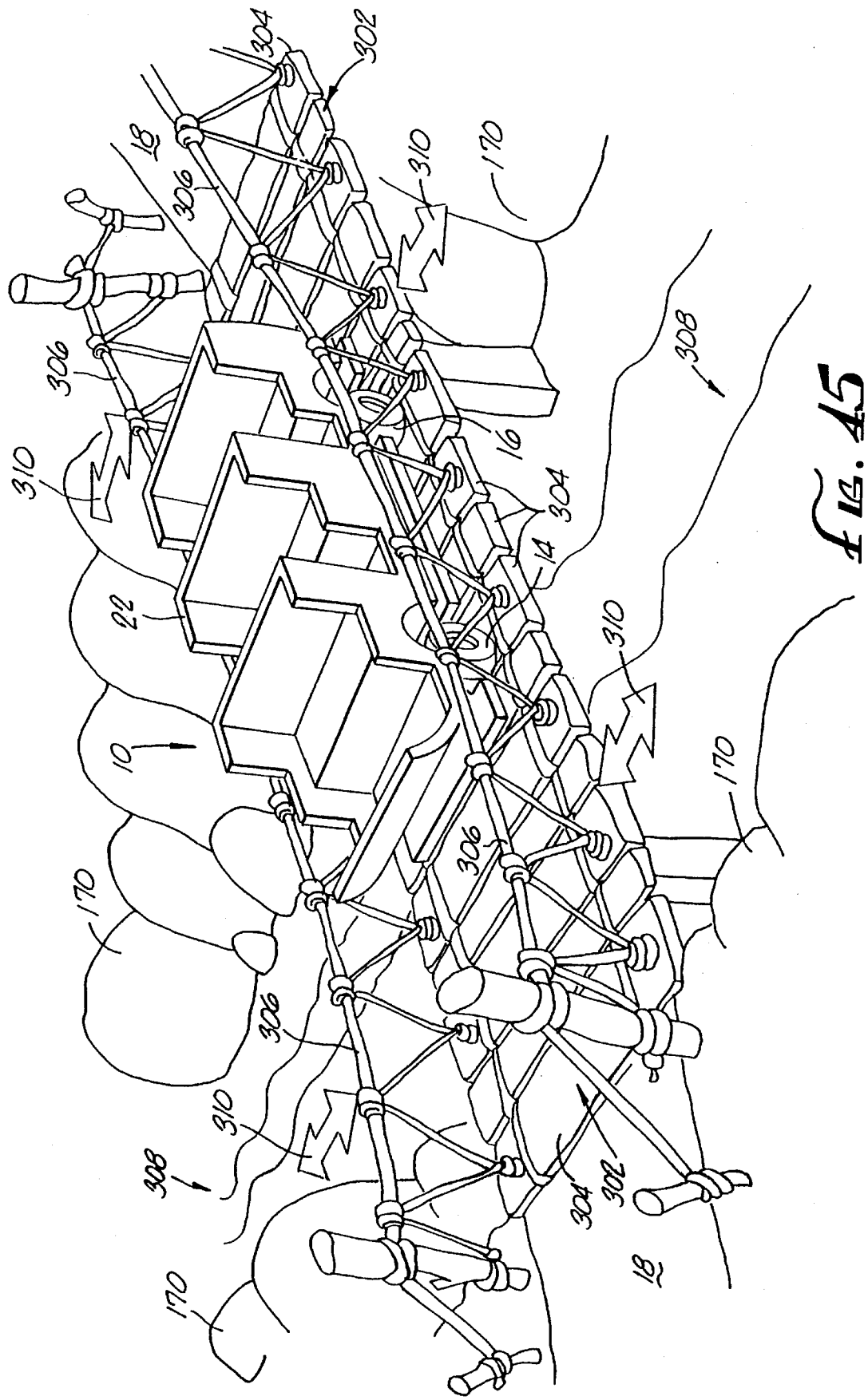
FIG. 45 is a perspective view of the ride vehicle as it moves through an attraction, in which four-wheel steering and other effects are used to simulate the effect of driving over a jungle bridge in the vehicle.

FIG. 45 illustrates the next ride experience, which involves the simulated effect of driving over a bridge 302. Here, the path 18 of the ride vehicle 10 extends directly onto the bridge 302 which, in the preferred embodiment, resembles a jungle-style bridge. Accordingly, the bridge 302 includes wooden planks 304 comprising the roadway surface, with rope side rails 306. Below the jungle bridge 302, a river 308 is flowing, with rocks 170 on opposite sides of the stream to demarcate the river and the distance traversed by the bridge. This bridge 302 is adapted to sway, or to appear to sway, from side to side in the direction of the arrows 310.

In this ride experience, the ride vehicle 10 is moved along the path 18 and across the bridge 302. As the ride vehicle 10 crosses the bridge 302, four-wheel steering, pursuant to one of the motion patterns previously described, causes the ride vehicle to sway from side-to-side across the bridge. The bridge 302 also may be moved from side-to-side at the same time to heighten the passengers' sensation of instability and lack of safety during the crossing of the bridge. The sounds of creaking and cracking wood add further to this sensation and the overall ride experience.

FIG. 46 illustrates another area of the amusement attraction, in which the ride experience to be conveyed is the simulated effect of swerving to miss a falling object. Stationary scenery 42 in the form of rocks 170, for example, are located along at least one side of the relatively straight path 18. A large object 312, such as an artificial boulder or rock, is adapted to move downward, as indicated by the arrow 314, into the path 18 of the ride vehicle 10. This movement of the rock 312 may be accomplished by appropriate mechanical devices that allow the rock to fall into the path 18, and to be subsequently retrieved after the ride vehicle passes, in preparation for falling in front of the next ride vehicle.

When the ride vehicle 10 reaches a location along the path 18 that is close to the falling rock 312, the rock begins to fall down into the path and the ride vehicle abruptly swerves out of its way. This swerving motion is accomplished by four-wheel steering in the direction of the arrows 316. This substantially exaggerates the sharpness and abruptness of the swerving motion. The four-wheel steering and falling of the rock 312 are appropriately timed so that the ride vehicle 10 just misses the rock as it crashes down onto the path 18. The sounds of crashing, while the rock 312 falls, and the sounds of skidding tires during the swerving motion add substantially to the ride experience.

Figure 47:
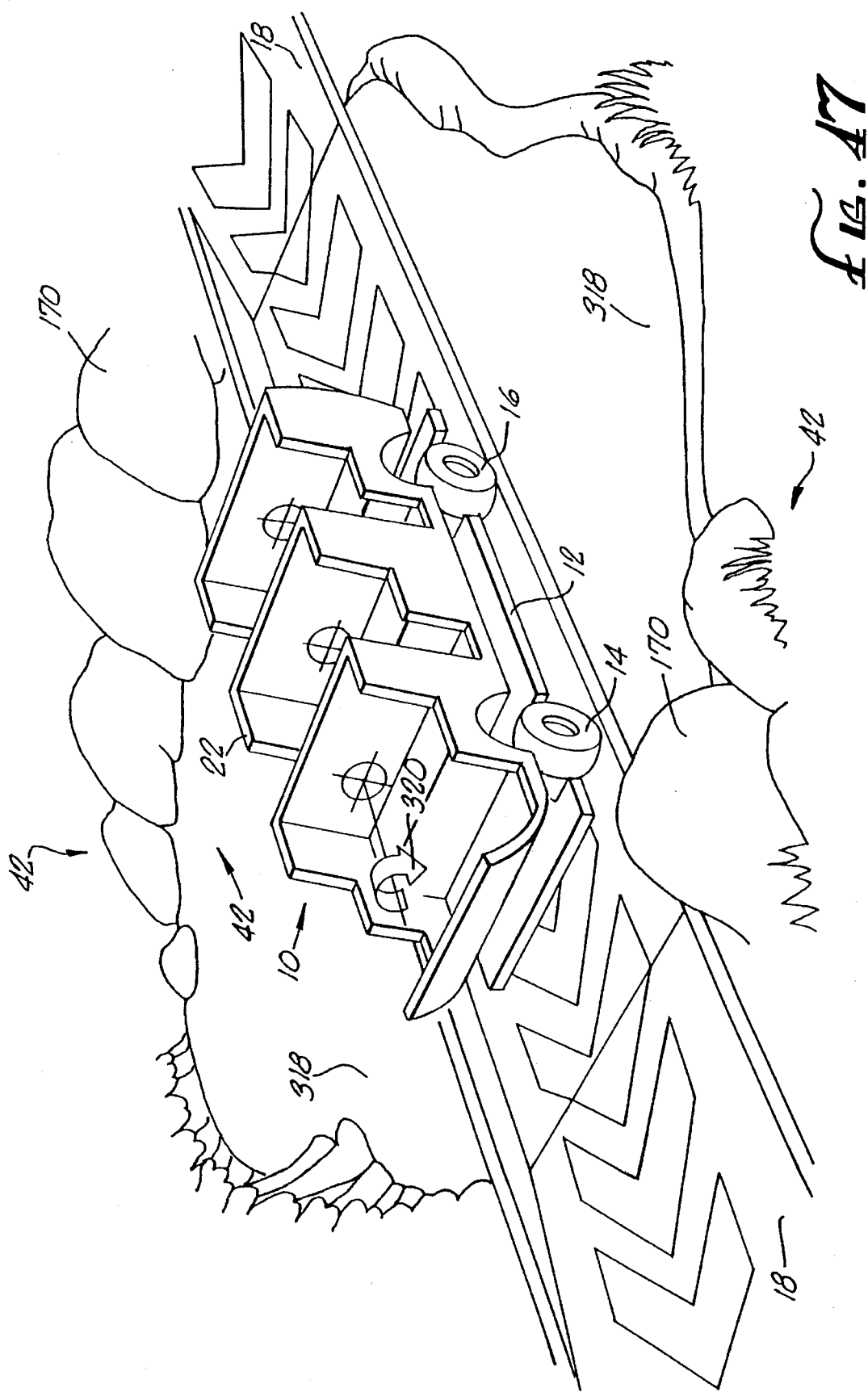
FIG. 47 is a perspective view of the ride vehicle as it moves through an attraction, in which slight rolling motion of the body and other effects are used to simulate the effect of the vehicle being stuck in the mud.

FIG. 47 shows the ride vehicle 10 in yet another area of the attraction. Here, the ride experience includes the simulated effect of being stuck in the mud. Accordingly, stationary scenery 42, in the form of rocks 170 bounding a pool of mud 318 in the path 18 of the ride vehicle 10, are provided. Of course, the path 18 does not actually extend into the mud 318, but rather over it in the manner shown in FIG. 38. The mud 318 itself need not be real, so long as it appears to be so.

Ride vehicle motion in this ride experience includes stopping the ride vehicle 10 at a location along the path 18 in the area of the surrounding mud pool 318. The ride vehicle 10 can be slowed in a manner that simulates the feeling that the ride vehicle is attempting to accelerate through the mud 318, but is being bogged down until it eventually stops. Then, a slight rolling motion may be imparted to the ride vehicle 10 by gently pitching the passenger supporting structure 20 and the body 22 rearward and forward and rolling it from side-to-side with respect to the ride vehicle chassis 12, as indicated by the motion arrow 320. This motion is designed to simulate the ride vehicle 10 attempting to drive out of the mud pool 318. Simultaneously, the sounds of a roaring engine and spinning tires are introduced. The effect of simulated mud also can be caused to fly away from the ride vehicle 10, to simulate the actual physical effects that relate to the sounds of the roaring engine that appear to be spinning the wheels 14 and 16, while the ride vehicle 10 appears to be stuck in the mud 318.

Figure 48:
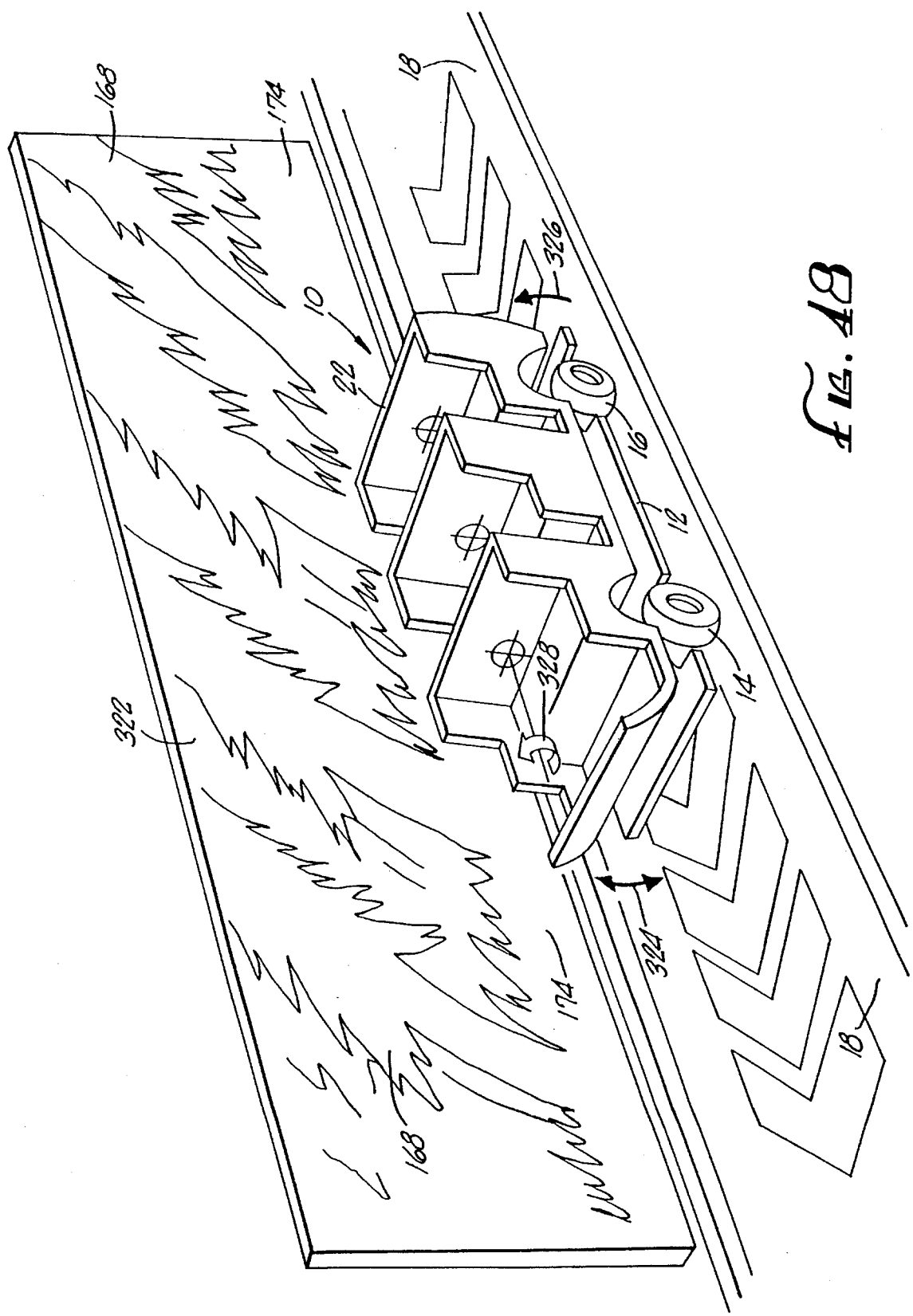
FIG. 48 is a perspective view of the ride vehicle as it moves through an attraction, in which gentle pitching and rolling motion of the body and other effects are used to simulate the effect of driving at high speed in the vehicle.

FIG. 48 illustrates a ride experience that includes the simulated effect of driving at high speed in the ride vehicle 10. Like the ride experience shown in FIG. 44, this ride experience also involves the use of a projection screen 322 alongside the path 18 to be followed by the ride vehicle 10. Again, the projection screen 322 is preferably a rear projection screen. The scenes projected on the screen 322 correspond to images moving rapidly in a rearward direction, such as trees 168 and grass 174 alongside a typical high-speed road or highway.

Once the ride vehicle 10 has reached the projection screen 322, the ride vehicle continues to travel forward. Simultaneously, the passenger supporting structure 20 and the body 22 are gently pitched forward and backward and rolled from side-to-side with respect to the ride vehicle chassis, as indicated by the arrows 324, 326 and 328, to simulate the effect of the ride vehicle 10 traveling at high speed. The rapidly moving scenes 168 and 174 tend to heighten this sensation. Audio sounds, such as a roaring engine and fast moving tires also are included, as well as wind blowing against the passengers. These effects continue until the ride vehicle 10 has traveled to the end of the projection screen 322.

Figure 49:
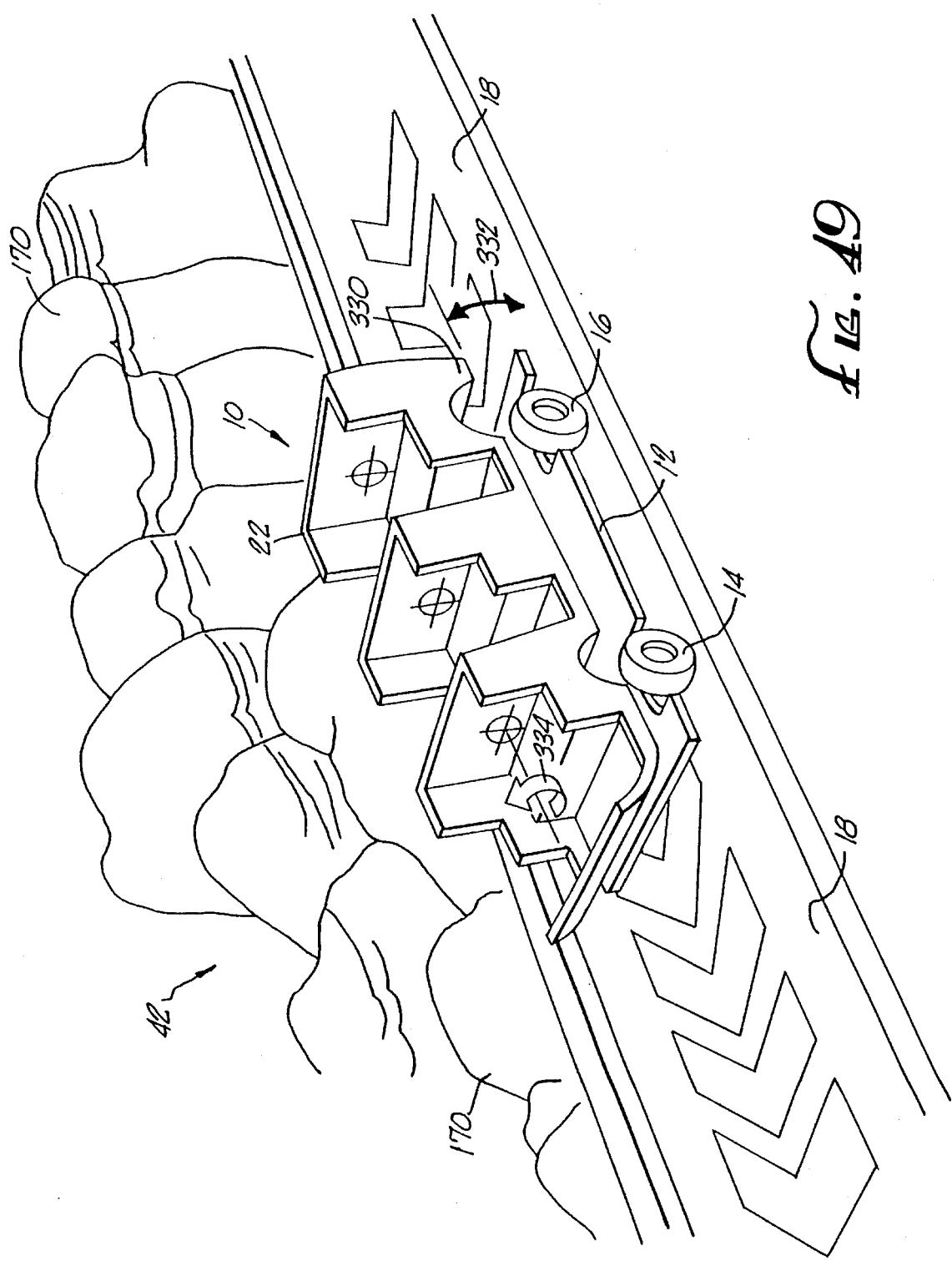
FIG. 49 is a perspective view of the ride vehicle as it moves through an attraction, in which a combination of pitching and rolling motion of the body and other effects are used to simulate the effect of driving the vehicle with a flat tire.

Finally, FIG. 49 illustrates a ride experience that includes the simulated effect of driving with a flat tire. In this ride experience, stationary scenery 42 of any form may be provided. In this embodiment, rocks 170, positioned alongside the path 18 followed by the ride vehicle 10, are illustrated. As the ride vehicle 10 moves along the path 18, a loud noise corresponding to a tire blow out is introduced. Thereafter, one corner 330 of the ride vehicle, such as the left rear corner illustrated in FIG. 49, is caused to bounce up and down by appropriately moving the rear end of the ride vehicle up and down, as indicated by the arrow 332, and by rolling the passenger supporting structure 20 and the body 22 outward away from the affected tire, as indicated by the arrow 334. This body motion with respect to the ride vehicle chassis 12 is continued in a periodic or repeated manner for as long as desired. The sounds of a flapping tire also are introduced, to further simulate the effect of driving with a flat tire.

With these exemplary motions in mind, the method of programming the ride vehicle 10 with one or more complete ride programs that direct the ride vehicle from start to finish around the closed-loop path (as seen in FIG. 50) will now be described.

Software Tasks Of The Electronic Control System.

As mentioned earlier, one of the particular utilities of the present invention is the use of a programmable ride vehicle 10 that may be configured to have any desired number of ride programs, either with the same body 22 in a generic environment, or with a different body in an alternative environment. Even in a multiplicity of environments, a single ride vehicle 10 is all that is needed to impart an infinite variability of ride experiences that may be alternatively selected and easily created.

The programming steps described herein are set forth in a manner that enables anyone familiar with computer programming to implement appropriate software to provide the programming functions. At a macroscopic level, the programming tasks consist of (1) developing each ride program to synchronize vehicle motion and show set motion, projection and other effects with articulation of the motion base 24, (2) programming the computerized vehicle-control system 40 to initialize vehicle operation, monitor vehicle status and execute one of a plurality of ride programs, by loading a sequence of data, divided into parallel data tracks, to the vehicle actuators, for use as actuation signals, and (3) programming the Wayside Interface to interact with the human operator 409 at the Wayside Station 407. The functions of these various programs are set forth below in a manner to enable a computer programmer to implement a ride vehicle that accomplishes the above-described motion patterns, or other motion patterns, for nearly any desired amusement attraction.

Description Of A Special Programming Console And Its Use In Creating Ride Programs For The Ride vehicles.

Figure 53:
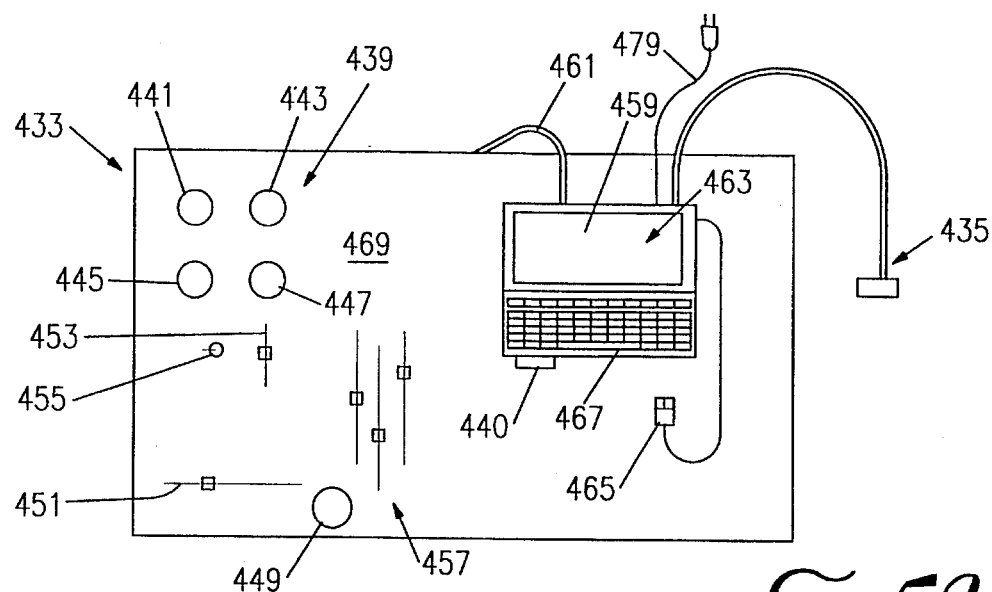
FIG. 53 is a plan view of a detachable programming console used to create each ride program that controls vehicle conduct and provision of the ride experience to the passengers. The programming console includes a computer, computer monitor, computer mouse, keyboard and a plurality of controls for allowing a programmer to direct the actions of a ride vehicle, so that those actions may be recorded and used for maintenance and diagnostics.
Figure 54:
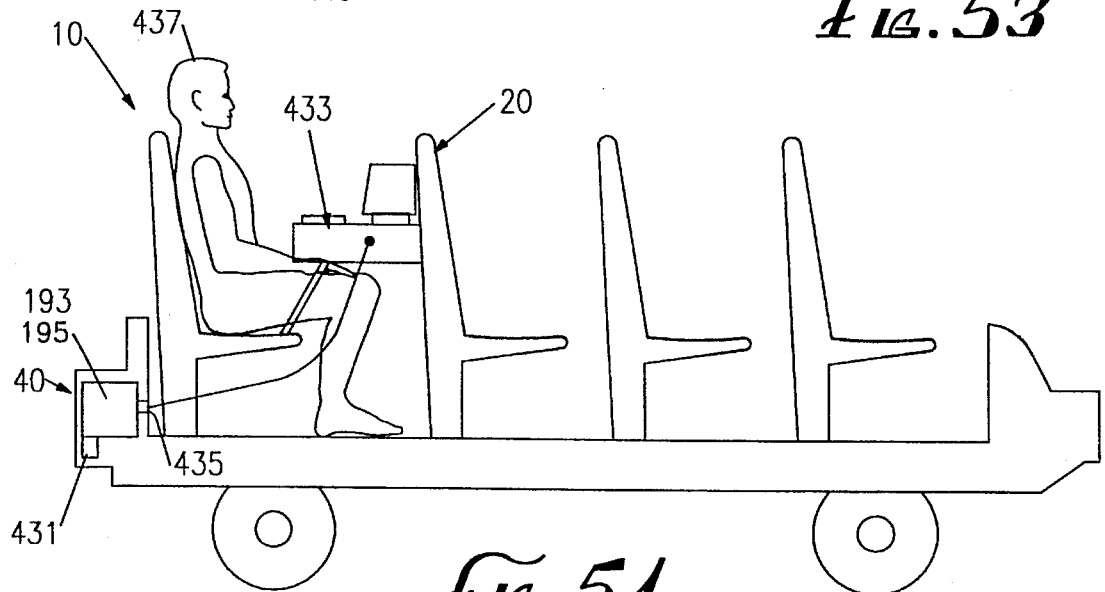
FIG. 54 is a side view of the ride vehicle, showing installation of the programming console and a human operator for the purpose of programming ride vehicle functions.
Figure 56:
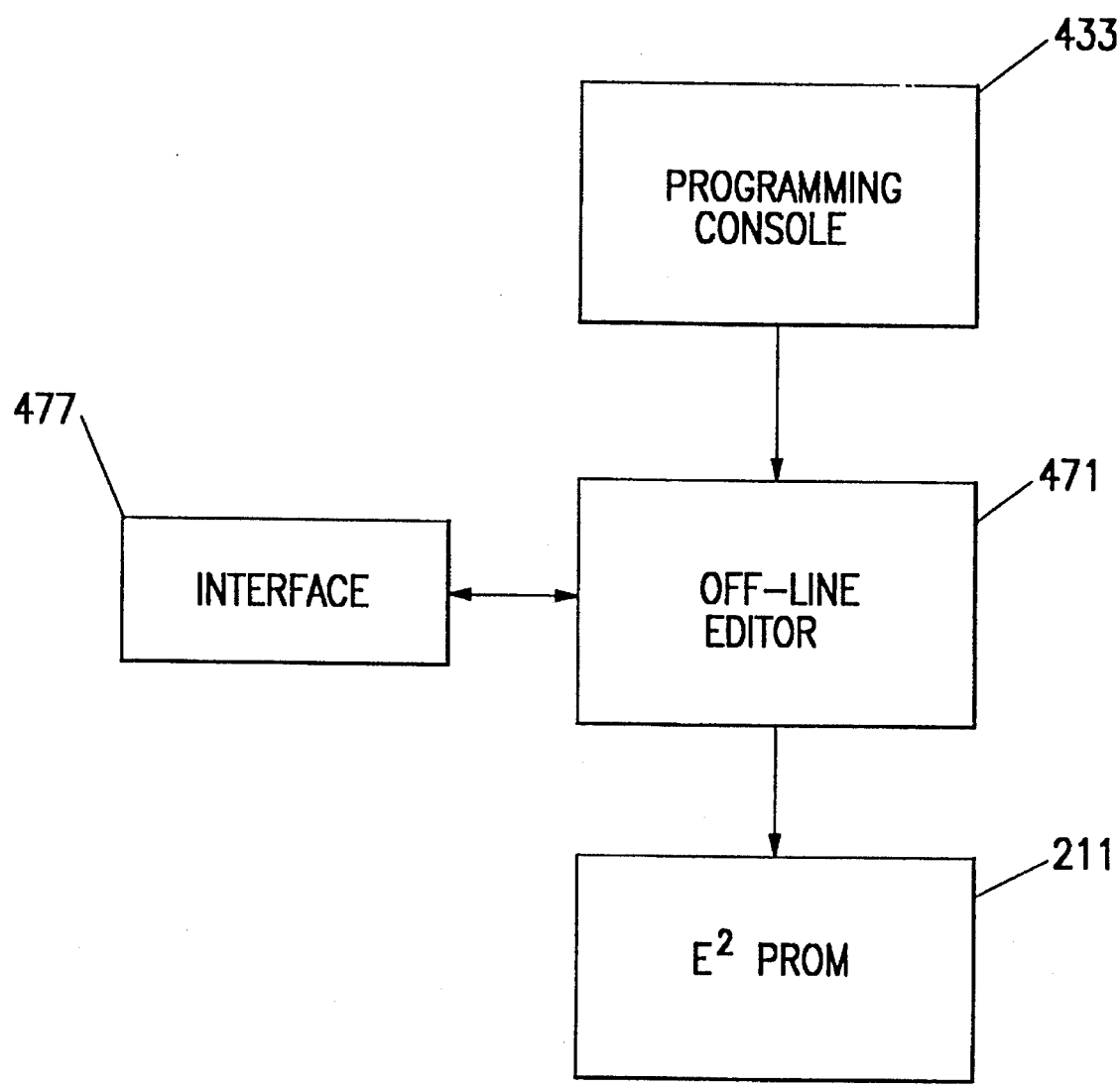
FIG. 56 is a functional flow chart that shows the different pieces of equipment used to generate a ride program, including a programming console and an off-line editor.

To create a particular ride program, and associated ride experience, a special programming console 433, shown in FIGS. 53 and 54, is connected by an appropriate coupling 435 to the computerized vehicle-control system 40. An operator 437 sits within the ride vehicle 10 and uses the console 433 to control and record actions of the various mechanical elements that are important to the ride experience. The console 433 includes various controls for manipulating these various mechanical elements, and a removable memory, such as a floppy disk 440, onto which recorded actions of the ride vehicle 10 may be stored for later edit. Thus, using the console 433, the programmer 437 may experiment with various movements of both of the ride vehicle 10 and the motion base 24 to interact with each other and with show sets, which are external to the vehicle. An off-line editor (not shown in FIGS. 53 and 54) is then used to add a soundtrack, and to alter and smooth motions and correct errors in the recorded program.

The console panel 433 includes a number of switches, slider potentiometers, and connectors required for console operation. These controls 439 include a vehicle manual power disconnect switch 441, a restart switch 443, a program stop switch 445, a program start switch 447, a recording on/off switch 449, a rear offset slider potentiometer 451, a vertically-oriented velocity slider potentiometer 453, a vehicle direction (forward/reverse) toggle switch 455, and three vertically-oriented slider potentiometers 457 for the three actuators which are used to articulate the motion base. Also integrally mounted to the console panel is a laptop "IBM" compatible personal computer 459. Ideally, this computer uses a "80386SX" CPU microprocessor running at 20 megahertz or greater speed and having at least 6 megabytes of RAM and 60 megabytes of hard drive for data and program storage. Ideally, the personal computer also has a 3.5 inch disk drive, to which ride programs can be saved and removed for later processing at the off-line editor. Each of the output signals from the aforementioned controls are converted to digital format and multiplexed to a common data bus 461, which is fed as an input to the personal computer 459. Accordingly, the program software, described below, selects one of the multiplexed inputs for sampling, and loads a digital value corresponding to the control's position into the RAM of the personal computer 459, for modification and output as an actuation signal, used to control one of the plurality of mechanical elements of the ride vehicle 10. Importantly, the manual power disconnect switch 441 causes each of the RCC 193 and the RMC 195 to disconnect power to all vehicle controls, so as to disable all motion in an emergency condition. By contrast, the program stop switch 445 disables the motion base 24 and vehicle velocity, but permits continued steering of the ride vehicle 10 until it comes to a stop.

Each mechanical element, for example, rear steering actuators, vehicle velocity (swashplate), and each of the three servo actuators 50, 52 and 54 of the motion base, has a parallel data track dedicated to control of that actuator during the ride program. In other words, each parallel data track includes a sequence of data that describes the movements of the corresponding actuator during the duration of the ride program. This duration is, in the preferred embodiment, measured by the position of the ride vehicle 10 in feet along the path 18, and extends to a full loop of the path. Thus, as the ride vehicle 10 moves forward, the computers 193 and 195 obtain instructions from the selected ride program which defines increase or decrease in velocity, change in rear offset, and new articulation of the passenger supporting structure 20. The parallel data tracks also include tracks that correspond to audio cues, vehicle headlights (on/off), and safety functions, which include follower rear offset lock-out, seat belt disengagement, and motion base actuator block and settling valve actuation. In addition, each ride program includes identifying information, including name, date of creation, remarks, but most importantly, an error detection code that permits each of the RCC 193 and RMC 195 to identify data errors to ensure proper performance of the selected ride program.

Time-based sequences may also be used, either in lieu of, or in combination with, the vehicle position. In fact, each ride vehicle includes hold-patterns which are designed to entertain and amuse the passengers 48 during a ride stoppage. That is, if the ride vehicle 10 is stopped, the motion base 24 or other mechanical element may be actuated in a predefined, timed pattern, pending renewed motion of the vehicle in accordance with the ride program. In addition, however, time-based sequences are also preferably used at intermittent locations around the path 18, for example, to create a "stuck-in-the-mud" or other similar sequence, or to simulate the effect of a rock slide.

1. Recording Of Ride Programs In General.

As mentioned, the programming console 433 includes controls 439 that manipulate each of the mechanical elements, and a "80386SX" CPU laptop as the personal computer 459, which digitizes the values of the controls, and modifies them in accordance with a special program, described below, to output a set of actuation signals that will be used to instantaneously direct each of the mechanical elements. The special program displays the mode for each parallel data track on the computer monitor 463, and allows the guest to select one of several operating modes for actuation of selective ones of the plurality of mechanical elements that contribute to the ride experience, using a mouse 465, keyboard 467 or other interface device. Subsequent to the selection of mode and loading of a particular, or alternatively, a blank, ride program, the programmer 437 may scroll through the ride program in a continuous manner, with the prerecorded or default actuation signals being fed to the computerized vehicle-control system 40 and controlling the actions of the various mechanical elements. Either of vehicle position along the path, or elapsed time, may be selected in the preferred embodiment as an index by which to record vehicle actions and actions of the mechanical elements.

The preferred programming console provides the following recording capabilities for generating ride programs: (1) the ability to load and save programs using the programming console 433; (2) the ability to locate a time-based segment; (3) the ability to select either a time-base or distance-base by which to index and coordinate actions of the ride vehicle 10; (4) the ability to select one of four modes for each parallel data track for generating and editing ride programs; (5) the ability to set locations and location ranges for hold-patterns; (6) the ability to select an overall programming mode of playback (actuate vehicle in accordance with program tracks), program (record actions) or drive (control vehicle velocity using the programming console, without either playback or record); and (7) the ability to define gain and response parameters for each of the actuator controls of the programming console 433.

Prior to recording actions that are directed by the programming console 433, the programmer 437 defines one of four modes in the special software for each of the actuator-driven parallel data tracks, the selection of modes and recording being toggled on and off by the programmer, as desired, through the programmer's depression of a record on/off button on the control panel 469. The programmer 437 also, prior to recording, defines gain and response parameters for the controls 439 of the programming console 433, which determine the extent to which the actuation signals track their corresponding output signal for a particular mechanical element. For example, this special menu allows the programmer 437 to scale a very small range of actuator motion, i.e., between zero and five inches of motion, to the particular control of the programming console, and accordingly shape the actuation signal corresponding to each of the vertically oriented slider potentiometers 451, 453 and 457. In addition to these gain parameters, the software also allows definition of change or response parameters, which determine how quickly or slowly the actuation signal changes to reflect change in a control setting. For example, should the programmer 437 decide to instantaneously stroke one of the motion base actuators 50, 52 or 54 to an extreme position, this change parameter could be set to allow the actuation signal to trigger only a defined maximum rate of change, even the corresponding control may be instantaneously moved between two extremes.

In this manner, the output signals may be processed and modified to allow them to control each of the plurality of mechanical elements used to provide the ride experience, and also be selectively recorded by the personal computer 459 for editing and use as one of the resident plurality of ride programs that will be stored upon the ride vehicles 10 actually used in an amusement attraction.

Of the four aforementioned modes, a play mode may be selected as a first mode for each mechanical element, where the sequence of data of a corresponding parallel data track in the loaded ride program is directly fed as the actuation signal fed to the ride vehicle 10. If a blank ride program (the default) is being used to generate a new ride program, then a zero actuation value is fed to the corresponding mechanical element, to indicate no actuation, for all mechanical elements save vehicle velocity, to which a minimal velocity signal is supplied.

Second, a record mode may be selected for each mechanical element, wherein output signals from the controls 439 are directly supplied to the vehicle as actuation signals for their corresponding mechanical element, and the output signals simultaneously recorded as the new sequence of data in the corresponding parallel data track. If any prerecorded parallel data tracks exist which are loaded into memory as part of the loaded ride program, they are overwritten, and the newly-recorded values may be subsequently saved to floppy disk 440 or other remote memory.

Third, a hybrid mode may be utilized where a prerecorded track is selected for playback for a mechanical element, but for which the output signal from the corresponding control is used to fine tune the prerecorded track and provide an adjusted signal as the actuation signal for the corresponding mechanical element. The amount of such adjustment is determined by gain values which, as stated above, are definably adjusted by the programmer prior to recording. Accordingly, the new parallel data track, if the adjusted signal is in fact recorded, is used to overwrite the old parallel data track for the corresponding one of the plurality of mechanical elements.

Fourth, a mute mode may be executed where no actuation signal is fed to selected ones of the plurality of mechanical elements, save a minimum velocity signal, but wherein prerecorded tracks retain their data values without being overwritten by the actuation signals generated by the personal computer 459.

Once modes have been chosen for each one of the parallel data tracks of any ride program, the ride program may be scrolled through, with actuation signals from the programming console driving the corresponding mechanical elements in accordance with prerecorded or default values. At any desired time, the programmer 437 may hit the record on/off button on the programming console 449, which toggles on and off the aforementioned modes for each of the corresponding parallel data tracks. Thus, a second depression of the record on/off button 449 returns the actuation signals to a play mode, where prerecorded or default data values within the ride program's sequence of data are fed to the vehicle as the actuation signals.

It should be mentioned that the programming console allows the programmer 437 to stop and start the ride vehicle 10 at various points along the path 18 and also to selectively record segments of a particular ride program, overriding previous values in active memory. To this effect, a particular ride program may be loaded from its 3.5 inch floppy disk 440 or hard drive into active memory, and the program scrolled through to locate a particular position within the sequence of data. To record specific actions, the programmer 437 first goes into the aforementioned menus and selects a record mode, play mode, hybrid mode or mute, as described above, for each of the parallel data tracks of the loaded ride program. At this point, the programmer 437 commences operation of the program, and the ride vehicle 10 begins to move along the path 18. As mentioned, if a blank program is loaded into the memory, default values for each of the actuators are zero, indicating no actuation, except for velocity of the ride vehicle 10, which is assigned a minimum value so that the ride vehicle moves and the personal computer is capable of assigning sequential values representing the state of the various mechanical elements, as indexed by one of vehicle position and elapsed time. As the ride vehicle 10 moves along the path 18, the programmer 437 uses the controls 439 to directly actuate one or more of the plurality of mechanical elements of the ride vehicle 10, which are selectively recorded in active memory of the personal computer 459, within the framework of modes for the parallel tracks previously defined by the programmer. In this manner, the personal computer 459 assigns a position-dependent value to the status of each of the plurality of mechanical elements at each point along the path 18, for example, for each foot or each second of action. Once the programmer 437 has sat within the ride vehicle 10 and directed it along the path 18 a sufficient number of times to construct a base ride program, the particular ride program file may be saved to the floppy disk 440 and removed to an off-line editor 471, to permit the base ride program to be edited and to have audio and moving show set tracks added.

The programming console software is configured to allow menu selection of a display that shows the programmer 437 each of a large number of preassigned position marker locations around the path 18. All of these are assigned a default value of negative one, which is beyond the acceptable range to vehicle software. The programmer 437 assigns, for each position marker 473 that the proximity sensors of the vehicle will sense as the ride vehicle 10 travels around the path 18, a specific number of feet that corresponds to a premeasured distance from a point of origin 475 (which is, under normal conditions, the Wayside Station 407). Accordingly, while forty or more position markers 473 may be utilized, it is common for each ride vehicle 10 to utilize as little as a handful of position markers 473 along the path, depending upon length of the path 18. It is presently contemplated that position markers 473 will be placed at approximately every five hundred feet along the path 18, and substantially more closely together in the vicinity of the Wayside Station 407.

The off-line editor 471 consists of an "IBM" compatible computer running "Microsoft Windows"™ in a special program which allows the off-line editor to selectively graph actuator position as a function of one of, or both of, elapsed time and distance along the path 18. This special program enables the programmer 437 to use a mouse or other input device 477 to smooth curves in the graphed motion, or to change the actuation signal associated with the particular mechanical element and position of the ride vehicle 10 along the path 18. In other words, the off-line editor 471 simply displays a graph having lines and curves that represent motion of the various actuators and, using the mouse or other input device 477, the programmer 437 smooths and adjusts the curves using a drawing program. By adjusting these curvilinear representations of the state of each of the mechanical elements, the programmer is able to perfect motions and remove the effects of influence of motion of the vehicle upon the programmer during the actual recording sequences. The software for these drawing functions of the off-line editor is considered to be well within the skill of any competent computer programmer.

Once the motions of the mechanical elements are perfected, it is necessary to synchronize the activities of the moving show sets and add audio to enhance the ride experience provided to the passengers 48 by the particular ride program.

For purposes of adding actuation of moving show sets and audio, it is contemplated that yet an additional programming session aboard the ride vehicle 10 is needed to ascertain positions when it is desired to add special audio effects for a particular audio channel, or to precisely actuate moving show sets which are external to the vehicle. To this effect, the ride vehicle 10 is actuated in accordance with the revised ride program to move around the path 18. Careful notes are made of specific vehicle position as to when and where it is desired to actuate each of the moving show sets and specific audio. These motions and actuations are then added to a show control program maintained by the Wayside Interface and edited using appropriate editing tools. Also, one of the parallel data tracks associated with audio enables the off-line editor 471 to load and format a particular MIDI command for actuation of a specific speaker and a specific sound, for example, tire screeching, engine roar, gravel spray, etc., in combination with the actions of the vehicle and moving show sets. Again, implementation of software functions that allow the off-line editor's definition of audio and actuation of the infrared transmitter 429 are considered to be well within the skill of a skilled computer programmer.

With the aforementioned equipment, including the programming console 433 and off-line editor 471, a recording sequence may be implemented which generally consists of the following steps:

(a) The programmer utilizes the programming console 433 to drive the ride vehicle 10 along the path 18, with no rear offset and no motion base movements, to check for smooth operation and acceptable clearances;

(b) A second iteration of the drive-through is performed, this time at normal speed, and a moderate velocity program track, with no rear offset, is recorded;

(c) A third, rear offset iteration is performed, with the velocity program played back to thereby drive the ride vehicle 10 in accordance with the moderate velocity program track, adding rear offset as necessary or desired;

(d) A fourth, vehicle velocity, iteration is performed, to modify the prerecorded velocity data track, to add high speeds in desired areas;

(e) A fifth drive-through is performed, with velocity and rear offset controlled entirely by replaying the prerecorded tracks for these mechanical elements, but with the programmer 437 utilizing the controls of the programming console 433 to add motion base movements;

(f) A sixth drive-through is performed, with headlight cues and safety functions added;

(g) Time-based motion patterns are created and indexed to specific positions of the ride vehicle 10 around the path 18, or for use as part of a hold-patterns in response to a disablement of the go signal;

(h) Fine-tuning of the recorded program tracks is performed, using the hybrid function for selected parallel data tracks, as discussed above;

(i) The basic ride program is removed by floppy disk 440 to the off-line editor 471, and actuator actions throughout the ride duration are smoothed, using the graphing and redrawing functions which were discussed above; recorded hold-patterns are also associated with a particular zone;

(j) Audio and moving show set actuation cues are added as parallel data tracks using their respective systems; and (k) A plurality of such ride programs are collected and burned into E$^2$PROM 211 for each ride vehicle 10 to be used with the amusement attraction.

2. Creation Of Time-Based Patterns.

While the programming console 433 permits the programmer 437 to generate ride programs which are based upon either position or elapse of time, there are other forms of motion indexing which can be utilized, for example, detection of predefined vehicle motion, external signals (using sensors), or a combination of any of the above. In fact, the preferred embodiment uses distance of the ride vehicle 10 along the path 18 as the index by which to synchronize the motion base 24, vehicle motion, audio, moving show sets, etc., and in addition, time-based patterns which may be implemented at any position of the ride vehicle 10 along the path 18. Time, as used for developing ride programs in the context of the present invention, may be used as either a velocity-dependent position-measure, or as an index for motion base actions which is not a function of the position of the ride vehicle 10 along the path 18.

A time-based pattern is a specific set of vehicle actions, motions and sounds that can be optionally performed within any particular ride program, depending on specified conditions which are selected by the programmer 437. These conditions may either be attainment of a specific position, or lowering of a zone-specific, go signal, which halts the forward progress of the ride vehicle 10. The latter condition may be used to trigger a hold-pattern, in which the motion base 24, other mechanical elements, and the sound module 41 may be used to entertain passengers 48 pending recommencement of forward motion of the ride vehicle 10. The programming console 433 is used to program, edit, and combine these time-based patterns, and to specify implementation of time-based patterns by position, including specific hold-patterns according to zone of stoppage.

The software of the programming console 433 is configured to allow inclusion of time-based patterns after the generation of a base ride program which is based upon distance travelled by the ride vehicle 10. Position-actuated, time-based patterns are implemented in the manner of the steps, described above, except that the programmer 437 first moves the vehicle to a desired position along the path 18, specifies time as the index for recorded motions, and proceeds in accordance with the aforementioned steps. At any point, the programmer 437 may change the recorded criteria, and return to position-based ride program development.

With respect to hold-patterns, the programmer 437 may record specific actions without regard to the position of the ride vehicle 10 and without the necessity of actually moving the vehicle. The programmer 437 proceeds in accordance with the generic programming steps, described above, but mutes the parallel data track of vehicle velocity and, in addition, specifies (1) range of position in which the hold-pattern may be implemented (2) minimum duration of the hold-pattern, and (3) maximum number of iterations of the hold-pattern. Alternatively, the programmer may permits small amounts of velocity, for example, rolling back and forth to create a "stuck in the mud" sequence. Since execution of a hold-pattern program is, using the personal computer 433, defined to occur within a range of vehicle position, or as a randomly selected one of a plurality of hold-patterns, the ride vehicle 10 need not be actually moved to a specific position along the path 18 for programming of the hold-patterns. Hold-patterns are terminated by the ride execution software of the computerized vehicle-control system 40, either at the end of the specific time-based pattern, or once both the go signal has been restored and the minimum duration has been exceeded. When the time-based segment terminates the ride execution software of the computerized-vehicle control system 40 is effective to transition back to the point where the ride vehicle leftoff within the normal position-based playback, allowing the ride vehicle 10 to recommence normal programming or program playback.

When the go signal is lowered or raised for a particular ride vehicle, the transition between the ride program and the hold-pattern is smoothly controlled by the ride execution software, for vehicle velocity, rear offset, and motion base operation, such that abrupt motion or excessive acceleration do not occur.

Thus, using the time-based features of the preferred programming console, a ride vehicle 10 along the path 18 may be instructed to stop all motion at a particular position, measured in terms of one of distance and elapsed time, and a MIDI sequence executed while the ride vehicle 10 is at that particular position. For example, a ride vehicle 10 may be instructed to, after travelling 1000 feet along the path 18, come to a full stop and articulate the motion base 24 in accordance with a short time-based sequence to simulate the effects of an earthquake, "stuck in the mud" sequence, or other activity. At the end of the time-based sequence, the sequence of data may again instruct the ride vehicle 10 to proceed and rely upon an advance in vehicle position, including distance, to derive further actions of the plurality of mechanical elements aboard the ride vehicle, including the use of further time-based patterns.

3. Use Of The Programming Console 433 For Maintenance And Diagnostics.

As mentioned above, the programming console 433 includes the control panel 469, personal computer 459 and monitor 463, a power connection 479 to one of the vehicle power supply and an external power source, and a coupling 435 that detachably connects the programming console to a ride vehicle 10 for programming and maintenance. However, in addition to its programming capabilities, the programming console 433 is also used for maintenance of the ride vehicles 10, either to perform trouble shooting or to assist in the installation of replacement parts. To this effect, the software of the programming console 433 permits the controls to actuate any one of the mechanical elements when a ride program is not being recorded or played and without necessitating forward motion of the ride vehicle 10. Accordingly, the control panel 469 may be used for actuating and testing specific ones of the mechanical elements during maintenance. Further, in addition to its recording and programming functions, the software of the personal computer 459 provides display of sensor readout values, status messages, longitudinal path position, vehicle velocity, mode of operation, accumulator pressure in pounds per square inch, rear offset, motion base actuator positions, and the status of brakes.

Initialization And Other Software Tasks Of The Computerized Vehicle-Control System 40.

In addition to the plurality of ride programs, which are stored in the E²PROM 211 for each of the two computers 193 and 195, each computer has memory that contains the initialization, ride execution and monitoring software which is used to govern execution of the sequences of data that correspond to each ride program and the implementation of ride vehicle or motion base shutdown, if required.

Initialization is performed anytime the ride vehicle 10 is stopped by a loss of electrical power or due to an emergency condition. The power-up steps of each ride vehicle 10 perform the tasks of zeroing each of the actuators, to ensure that no vehicle motion or actuation of the motion base 24 is triggered upon power-up, and charging the high-pressure accumulator 157 to have sufficient hydraulic pressure to drive all actions of the motion base and vehicle. A hydraulic pressure sensor signal 225 is used by each computer to ascertain when hydraulic pressure is approximately 2500 lbs. per square inch, and within a range, to regulate pressure supplied by the hydraulic power unit 34. Once the minimum hydraulic pressure has been reached, each of the vehicle's actuators may then be actuated in accordance with the ride program and the vehicle advanced along the path 18.

During initialization, the computerized vehicle-control system 40 first disables the motion base 24, and the servo actuators 126 that control steering are driven to correspond to no lateral offset. As soon thereafter as the go signal is raised by the Wayside Interface, the ride vehicle 10 is advanced at minimum velocity along the path 18 until the next two consecutive position markers are detected by the vehicle. The default ride program is then automatically selected to govern ride vehicle actions, and the vehicle is moved with its motion base 24 inactive towards the hold area, until it can no longer proceed due to the lowering of the go signal, indicating that the vehicle is in a queue for the hold area.

Use of this sequence, and confirmation of instructions from the Wayside Interface of a new ride program selection may be quite important for safety depending upon the particular implementation of the amusement attraction. In addition, it is also desirable to clear ride program selection for each ride vehicle as it enters the Wayside Station 407. Since different ride programs will be used throughout the attraction, it may be quite important that moving show sets and other equipment are exactly at their proper positions for approaching ride vehicles, which may be programmed to just miss obstacles, etc. Consequently, it is important for some alternative embodiments, e.g., where moving show sets may have differing reactions depending upon ride program selection, that the Wayside Interface have precise knowledge of the ride program selected for each ride vehicle 10 that is actively operating within the attraction 413, so that show sets may be commanded (by the Wayside Interface) to be in their proper positions. To this effect, ride vehicles 10 that have no memory of a ride program are advanced at minimum velocity, with no motion base actuation.

For ride vehicles 10 that may be activated from the branched-track portion 417, within the maintenance yard 415, activation and removal onto the closed-loop path 18 may be accomplished by manually turning power on within the ride vehicle, and either automatically advancing the vehicle onto the path using minimum velocity, until the first position marker 475 is detected, or manually controlling advancement of the vehicle using the programming console 433. Once the ride vehicle 10 is switched onto the closed-loop of the path 18 and has contacted the first position marker 475, it is ready for execution of one of the plurality of ride programs and entertainment of passengers 48. At the first position marker 475, which is preferably adjacent to the Wayside Station 407, the initialization software initializes the ride vehicle 10's position along the path 18, and the ride vehicle is ready for operation in accordance with one of its ride programs. The initialization software is also effective to select a default ride program, pending instructions from the Wayside Interface.

As each ride vehicle 10 enters the Wayside Station 407, each ride program instructs the vehicle to proceed at minimum velocity, while the Wayside Interface uses raising and lowering of the go signal to each zone 405 to move the vehicle from the hold area 419 to the passenger loading/ unloading area 421 to a departure-ready area 423, etc. Zones 405 in the station area will be spaced much closer together and shorter in length, and the ride vehicles 10 are permitted to run closely together, almost bumper-to-bumper. Status information, including ride vehicle position, operating status, and ride program selection, is displayed for the human operator 409 at the control tower 401 for each vehicle that is operating on the system.

Figure 51:
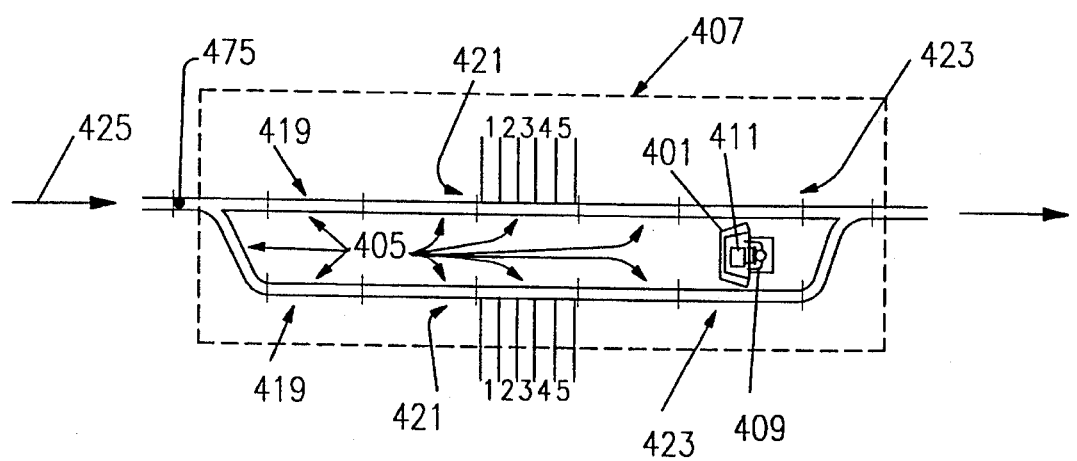
FIG. 51 is a schematic view of the layout of the Wayside Station of FIG. 50, and shows a number of advancement points, including a passenger unloading area and a passenger loading area. A plurality of zones are also shown, notably of much shorter length than was the case for most of the path shown in FIG. 50.

After the motion base 24 has been blocked at the hold area 419 and the ride vehicle 10 is stopped at the passenger loading/unloading area 421, the computerized vehicle-control system 40 releases the seat belt lock (not shown in FIG. 51) and seat belt retractor (not shown in FIG. 51). This will permit the passengers 48 to manually release the seat belt buckles. Operators will instruct the passengers 48 to release their buckles and step out to their left of the vehicle at this time. As passengers 48 are stepping off the ride vehicle 10, new passengers will be directed to load onto the vehicle and to buckle their seat belts. The vehicle will then leave the passenger loading/unloading area 421 and advance to the departure-ready area 423. As the ride vehicle 10 is being advanced to the departure-ready area 423, the RCC 193 causes the application of air to the seat belt lock bladders. If the seat belt tongue has been properly inserted and the seat belt is locked, the seat belt hard-wired contact and relay logic will automatically lock the seat belt reel retractor solenoid and illuminate a light-emitting diode (LED) (not shown) that corresponds to the particular seat.

A human operator 409 then is called upon to visually check that each passenger 48 has a belt on and that the seat belt display LED for each seat occupied is illuminated. If all LEDs are not illuminated, the operator 409 will take correction action before allowing the ride vehicle 10 to proceed into the attraction 413. Once all of the belts are fastened, however, a go button 425 corresponding to the departure-ready area is depressed on the control tower 401, and the go signal for the ride vehicle 10 is raised to permit it to commence the selected ride program.

The ride execution software of the RCC 193 then commences ride program operation by selecting initial data from the sequence of data of the selected one of the plurality of ride programs. As a practical matter, the initial data will set ride vehicle velocity as part of a sequence of vehicle motion data to move the ride vehicle 10 away from the Wayside Station 407. As the ride vehicle 10 moves in position along the path 18, additional data is retrieved from the E$^2$PROM 211 in parallel data tracks, to define the state of each of the mechanical elements that combine to create the ride experience, at any given moment. As indicated above, this data will include vehicle velocity, rear offset, and motion base actuation data.

In an alternative embodiment, a plurality of different paths 18 may be provided, each ride vehicle 10 storing ride programs that enable it to execute movements along each of the various paths. For example, a number of roads may be provided through a particular terrain, and the Wayside Interface controlled to elect one of these various paths for the vehicle to follow in accordance with a stored ride program. However, in the preferred implementation, a single path 18 is utilized with each ride program, creating different interaction with the three-dimensionally vivid images observed by the passengers 48.

Accordingly, the ride vehicle 10 is first called upon to leave the Wayside Station and begin its movement along the path 18. The computers 193 and 195 aboard the ride vehicle 10 utilize their distance registers and high-speed counters 215 to maintain an accurate indication of the vehicle's position along the path 18 as measured in feet, time of day, and also an elapsed time since commencement of the program. In this sense, the high-speed counters 215 are incremented 360 times with each rotation of the wheels, and computer software is relied upon to derive a specific foot position around the path 18. Notably, each of the RCC 193 and RMC 195 receives two signals, one from each rotary encoder, which may produce different numbers of pulses as the ride vehicle enters a turn. Thus, the software of the computerized vehicle-control system 40 simply takes an average of the two numbers (tracked with the high-speed counters 215), producing an error if their difference is too disparate. One of distance from the Wayside Station and the elapsed time from commencement of the ride program, or a combination of both, is used by software in the preferred embodiment to index the selected ride program and to actuate the plurality of mechanical elements aboard each ride vehicle 10 as it follows the path 18, With each increment in position, either distance in terms of feet or elapsed time, the E$^2$PROM is checked for subsequent data in the sequence of data that it contains. Accordingly, the computers 193 and 195 are continuously retrieving data from the sequence of data that define instantaneous vehicle actions in accordance with the selected ride program.

As mentioned above, the rotary position encoders are not only the mechanism that the ride vehicle 10 has for determining its position along the path 18. In addition, position markers positioned at various points along the path are defined in program memory to be associated with specific foot positions along the path. Accordingly, each time the ride vehicle 18 reaches one of the various position markers located around the path 18, the distance registers are checked to ensure that they reflect actual position of the ride vehicle 10 and the rotary encoders are used to supply incremental distance beyond the previous position marker.

The ride execution and monitoring software calls for each of the RCC 193 and the RMC 195 to monitor vehicle activities in accordance with the instructions of the parallel data tracks of the selected ride program, and to utilize the aforementioned voting procedure to agree or disagree as to status, indicating (1) proper operation, or an agreed fault condition, or (2) a logic fault. In addition to its other activities, the ride execution and monitoring software is also called upon to perform certain safety functions, including a power disconnect and motion base shutdown if it is determined that specified errors, including logic errors, exist.

1. Vehicle Power Disconnect. As mentioned earlier, the computerized vehicle-control system 40 exercises control over vehicle power using a number of switches 239, 241, 257 and 259 of the bus controls. The software of the ride vehicle 10 monitors vehicle activity and initiates a power disconnect, informing the Wayside Interface of the same, for any of the following reasons:

a. Failure to respond to the power bus controls, or a logic fault.

b. Hydraulic fluid level low, shutdown.

c. Loss of steering position sensor signal.

d. Excess lateral position (offset) error.

e. Excess longitudinal position error.

f. Hydraulic fluid over-temperature, shutdown.

g. Return accumulator pressure too low.

h. Seat belt lock air pressure too low.

i. Excessive vehicle speed.

j. Rear offset lock-out state error.

k. Loss of longitudinal position sensor signal.

The power disconnect function remains in effect until the condition causing the disconnect has been corrected and service personnel activate a reset key switch on the ride vehicle 10, or initiate a reset using the special programming console, which may be connected to the vehicle for maintenance and diagnostics. If the problem cannot be corrected, then service personnel use the programming console in the drive mode, to drive the ride vehicle 10 along the path 18 and into the maintenance area.

2. Disablement Of The Motion Base 24.

As also mentioned above, the software of the ride vehicle 10 is also called upon to disable the motion base 24 and bleed pressure from the motion base actuators 50, 52 and 54. However, certain errors, such as positional errors which may signify that the ride vehicle 10 is inappropriately positioned with respect to moving show sets, may also require a deactivation of the motion base 24 for reasons of passenger safety. A motion base stop command is utilized in the preferred embodiment when there is (a) a loss of signal from a servo actuator position sensor, (b) excessive motion base servo actuator stroke, as determined from the corresponding sensor feedback signal, or (c) unacceptable position error, which requires shutdown if there is a question concerning clearance of the motion base 24.

When the vehicle motion base stop command is activated, the vehicle software de-energizes the motion base 24 by controlling the blocking valves 182, 184 and 186 to close, and by opening the settling valves, thereby stopping all servo actuator movement and causing the motion base to settle to the home or fully down position, with no further movement. In addition, the software commands the use of the current ride program parallel data track values for steering and rear offset lock-outs, audio, vehicle headlights on/off, hydraulic and safety functions, and other functions not relating or affecting the motion base control, to direct the ride vehicle 10 to return to the Wayside Station. Once the ride vehicle 10 has been returned to the Wayside Station, the motion base 24 may either be reset, allowing for renewed activity, or the ride vehicle may be removed to the maintenance area, or otherwise taken off-line, for diagnostics.

Software Tasks And Use Of The Wayside Interface.

The Wayside Interface, as mentioned, includes the computer system 403 and monitor 411 for interaction with a human operator 409, and a number of manually-operated dispatch controls 425 that control activation of the go signal in corresponding zones 405, within the Wayside Station 407. These dispatch controls 425 govern motion of each ride vehicle 10 (at minimum velocity within the Wayside Station 407), providing that no ride vehicle 10 occupies an adjacent zone. In addition, the computer system 403 displays messages transmitted from each ride vehicle 10 as it enters the Wayside Station 407, and permits ride program selection in either of a random mode or a controlled mode, where the human operator 409 of the Wayside Interface is called upon to select a particular ride program. Suitable programming of the computer system 403 of the Wayside Interface, to receive these messages from a rf transceiver 481, and to display those messages in the order received, for the human operator 409, is considered to be a simple task of computer programming and will not be further discussed.

In addition, the computer system 403 of the Wayside Station 407 is called upon to monitor the no-go signals in each zone 405 of the path 18, and for each (first) zone having an active no-go signal, disable the go signal in the immediately previous (second) zone until the no-go signal disappears from the first zone. This monitoring occurs both for the Wayside Station 407 and at other portions of the path 18, and thus, the computer system 403 is effective to gate the manually-operated dispatch controls to block dispatch if another ride vehicle already occupies the immediately adjacent zone in the forward direction of vehicle travel.

Finally, when each ride vehicle 10 is at the Wayside Station, the ride vehicle's selection of the previous ride program is preferably cleared, and the Wayside Interface transmits a new ride program selection. The computerized vehicle-control system 40 of each vehicle receives this rf transmission, and confirms the particular ride program selection. As mentioned, depending upon the particular attraction, vehicle confirmation of the particular ride program selection may be considered necessary to ensure that show elements are in known positions for a given vehicle ID, and vehicle dispatch from the Wayside Station 407 is not granted until confirmation is received from the departing vehicle.

Implementation of these above-recited tasks of the computer system 403 of the Wayside Interface is considered to be a relatively simple task, within the skill of any computer programmer.

From the foregoing, it will be appreciated that the preferred ride vehicle 10 provides several distinct motion patterns that may be executed in various sequences in an amusement attraction, along with appropriate scenery, audio sounds and various other special effects, to create a very unique ride experience for the passengers in the ride vehicle. The ride vehicle 10 is capable of enhancing the sensation of ride vehicle movement that is actually taking place, as well as providing the passengers 48 with realistic moving ride vehicle experiences that are not actually happening.

The invention defined in the claims which follow may be implemented in many different ways. Another example, quite similar to the preferred implementation, discussed above, would be to implement the ride vehicle 10 as a raft that apparently travels down a set of rapids. Motion of the ride vehicle 10 can be quite precisely controlled along a path, with motion (seemingly created by water currents and obstacles) imparted by the motion base 24.

Alternatively, motion of the ride vehicle 10 may be controlled by a human operator, who directs a vehicle along a path which is not predefined. Although the ride vehicle 10 is not operated at high speeds, the computerized vehicle-control system 40 is programmed to detect specific vehicle motions, and to provide corresponding, synchronized articulation of the motion base 24 and control of the sound module 41. As one example, the human operator could be employed to steer a all-terrain style vehicle at slow speed, with accelerations, decelerations and turns of the ride vehicle detected by the computerized vehicle-control system 40 and responsive actuation of the motion base 24 to significantly enhance these effects. The sound module 41 can similarly be called upon to create sounds of screeching brakes, engine revving, etc. Thus, the passengers 48 may be induced to believe that they are travelling at far greater speeds than the actual speed of the vehicle.

Having thus described several exemplary embodiments of the invention, it will be apparent that various alterations, modifications, and improvements will readily occur to those skilled in the art. Such alterations, modifications, and improvements, though not expressly described above, are nonetheless intended and implied to be within the spirit and scope of the invention. Accordingly, the foregoing discussion is intended to be illustrative only; the invention is limited and defined only by the following claims and equivalents thereto.

APPENDICES

Attached as Appendix "A" to this detailed description is an example audio cue list that identifies how audio data is configured in one of several parallel data tracks as part of each ride program, with the generation of audio sounds cued to other vehicle activities.

generating said actuation signals for selected mechanical elements in dependence upon said control signal outputs; and

APPENDIX A

| SOURCE NAME | SRC NO. | SPEAKER | START | SPL dB | STOP | SYNC TO | COMMENTS |
|---|---|---|---|---|---|---|---|
| 1 Engine Idle | 1 | Engine | From previous show | 75 | x-fade on cue #2 | | Continuous from unload last show through load new show |
| 2 Gear shifting | 2 | Engine | Triggered | 85 | Auto | | |
| 3 Engine run up #1 | 3 | Engine | Triggered | 85 | | Vehicle speed | |
| 4 Gear shifting | 2 | Engine | Triggered | 85 | Auto | | |
| 5 Engine run up #2 | 4 | Engine | Triggered | 85 | | Vehicle speed | |
| 6 Backfire | 5 | Right rear | Triggered | 95 | | | |
| 7 Engine continuous #1 | 6 | Engine | Triggered | 85 | | Vehicle speed | As vehicle attains constant speed |
| 20 Skid | 11 | All wheels | Triggered | 95 | Cut at cue #21 | | |
| 21 Thump | 8 | Left rear | Triggered | 95 | Auto | Ext. tree hit | Set sensor detects proximity to tree and initiates cue |
| Tree hit | 51 | At tree | Triggered | 95 | Auto | thump | Set sensor detects proximity to tree and initiates cue |
| 22 Tree crash | 52 | At tree | Triggered | 95 | Auto | 2 seconds after tree hit | |
| 23 Shift down | 8 | Engine | Triggered | 90 | Auto | | |
| 24 Engine speed #3 | 7 | Engine | Triggered | 90 | | Vehicle speed | |
| 40 Gunshot | 59 | Spkr 28 | Triggered | 95 | Auto | | |
| Blowout | 12 | Right front | Triggered | 100 | Auto | | 1 second after gunshot |
| Skid | 11 | All wheels | Triggered | 95 | Auto | | |
| Squeal | 14 | Rear wheels | Triggered | 95 | Auto | | |

© 1991 Walt Disney Imagineering

We claim:

1. In an electronic control system for controlling programmable ride vehicles in an amusement attraction, an electronic programming device used to program the ride vehicles to have a ride program, the ride vehicle having a passenger supporting structure, a plurality of mechanical elements, a sensor that provides response signals corresponding to actuation of the mechanical elements, and a logic system that controls actuation of the mechanical elements and articulation of the passenger supporting structure with respect to the ride vehicle, the ride vehicle having a vehicle-end coupling that provides electrical connection between said electronic programming device and the logic system, said electronic programming device comprising:

a control mechanism having control signal outputs that cause actuation of the mechanical elements;

a device-end coupling that connects to the vehicle-end coupling of the ride vehicle, said device-end coupling coupling actuation signals from said electronic programming device to the ride vehicle to control actuation of the mechanical elements using said programming device;

a computer having a monitor, memory and software, said computer receiving said control signal outputs, selectively modifying said control signal outputs to derive said actuation signals, and transmitting said actuation signals to said device-end coupling;

wherein said memory stores sequences of data in parallel data tracks, at least one track for each of the mechanical elements, said sequences indexed by position of the ride vehicle along the path, elapsed time, or sensed external triggers;

wherein said software modifies said control signals by passing prerecorded ones of said parallel data tracks as said actuation signals from said memory to the ride vehicle, or wherein said software records motion signals representing actuation of the generated actuation signals, said motion signals being one of the generated actuation signals and response signals from sensors that sense actuation of corresponding ones of the mechanical elements, said motion signals recorded upon corresponding data tracks in said memory.

2. An electronic programming device according to claim 1, wherein the mechanical elements include drivers for ride vehicle velocity and steering, and a motion base having actuators for articulating the passenger supporting area with respect to the ride vehicle, and wherein:

said memory has parallel data tracks that include at least one track that corresponds to each of ride vehicle velocity, ride vehicle steering, and each actuator of the motion base which articulates the passenger supporting area.

3. An electronic programming device according to claim 1 wherein the ride vehicle further includes a vehicle memory device coupled to the logic system, which causes the logic system to control the mechanical elements in accordance with instructions stored in the vehicle memory device, and wherein:

said electronic programming device includes an off-line editor;

said parallel data tracks may be removed to said off-line editor, which selectively processes said parallel data tracks to create the ride program; and said programming device further includes a transferral mechanism for transferring a copy of said ride program to the vehicle memory device of the ride vehicle.

4. An electronic programming device according to claim 1, wherein said software generates actuation signals for the mechanical elements by:

directly passing said control signal outputs as corresponding actuation signals with unity gain;

passing said control signal outputs as corresponding actuation signals, but with a scaled rate of response that limits how quickly the corresponding actuation signals track change in the control signal outputs;

scaling gain of said control signal outputs to produce corresponding actuation signals; or adjusting selective, prerecorded ones of said parallel data tracks, in dependence upon said control signal outputs, to produce corresponding actuation signals.

5. A method of programming a programmable ride vehicle that moves along a path of an amusement attraction to thereby present different surroundings to passengers of the ride vehicle, the ride vehicle having a passenger supporting structure and a plurality of mechanical elements, wherein one of the mechanical elements comprises a motion base that articulates the passenger supporting structure with respect to the ride vehicle in synchronicity with the motion of the ride vehicle and the change in surroundings to the passengers occasioned by the motion of the ride vehicle, the ride vehicle also having a computer that controls actuation of the mechanical elements in accordance with an output file stored in a programmable memory, said method using a programming device, operatively coupled to controls of the ride vehicle or a ride vehicle sensor corresponding to each mechanical element, to monitor response of the mechanical elements to a corresponding actuation signal, each sensor providing a response signal indicative thereof, said method of programming comprising:

moving the ride vehicle along the path;

actuating the mechanical elements;

recording the actuation signal or the response signal corresponding to the mechanical element which has been actuated to thereby record actions of that mechanical element;

associating the recorded actions with an index including an elapsed time, a position of the ride vehicle along the path, or an externally-supplied trigger;

generating a data file, including a sequence of the recorded actions, using the index;

removing the data file to an off-line editor and visually displaying a curve representing extent of actuation of the mechanical element with respect to time, position or the index;

using the off-line editor to alter a shape of the curve, to thereby generate an output file that will be used by the computer of the ride vehicle to control automatic actuation of the mechanical elements; and downloading the output file into the programmable memory of the ride vehicle, such that the output file is accessible by the computer of the ride vehicle, the computer accessing the output file to control the actuation of the mechanical elements.

6. A method according to claims 5, wherein one of the mechanical elements comprises a velocity control that controls ride vehicle velocity, and wherein:

actuating the mechanical elements includes actuating the velocity control;

recording the actuation signal or the response signal includes recording ride vehicle velocity, as represented by an actuation signal corresponding to commanded velocity or a response signal representing actual ride vehicle velocity; and associating the recorded actions includes associating ride vehicle velocity with an index including an elapsed time, a position of the ride vehicle along the path, or an externally-supplied trigger.

7. A method according to claim 6, wherein generating a data file includes:

generating a file composed of parallel data tracks, wherein one track corresponds to one of the mechanical elements which has been actuated, including a first track having a sequence of recorded actions of the motion base and a second track having a sequence that represents ride vehicle velocity, both indexed by elapsed time or position of the ride vehicle along the path.

8. A method according to claim 5, wherein the motion base includes three separate actuators that articulate the passenger supporting structure with respect to the ride vehicle, including the motions of roll, tilt and vertical rise and fall, and wherein generating a data file includes:

generating a file composed of three parallel data tracks, wherein one track corresponds to each actuator that articulates the passenger supporting structure, each track indexed by elapsed time or position of the ride vehicle along the path.

9. A method according to claim 5, wherein the mechanical elements controlled by the computer also include a steering element that controls ride vehicle direction, and wherein:

actuating the mechanical elements includes actuating the steering element;

recording the actuation signal or the response signal includes recording ride vehicle steering, as represented by an actuation signal corresponding to the steering element or a response signal representing actual direction;

associating the recorded actions includes associating instantaneous direction of the steering element with an elapsed time or a position of the ride vehicle along the path; and generating a data file includes generating a file composed of parallel data tracks, wherein one track corresponds to each of said mechanical elements, a first track having a sequence of recorded actions of the motion base and a second track having a sequence that represents ride vehicle steering, both indexed by elapsed time or position of the ride vehicle.

10. A method according to claim 5, wherein the programming device is remote, and the ride vehicle has a coupling that permits attachment and detachment of the programming device to a control bus of the ride vehicle, the programming device including an actuation control that actuates the mechanical elements, and wherein:

said method of programming further comprises coupling the programming device via the coupling to the control bus of the ride vehicle, such that the actuation control is used to actuate the mechanical elements;

generating the data file includes generating a file composed of parallel data tracks;

actuating the mechanical elements includes
playing back a prerecorded track of the data file corresponding to the mechanical elements to thereby actuate the mechanical elements, and,
simultaneously therewith, manipulating the control to actuate selected mechanical elements;

recording the actuation signal or the response signal includes recording the actuation signal or the response signal of the mechanical elements which have been actuated by manipulating the actuation control to thereby record its actions; and associating the recorded actions of the mechanical elements with an elapsed time or a position of the ride vehicle along the path includes associating the recorded actions of the mechanical elements which have been actuated by manipulating the control with an elapsed time or a position of the ride vehicle along the path as is used to index the prerecorded track.

11. A method according to claim 10, wherein generating the data file includes generating a data file that includes both the prerecorded track and a newly recorded track corresponding to the mechanical elements actuated using the actuation control, each as separate parallel data tracks, both of the prerecorded track and the newly recorded track being indexed by elapsed time or position of the ride vehicle along the path.

12. A method according to claim 10, further comprising mixing data stored on the prerecorded track with data representing control exercised over the mechanical elements using the actuation control, and recording them, to thereby create a newly recorded track that is a combination of both of them.

13. A method according to claim 5, wherein the programmable ride vehicle also has sound producing equipment, and wherein:

generating the data file includes generating a file composed of parallel data tracks, wherein one track corresponds to each mechanical element which has been actuated, and wherein one additional track is dedicated to audio data that is used to cause the sound producing equipment to produce audio sounds, and, using the off-line editor to add the audio data following recording of actions of the mechanical element which has been actuated.

14. A method according to claim 5, wherein the surroundings of the ride vehicle include a moving show set that is actuated to move in a predefined pattern during the localized presence of the ride vehicle, and that is reset to an original position subsequent to motion in the predefined pattern, the ride vehicle's computer operatively coupled to a transmitter, the moving show set coupled to a receiver adapted to receive transmissions of the transmitter, and wherein:

generating the data file includes generating a file composed of parallel data tracks, with one track corresponding to each of the mechanical elements, and one additional track dedicated to show set data that is used to cause the computer to send a transmission by the transmitter to the receiver coupled to the show set, to thereby actuate the moving show set to move in the predefined pattern, and, using the off-line editor to add the show set data following recording of actions of each of the mechanical elements.

15. A method according to claim 5, further comprising:

downloading the output file into the programmable memory of a plurality of ride vehicles, to automatically control actuation of the mechanical elements in each ride vehicle in synchronicity with motion of the particular ride vehicle and presentation of different surroundings to passengers of the particular ride vehicle, for use as a ride program that presents the passengers with a repeatable ride experience.

16. A method according to claim 15, further comprising:

creating a plurality of different ride programs that each present passengers of the ride vehicles with a different ride experience; and downloading an output file corresponding to each ride program into the programmable memory of each ride vehicle, such that each of the ride programs may be alternatively selected to cause the particular ride vehicle to provide the ride experience associated with the selected ride program to the passengers.

17. A method according to claim 5, wherein the programming device includes an actuation control that actuates the mechanical elements, and also a rate control that defines how quickly the mechanical elements responds to change of the actuation control, and wherein said method further includes:

prior to recording actions of the mechanical elements, adjusting the rate control to limit, during actuation of the mechanical elements using the actuation control, how quickly the mechanical elements respond to the actuation control.

18. A method according to claim 5, wherein the programming device includes an actuation control that actuates the mechanical elements, as well as a gain control that adjusts a stroke of the mechanical elements actuated in response to the actuation control, and wherein said method further includes:

prior to recording actions of the mechanical elements, adjusting the gain control, thereby scaling actuation imparted to the mechanical elements by the actuation control.

19. In an electronic control system for controlling programmable ride vehicles in an amusement attraction, an electronic programming device used to program the ride vehicles to have a ride program, the ride vehicle having a passenger supporting structure, a mechanical element, a sensor that provides response signals corresponding to actuation of the mechanical element, and a logic system that controls actuation of the mechanical element, the ride vehicle having a vehicle-end coupling that provides electrical connection between said electronic programming device and the logic system, said electronic programming device comprising:

a control mechanism having control signal outputs that cause actuation of the mechanical element;

a device-end coupling that connects to the vehicle-end coupling of the ride vehicle, said device-end coupling coupling actuation signals from said electronic programming device to the ride vehicle to control actuation of the mechanical element using said programming device;

a computer having a monitor, memory and software, said computer receiving said control signal outputs, selectively modifying said control signal outputs to derive said actuation signals, and transmitting said actuation signals to said device-end coupling;

wherein said memory stores sequences of data in parallel data tracks corresponding to the actuation of the mechanical element, said sequences indexed by position of the ride vehicle along the path, elapsed time, or sensed external triggers;

wherein said software modifies said control signals by
passing prerecorded ones of said parallel data tracks as said actuation signals from said memory to the ride vehicle, or generating said actuation signals for the mechanical element in dependence upon said control signal outputs; and wherein said software records motion signals representing actuation of the generated actuation signals, said motion signals being one of the generated actuation signals and response signals from sensors that sense actuation of the mechanical element, said motion signals recorded upon corresponding data tracks in said memory.

\* \* \* \* \*